Sept. 5, 1967  R. C. O'BRIEN ETAL  3,339,470
PHOTOCOMPOSING SYSTEM
Filed April 12, 1965   23 Sheets-Sheet 1
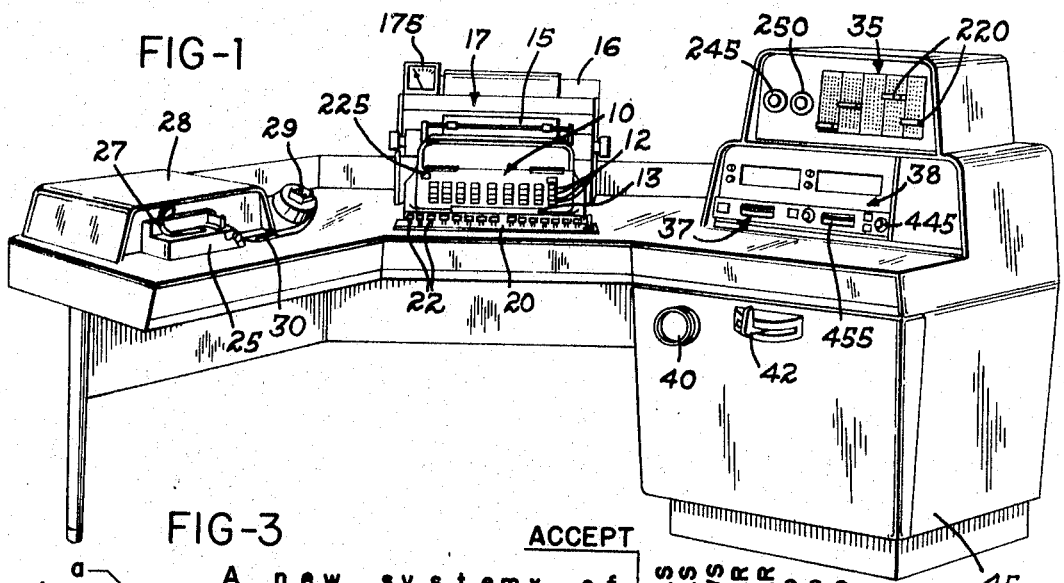
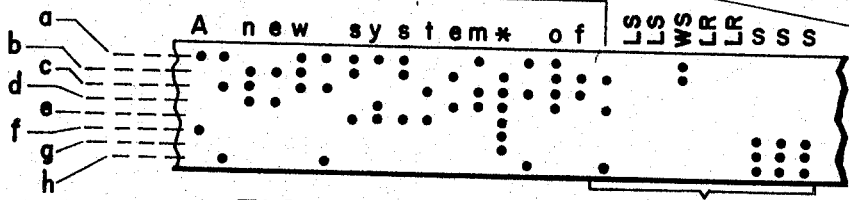
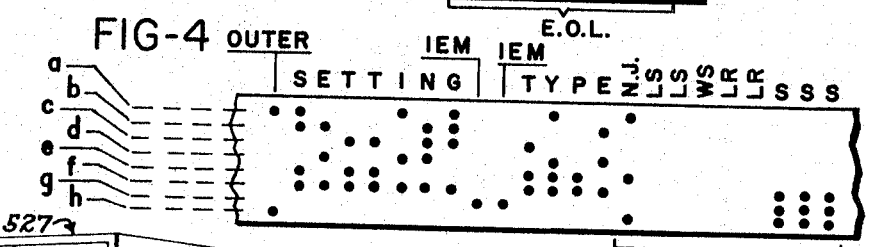
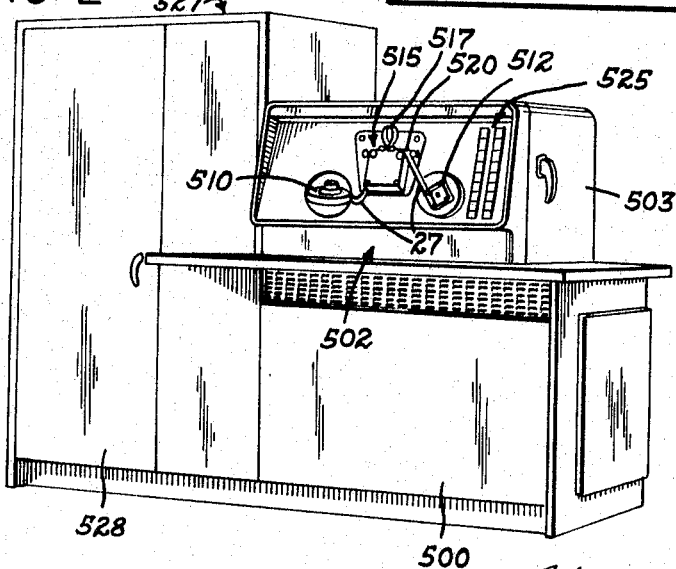
INVENTORS
RICHARD C. O'BRIEN &
RALPH A. PROUD, JR.
ATTORNEYS

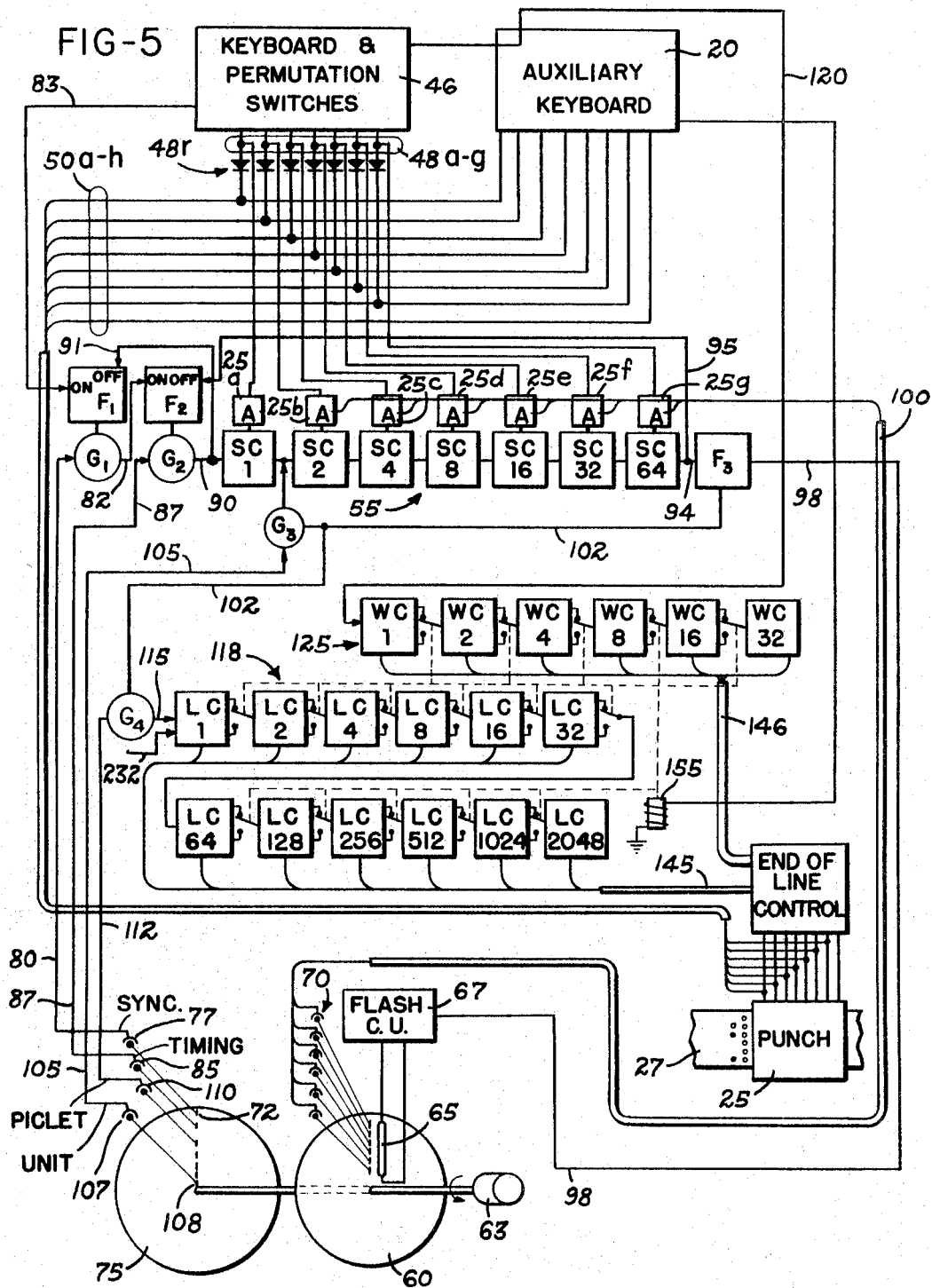

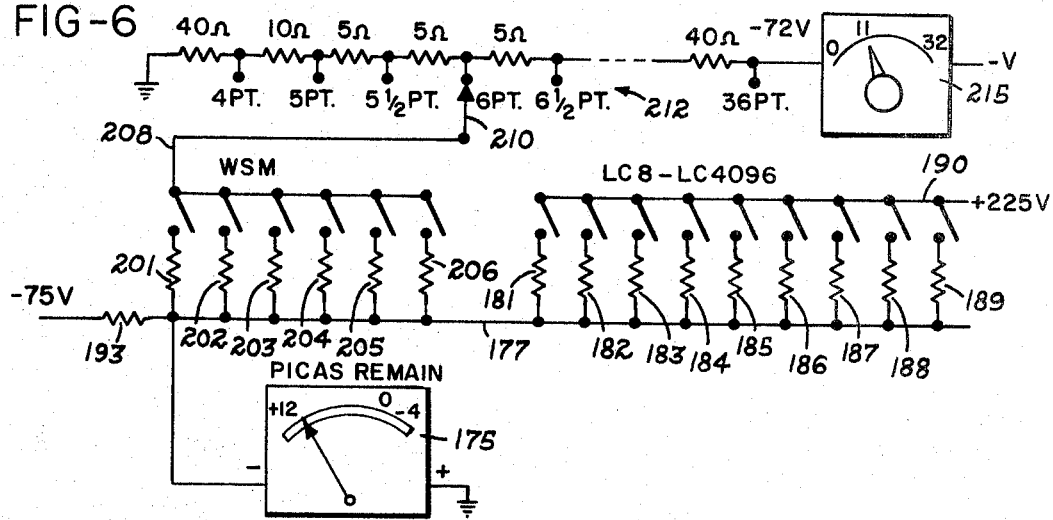
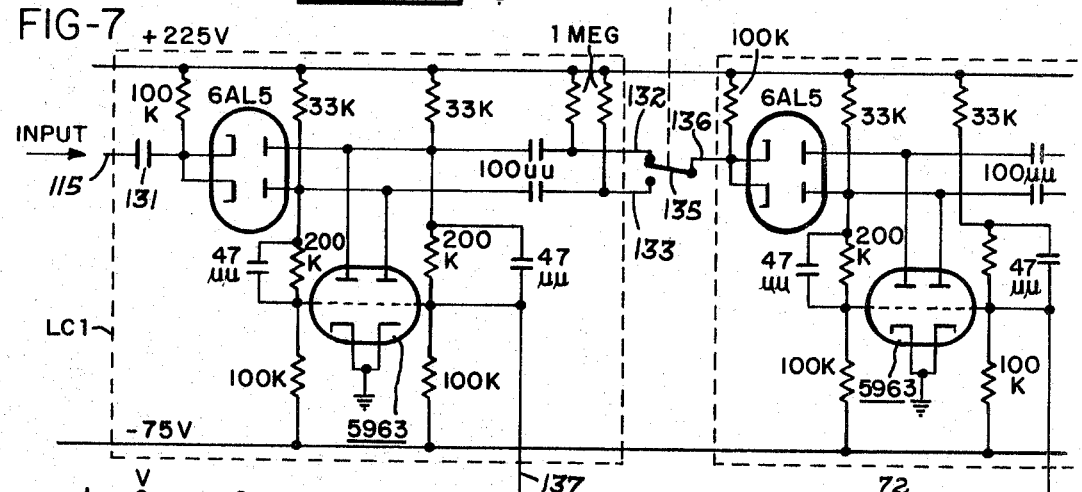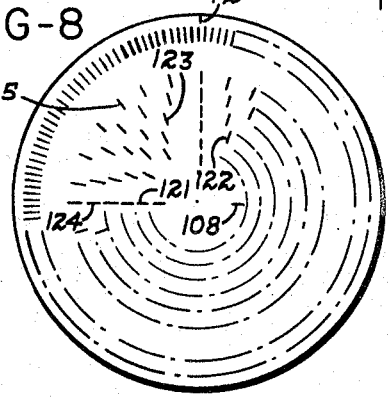

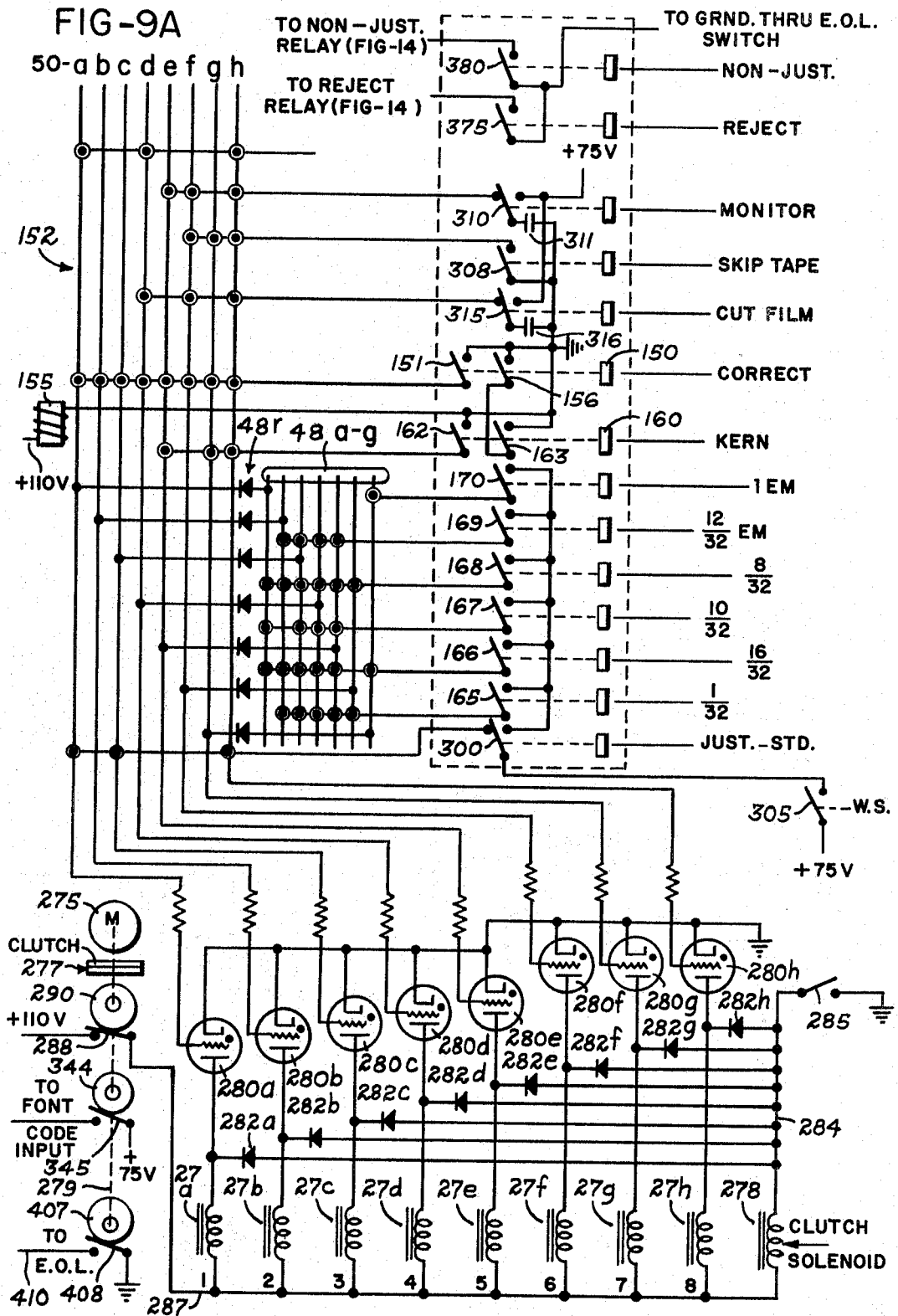

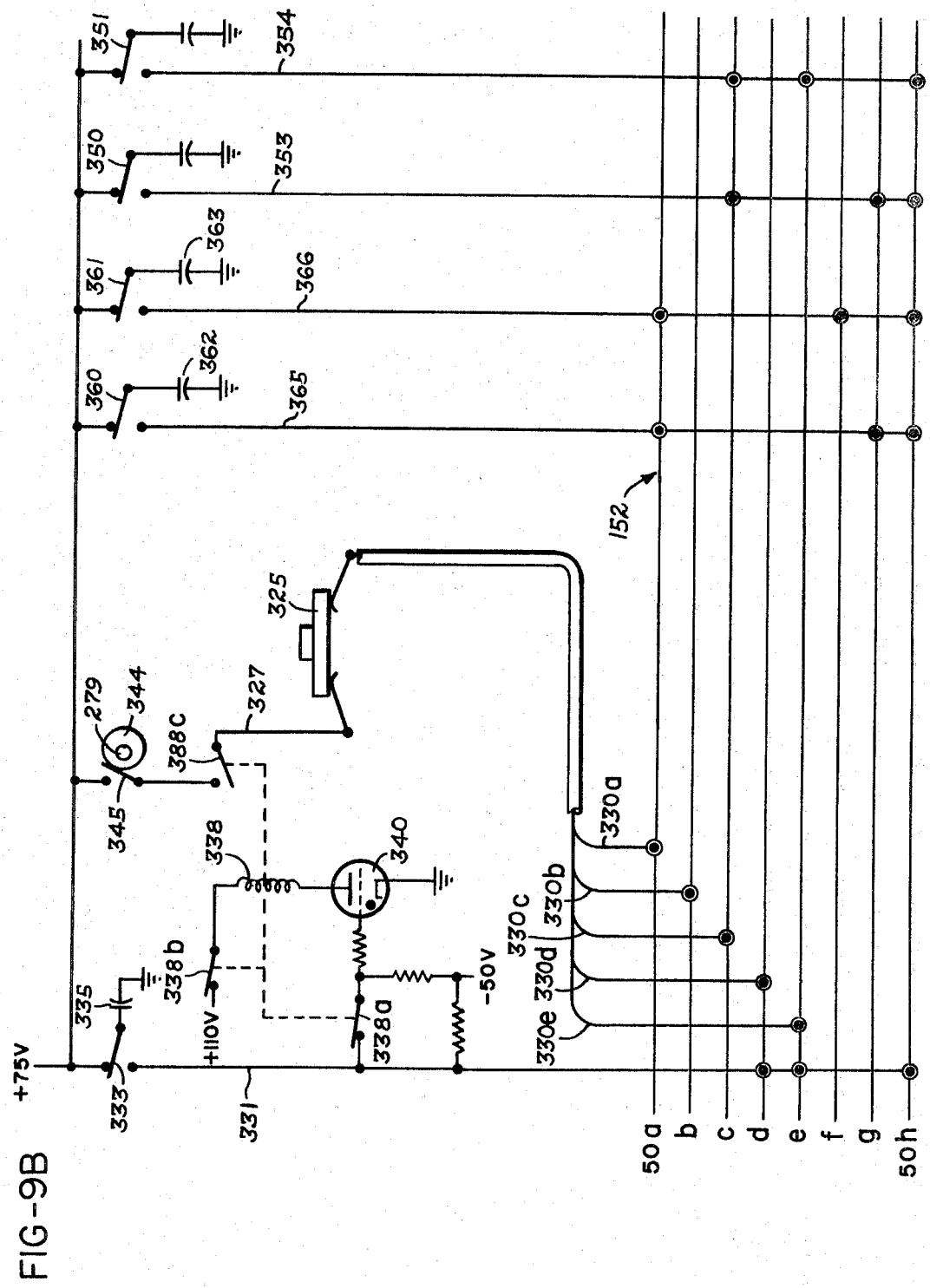

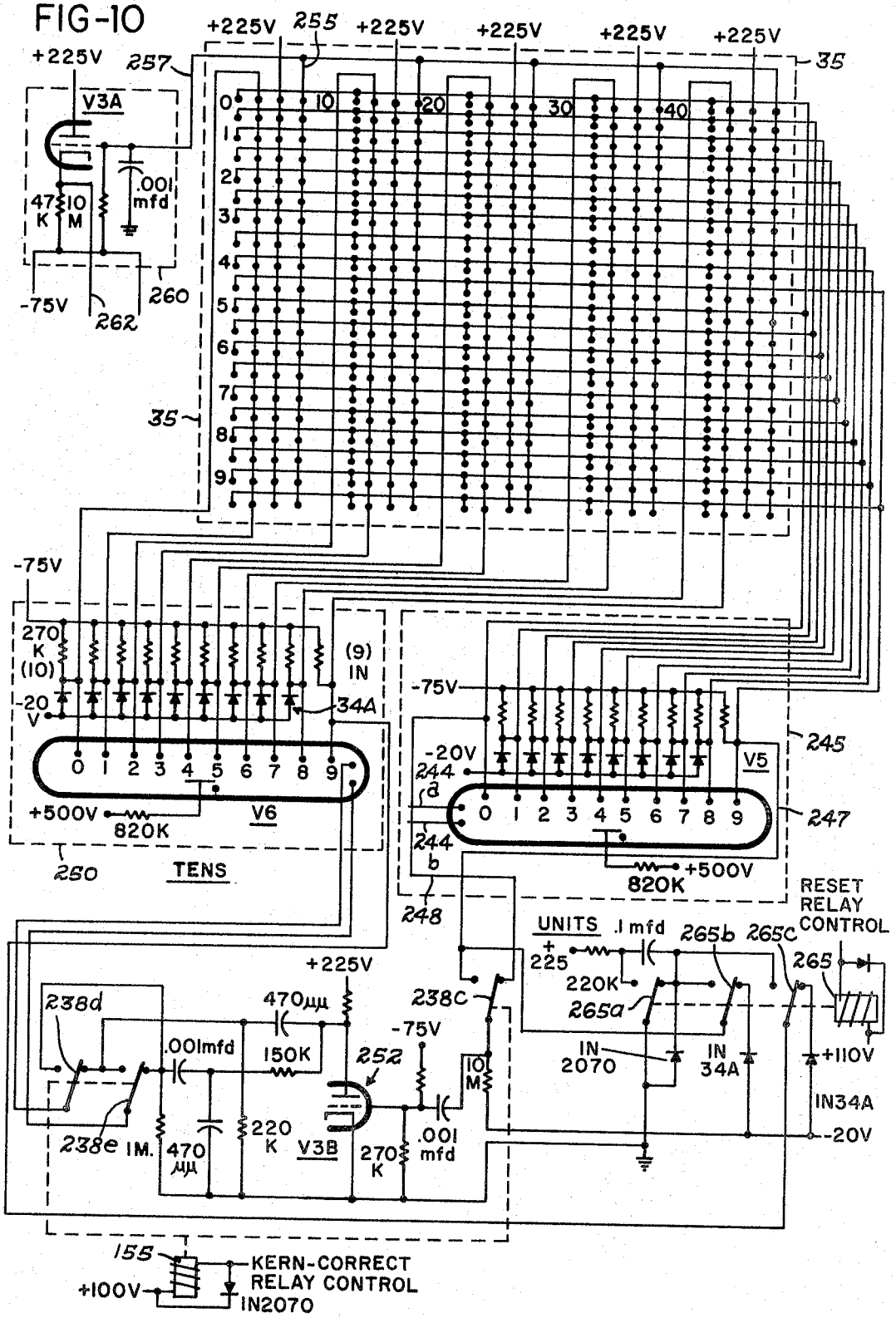

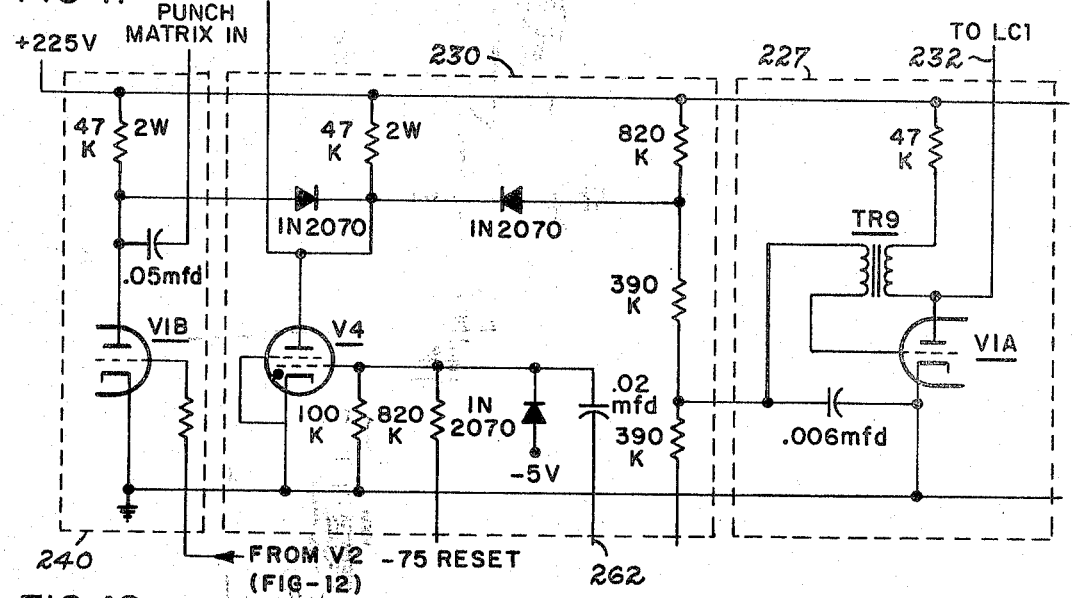
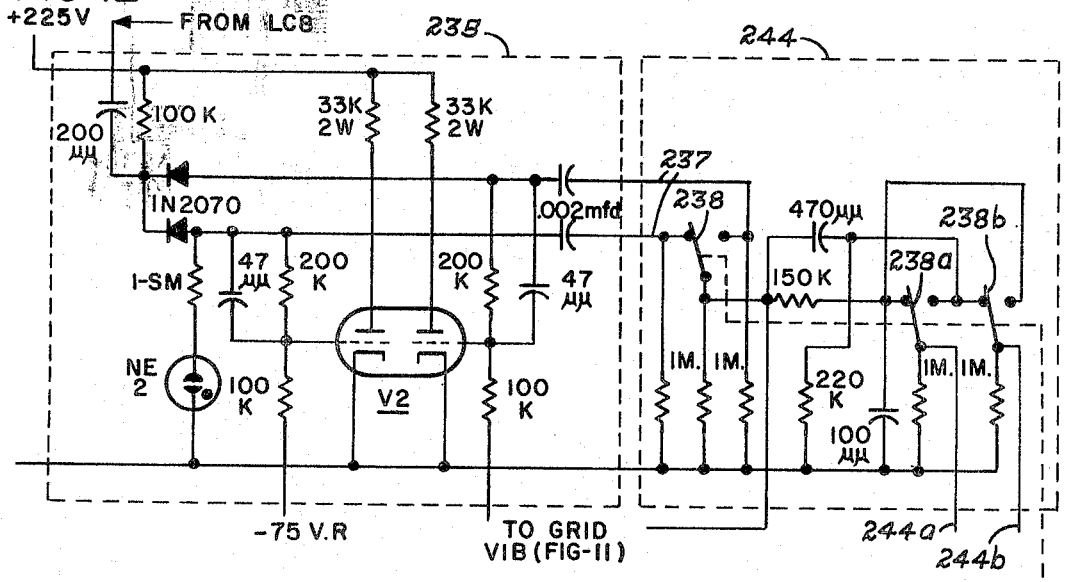
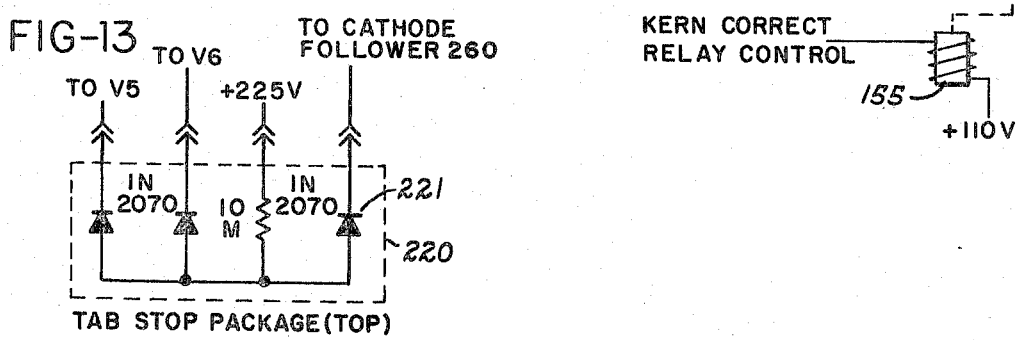

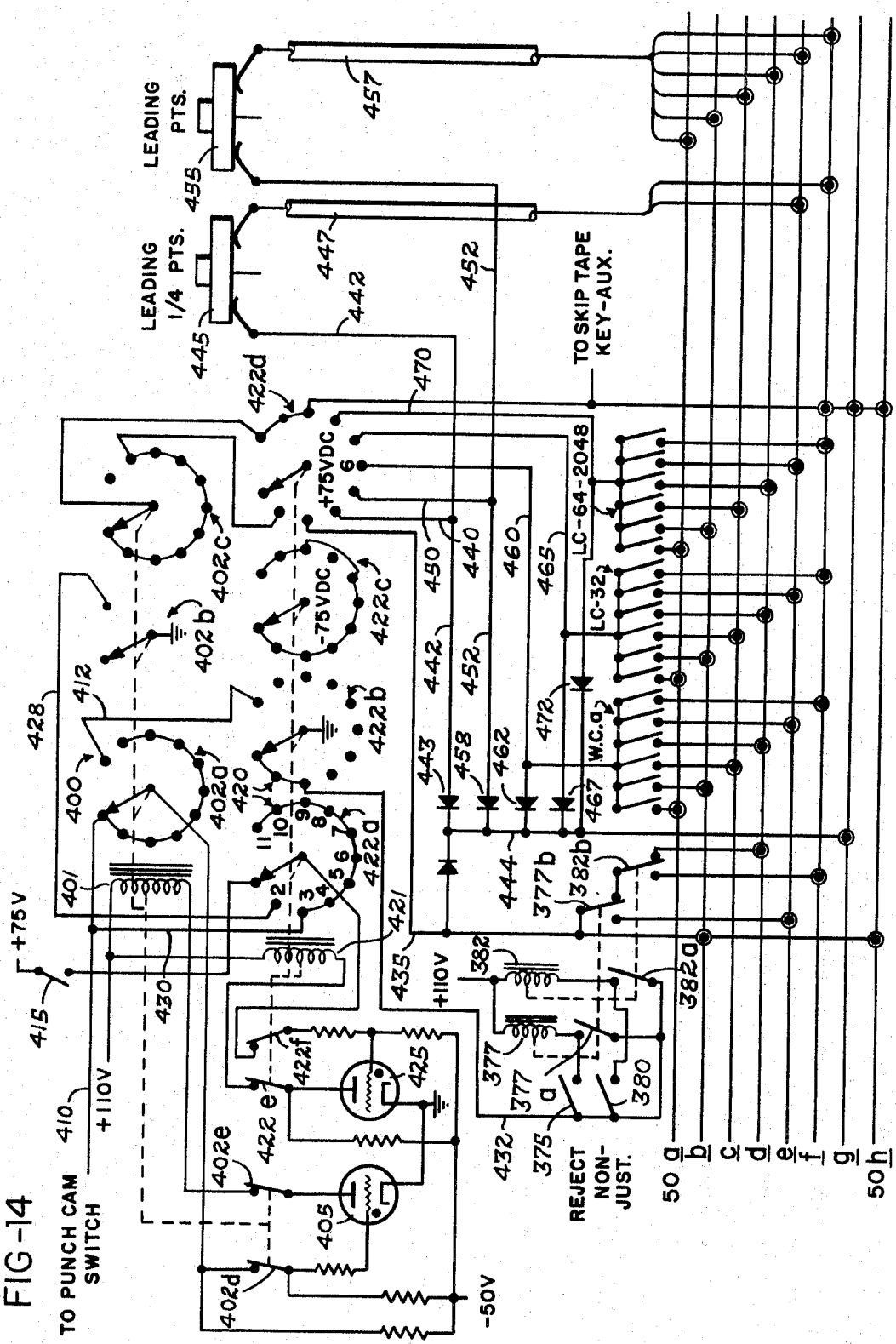

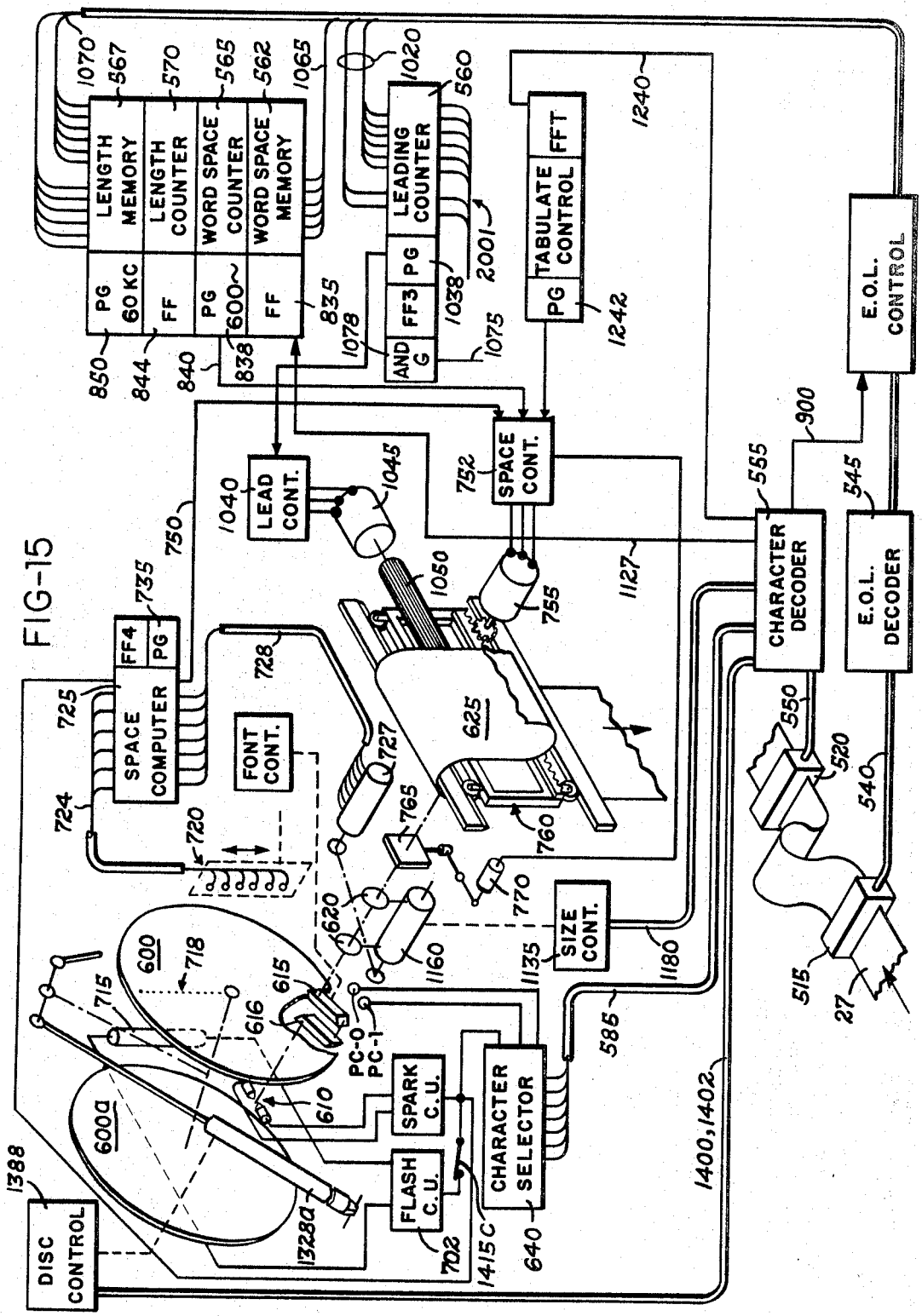

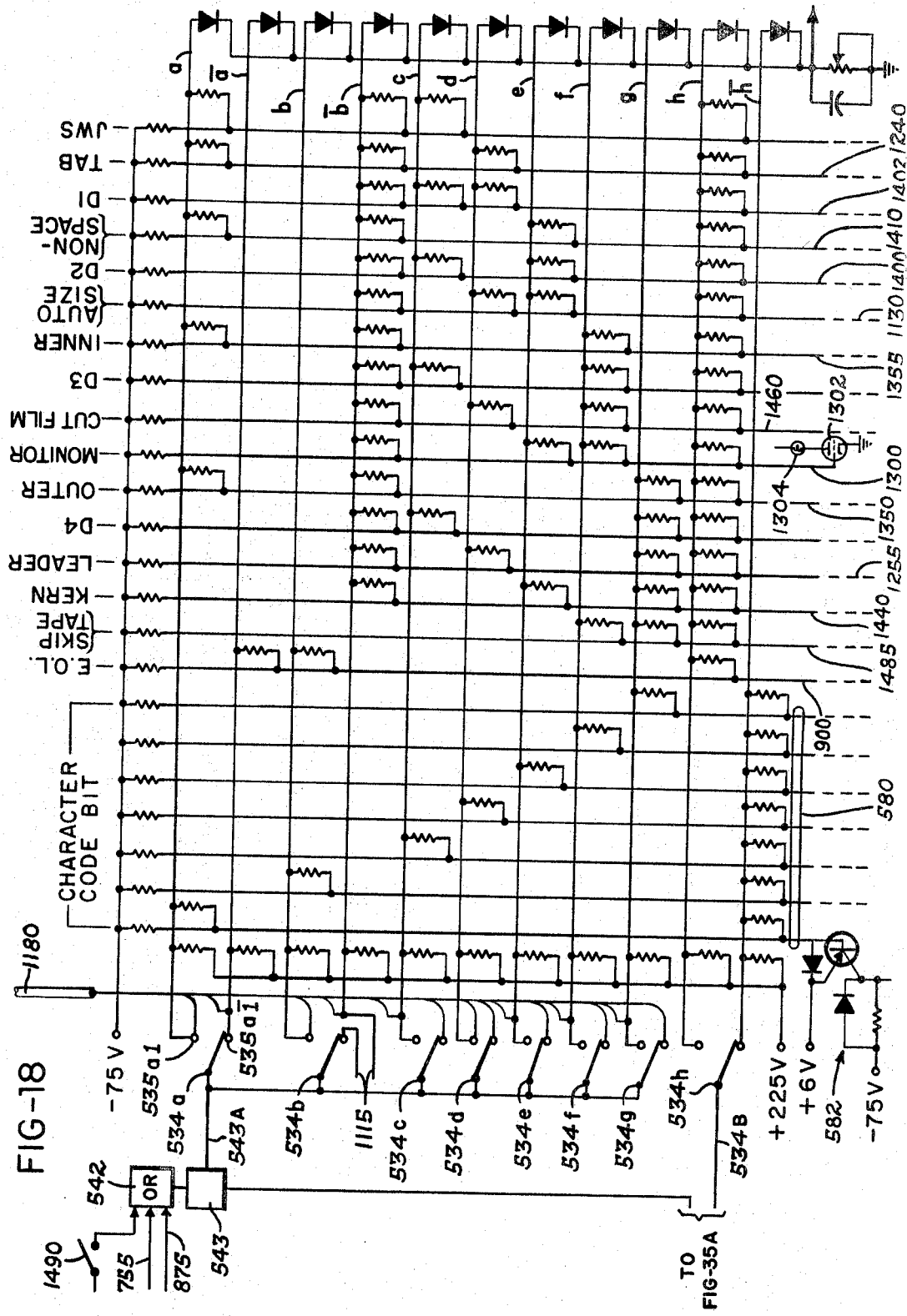

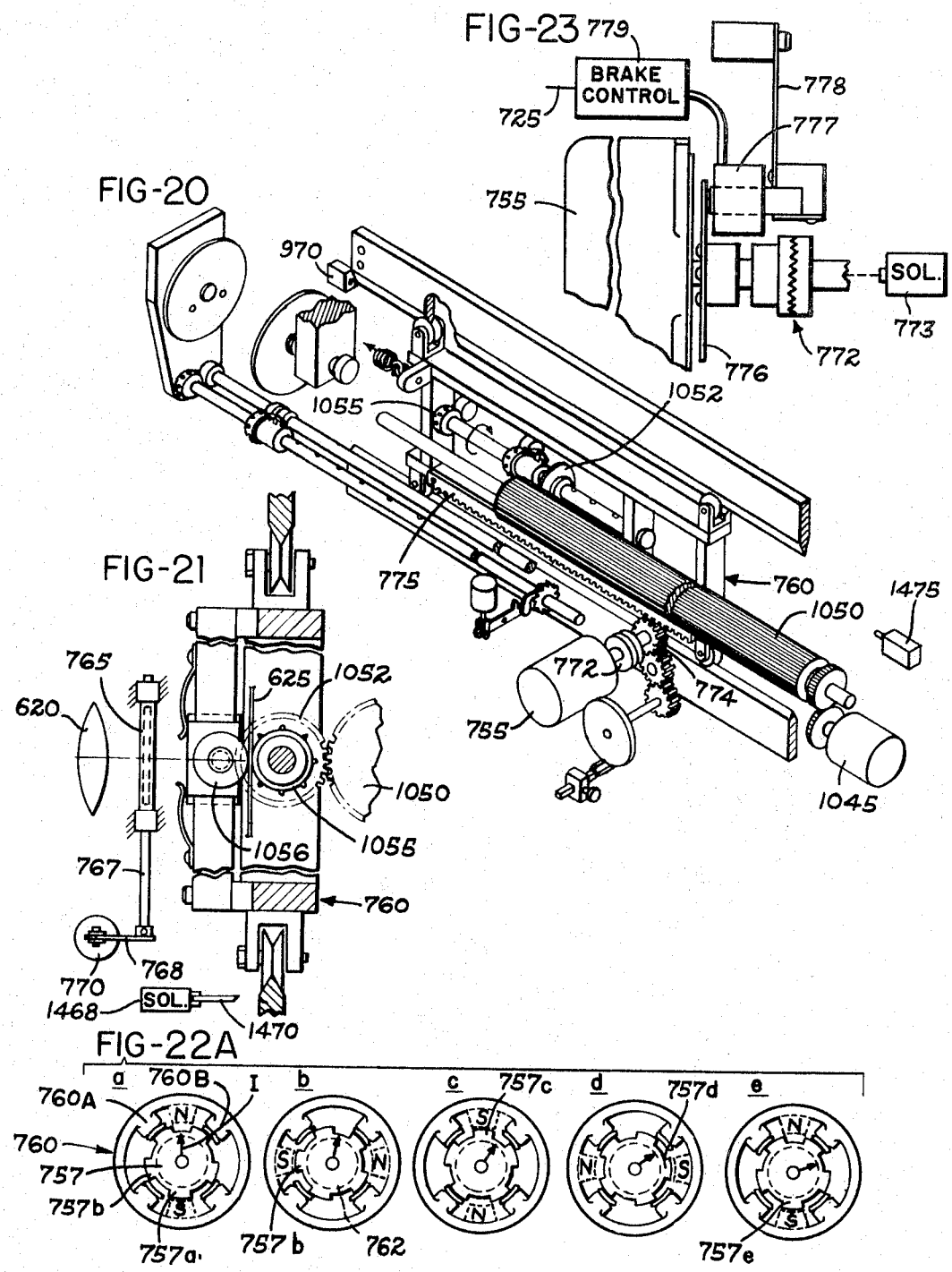

FIG-22B
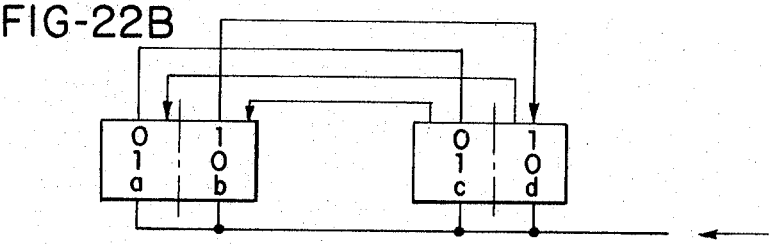
CONDITIONS
FIG-24
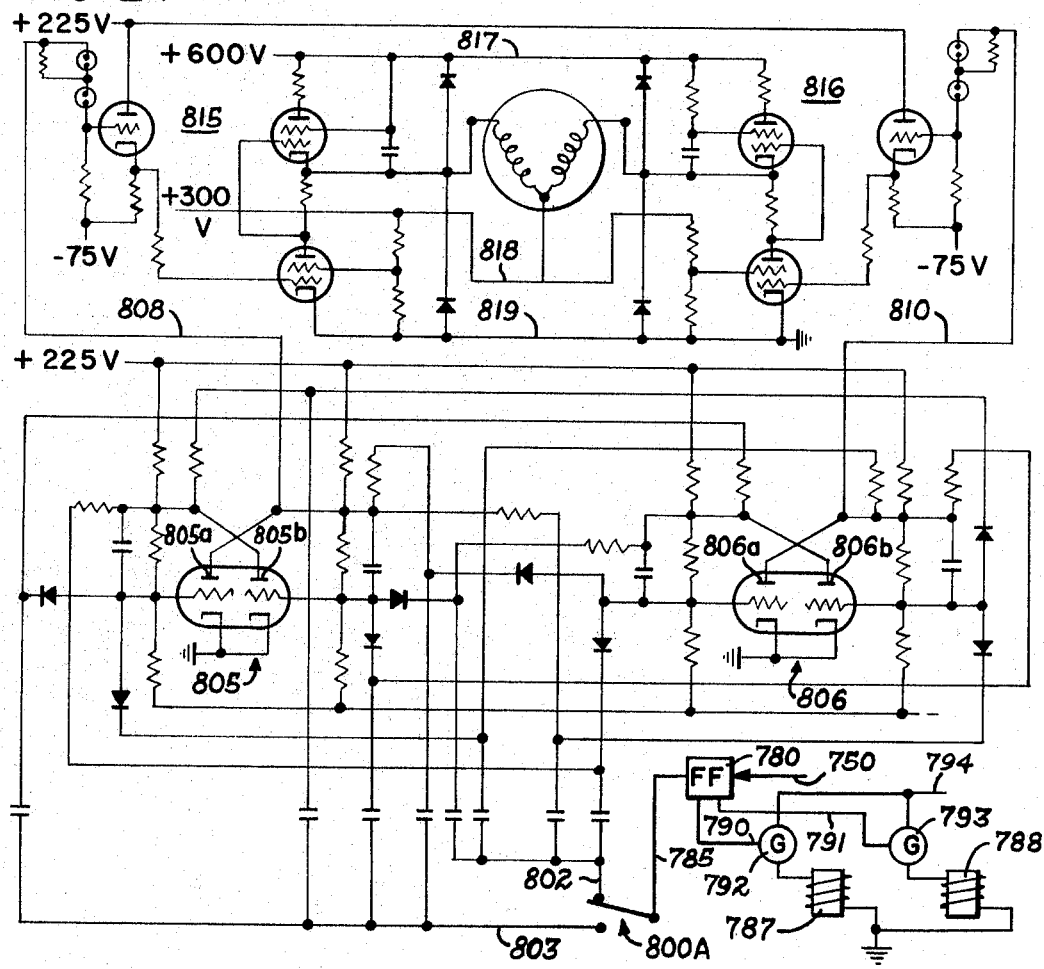

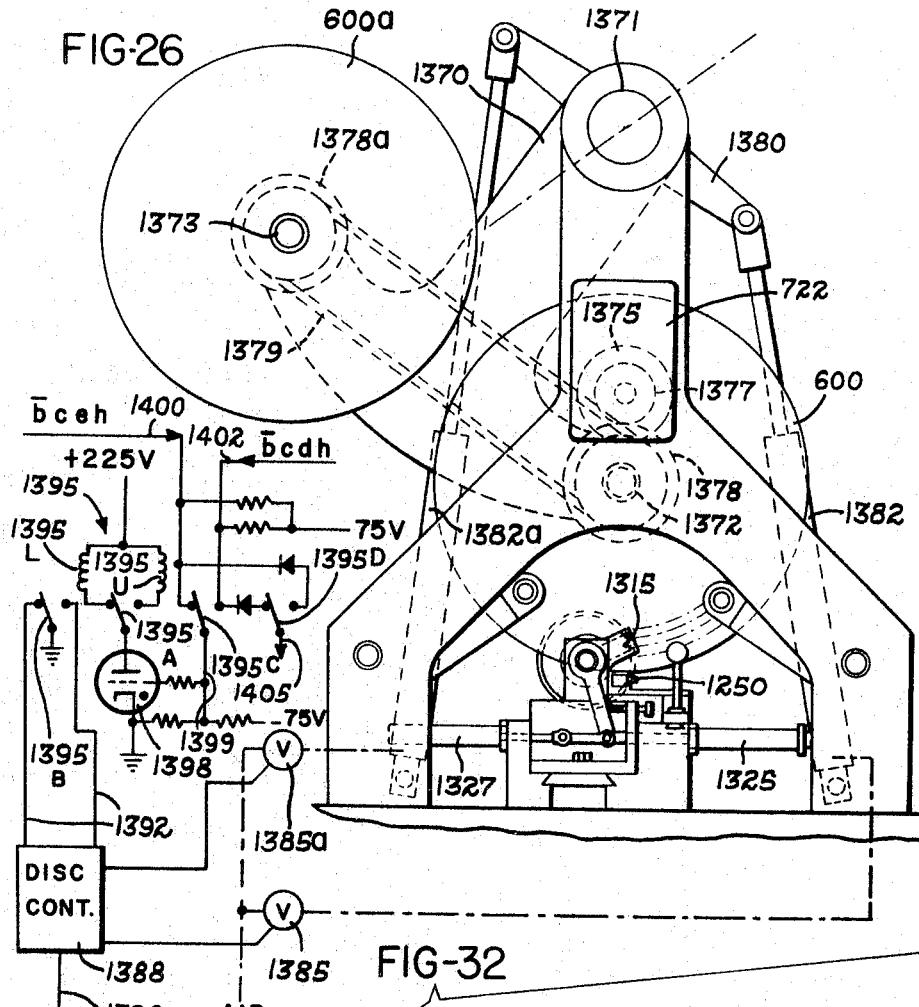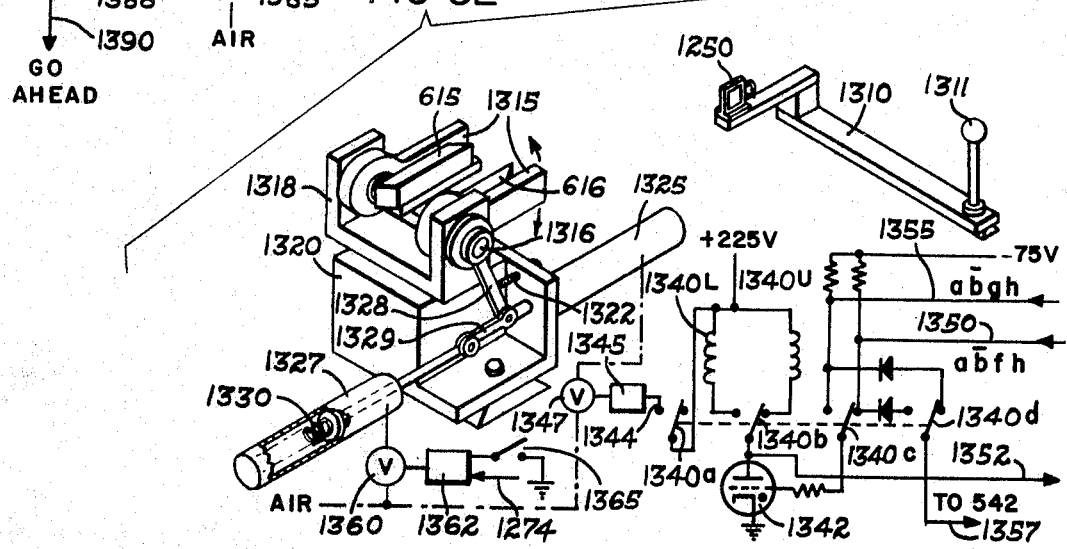

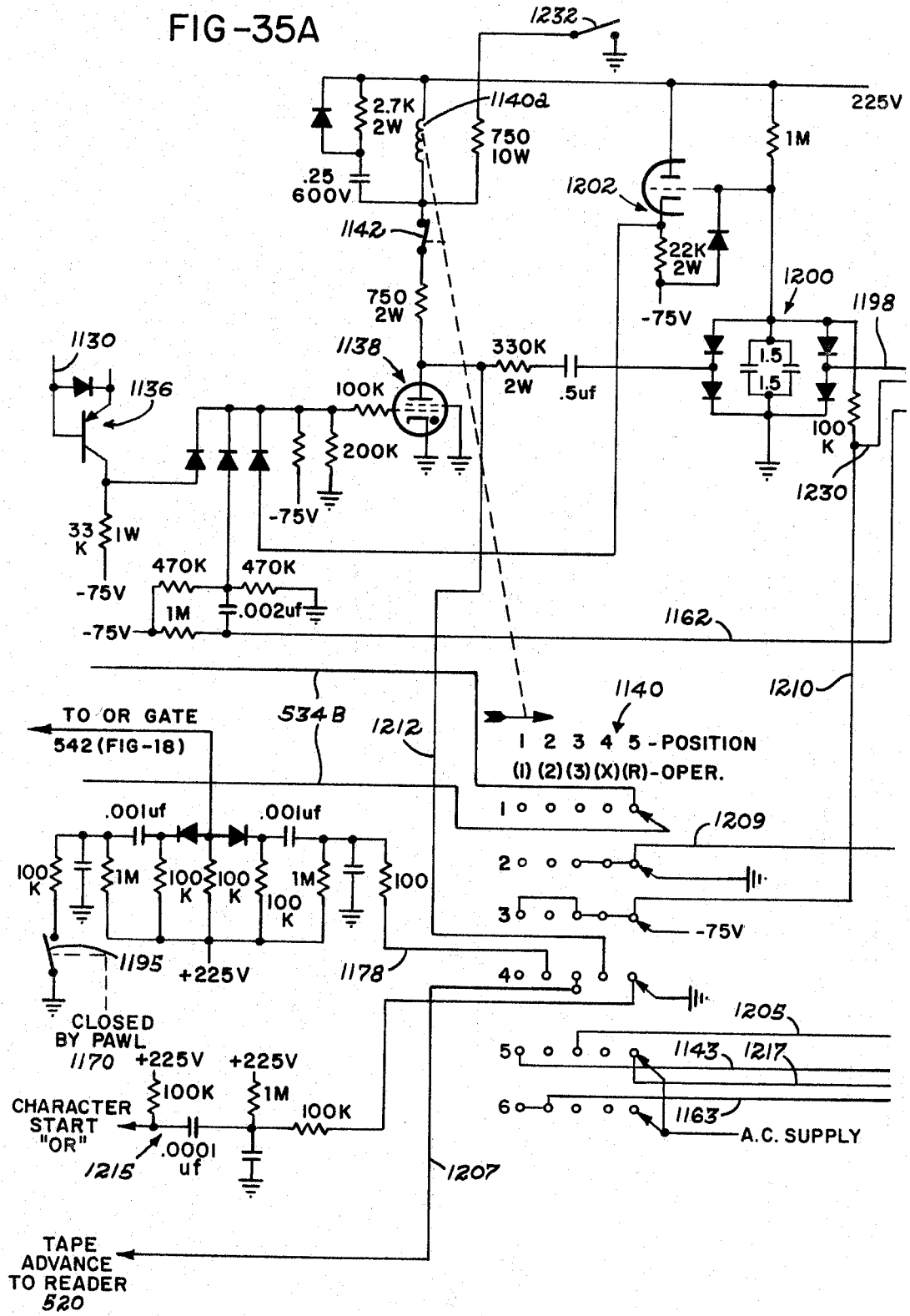

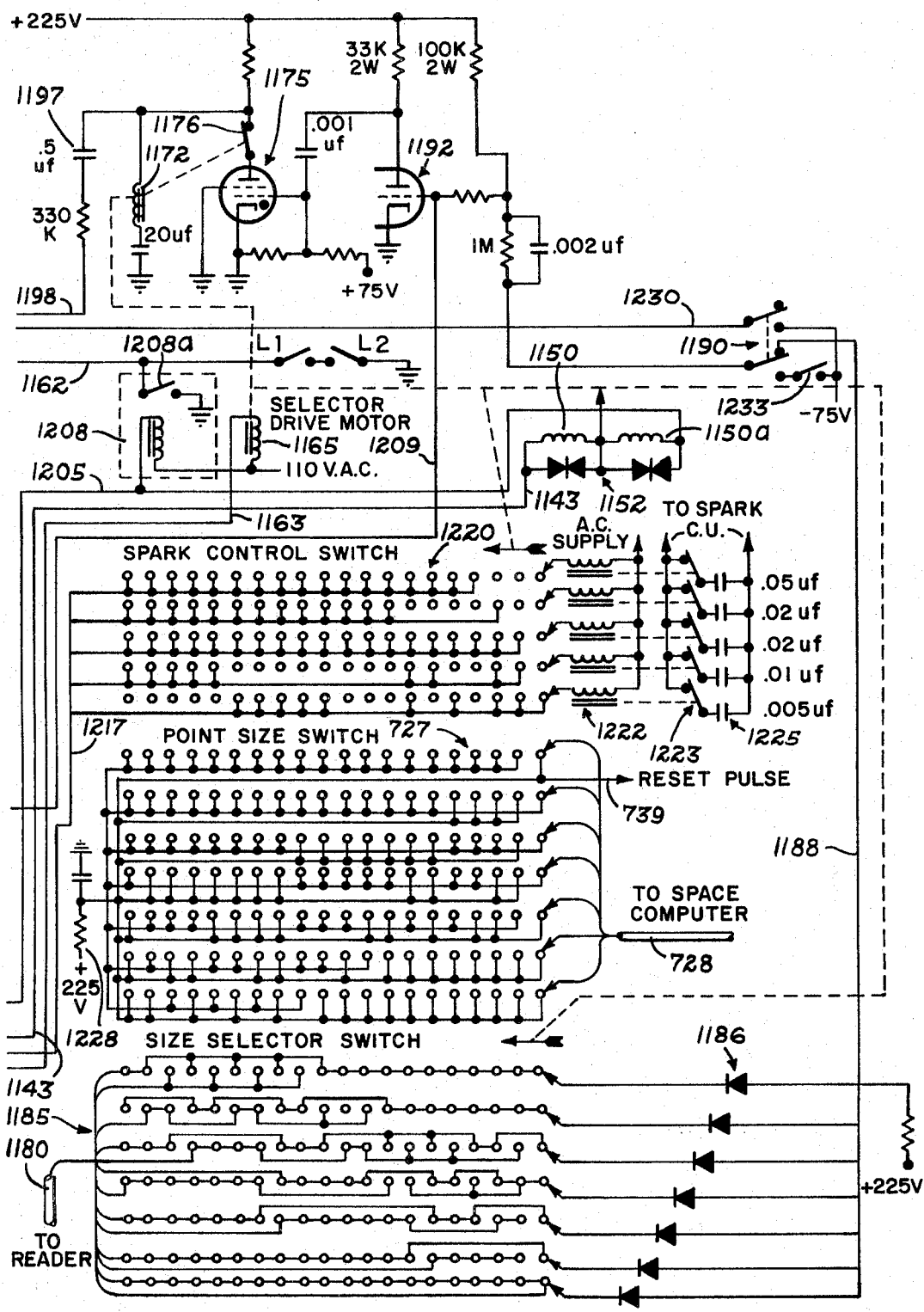

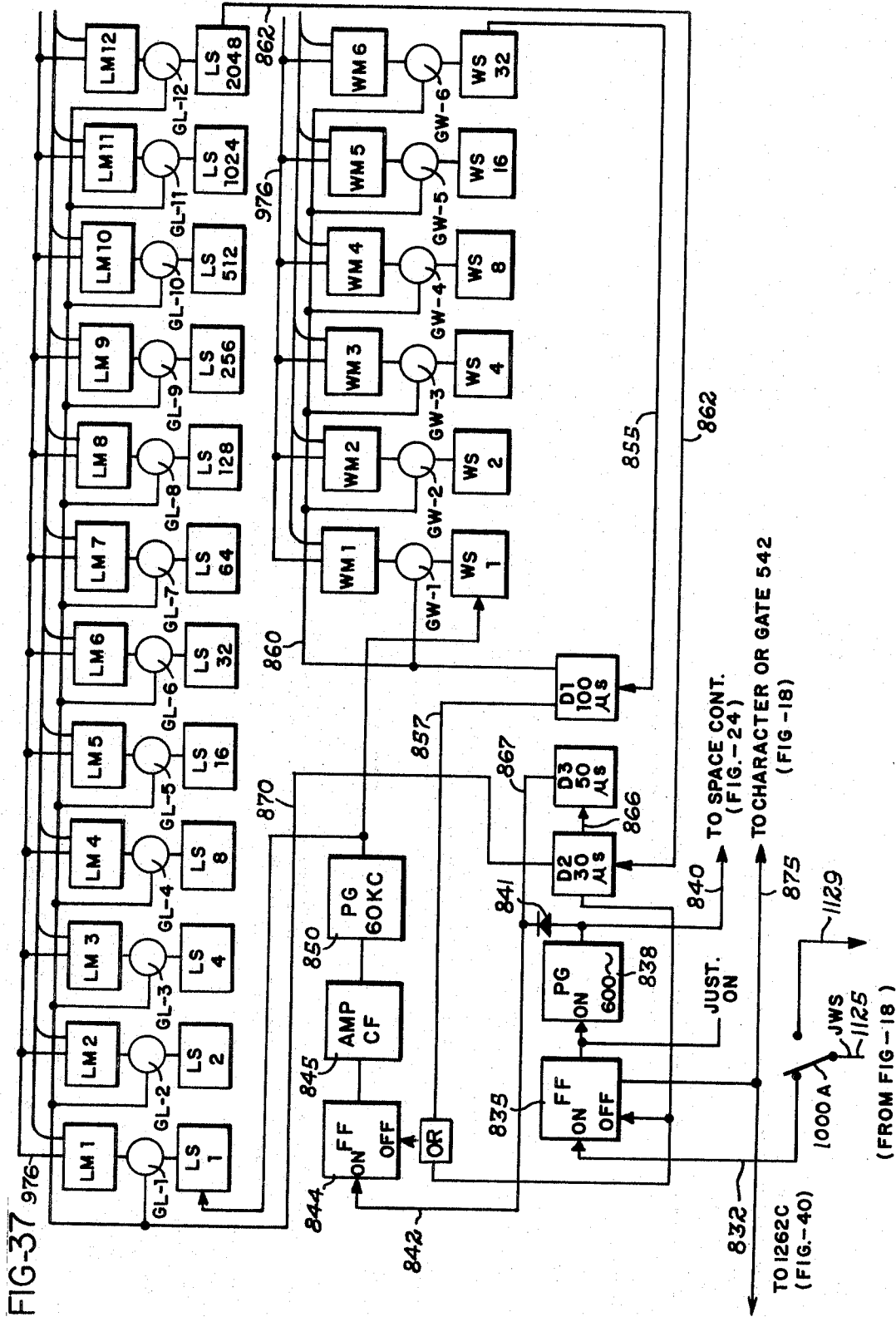

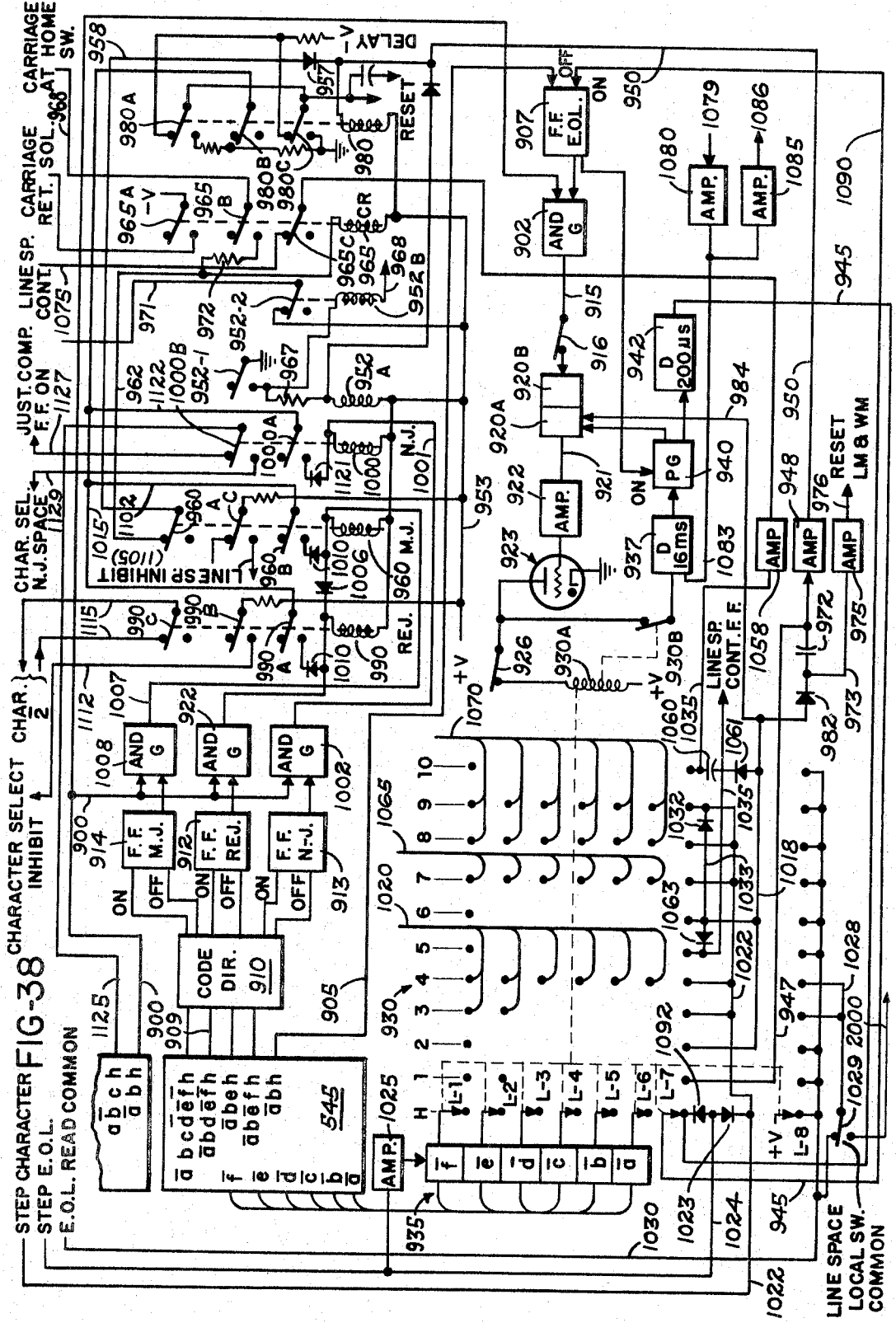

Sept. 5, 1967     R. C. O'BRIEN ETAL     3,339,470
PHOTOCOMPOSING SYSTEM
Filed April 12, 1965     23 Sheets-Sheet 22
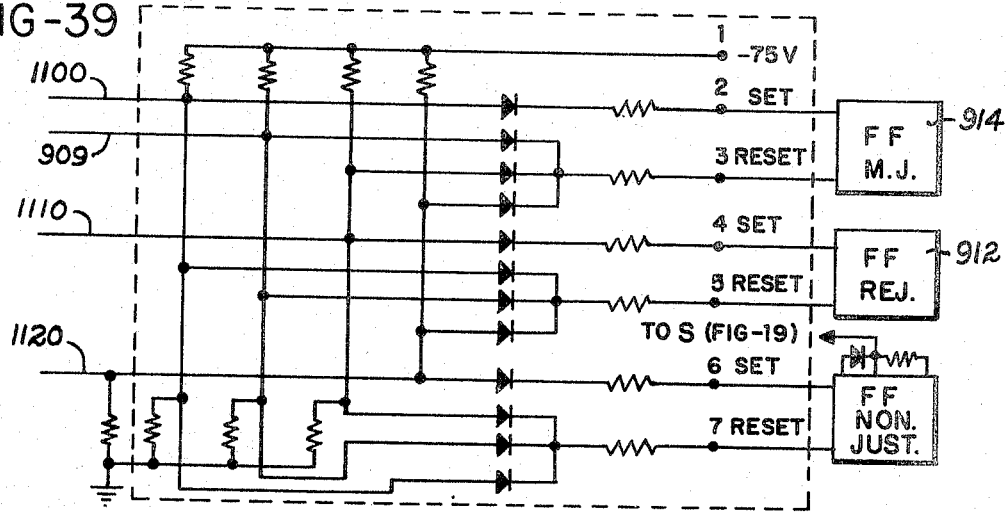
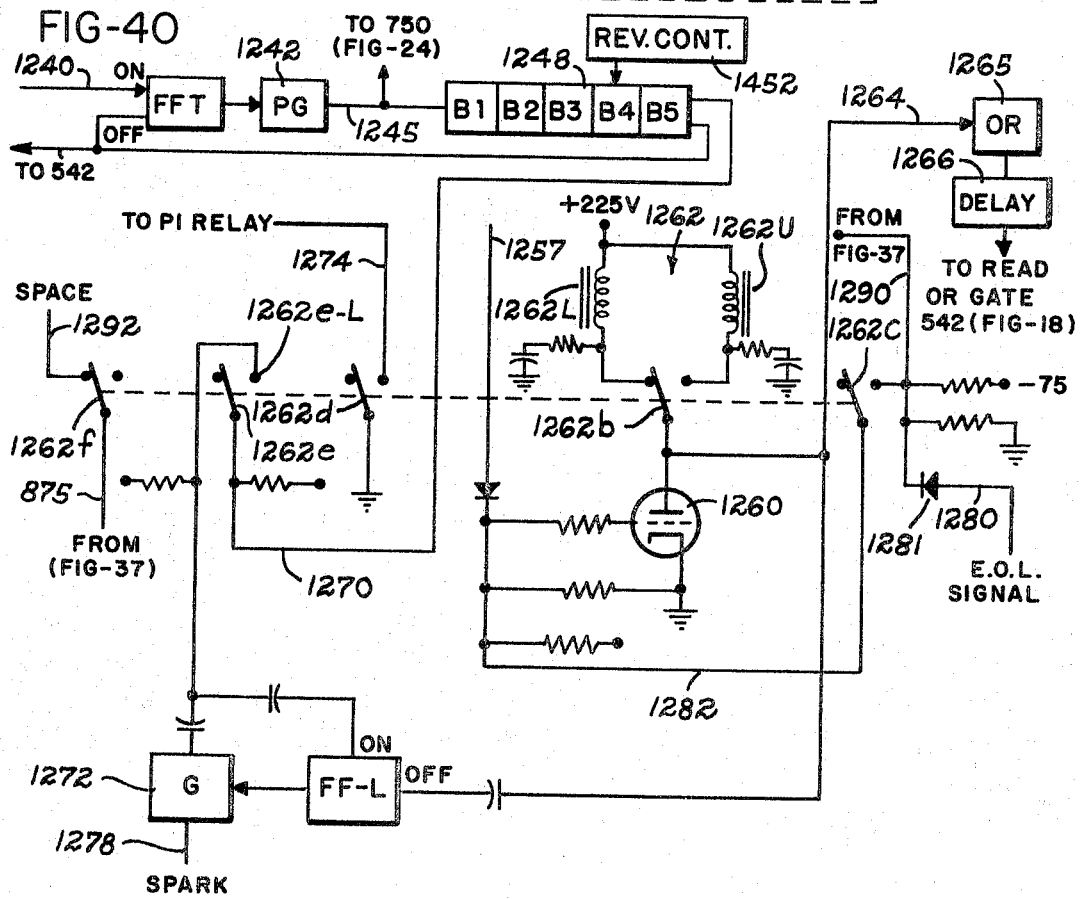

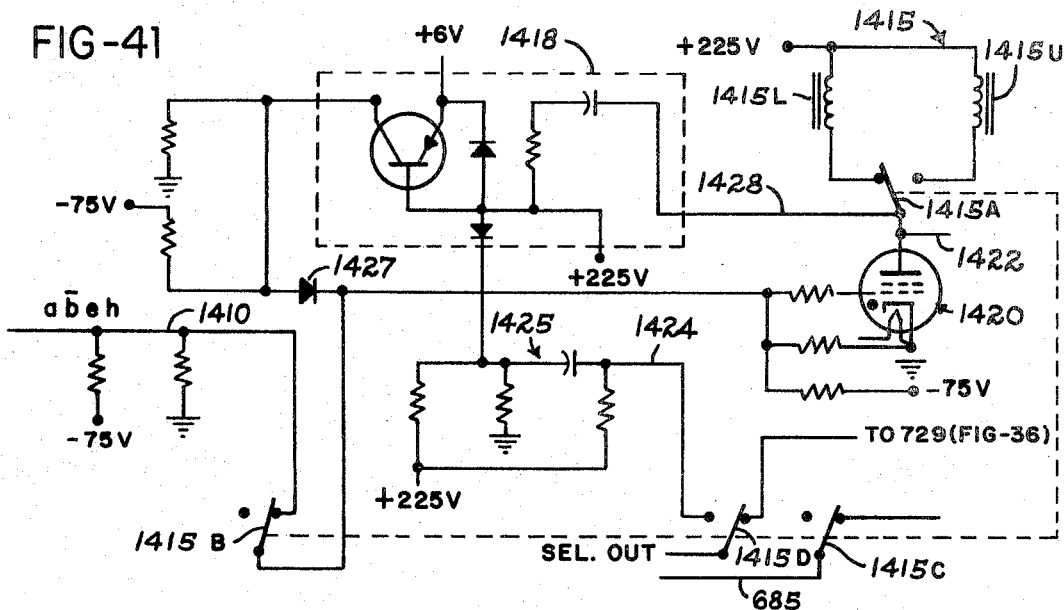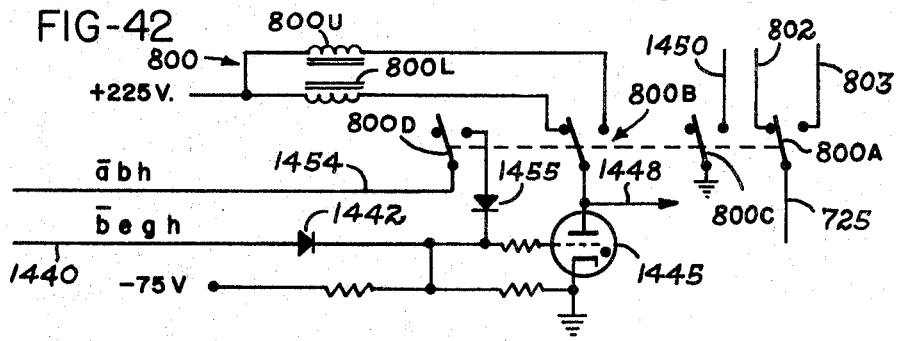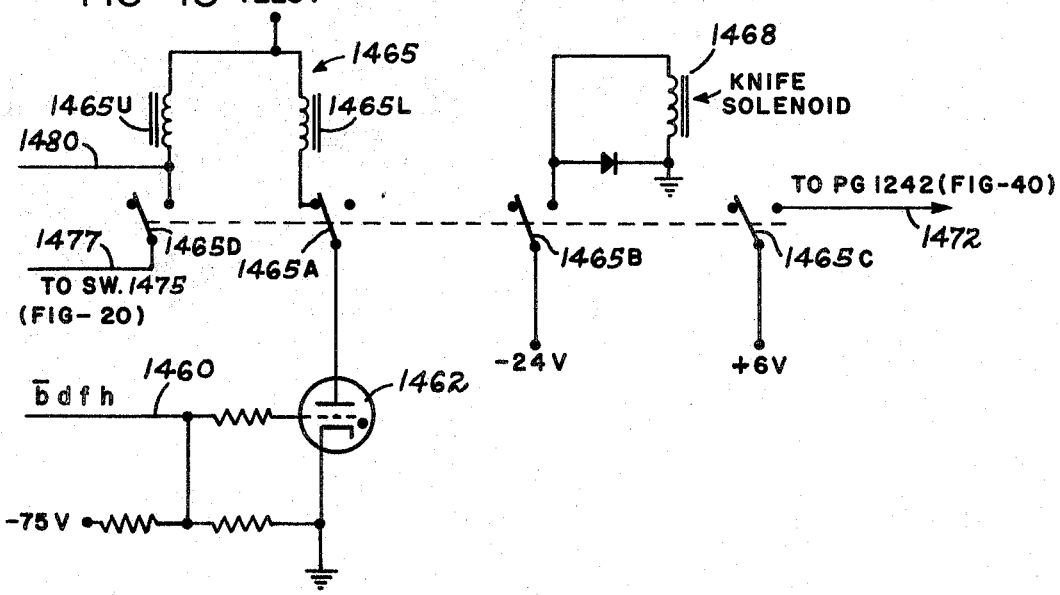

United States Patent Office 3,339,470
Patented Sept. 5, 1967

3,339,470
PHOTOCOMPOSING SYSTEM
Richard C. O'Brien, Huntington, N.Y., and Ralph A. Proud, Jr., Somerset, N.J., assignors to Harris-Intertype Corporation, Cleveland, Ohio, a corporation of Delaware
Filed Apr. 12, 1965, Ser. No. 447,203
29 Claims. (Cl. 95—4.5)

This application is a continuation-in-part of copending applications Ser. No. 214,427, filed Aug. 1, 1962, Patent No. 3,219,806, Ser. No. 294,474, filed July 12, 1963, now Patent No. 3,218,945, Ser. No. 293,483, filed July 8, 1963, now Patent No. 3,219,267, Ser. No. 117,454, filed June 15, 1961, now Patent No. 3,183,806, Ser. No. 286,859, filed June 10, 1963, now Patent No. 3,223,017, and Ser. No. 232,548, filed Oct. 23, 1962, now Patent No. 3,197,-131, which is in turn a continuation-in-part of Ser. No. 39,858, filed June 30, 1960, now U.S. Patent No. 3,141,-395. All of the aforementioned applications are assigned to the same assignee as this application. In addition this application relates to certain features of devices shown and described in U.S. Patents Nos. 3,059,219, 3,099,945, 3,139,803, and 3,141,395, all of which issued to the same assignee as this application.

This invention relates to phototypecomposing, and more particularly to a phototypesetting system incorporating a continuously rotating disc or matrix on which the characters are positioned in predetermined arrangement, and with which there is associated a high speed source of flashing light, the period of which is so short in relation to the travel of the disc that images are projected and recorded on a light-sensitive film free of distortion and accurately spaced to form lines of composition. The lines may be composed through the use of a conventional typewriter keyboard or like input. Information on the characters selected, their order of selection, their size, and the data needed for justification, is compiled and stored in a register or memory. This may be done as the keyboard is operated, or it may be accomplished by an automatic computer operating from a record made by the keyboard. In any event, the information is retrieved from the memory and used to control the instant of flash of the light, to reproduce the desired sequence of character images and word spaces in the prescribed form on the photosensitive sheet.

The system according to the present invention provides for independently operating units, namely a first unit incorporating a keyboard and mechanism which prepares a coded record tape bearing character selection data and the information utilized for line justification, the tape thus functioning as a memory device or register. The second unit receives the tape and under its control provides for the photographing through the continuously rotating matrix of the characters in the proper sequence and with the proper spacing to form the latent image of the assembled line of composition. The speed of operation of the second unit is not limited by the physical capabilities of the composer. Rather, it may operate at relatively high speed to receive and read tape previously prepared by one or more keyboard units, and since its operation is essentially automatic, it provides for economy of labor and improvement in over-all speed of operation.

In view of this division of the system into separate units, which function in a correlated but independent manner, it is possible to adapt the system readily for operation from different types of inputs. For example, the control record or tape can be prepared in part by a computer, which can accept non-justified text information input, and produce an output control record or tape which incorporates the desired justification information, and the like, according to a program set into the computer. Similarly, it is easily possible to adapt the present system to inputs from other forms of record, for example, the well-known TTS (Teletypesetter) tape which is presently used to control automatic typesetting machines of the recirculating matrix type. The information on such input can readily be expanded, as necessary, by suitable converter units which read the TTS input and produce a control tape output capable of controlling the operation of the photographic unit of the present system.

The system employs an economical code arrangement through which complete control may be obtained by the compositor over the point size and arrangement of the line of composition including selection of special characters and selection of the exact proper width for each character of each font. Function controls can also be embodied so that the record tape carries instructions for change of font, change of point size, corrections, kerning, leading, etc. This is accomplished with great economy in the record tape which is the output of the first unit of the system, a code being utilized which has relatively few channels but which provides complete control over the entire composing operation which takes place at the second unit. Thus the system is particularly adapted for transmission of the data produced by its keyboard unit over ordinary telephone or telegraph circuits under high speed conditions, as well as for physical delivery of the tape to remote points as by mail.

One feature of the system is the fact that the record tape produced by the first unit contains coded information as to the selection of a group of characters and the performance of functions by the machine, and the only other data necessary on the record is the space remaining in the line and the number of word spaces among which that space is to be distributed for justification. The tape does not need to and does not carry data or information with regard to either the relative or actual width of the characters, and hence the system does not require transmitting this additional information. Such information is produced as needed during the operation of the second machine and as each character is selected the film is advanced the proper amount to provide unique spacing for that character of that font at the selected point size.

Accordingly, it is an important object of this invention to provide a novel photographic type composition system wherein one or more keyboard operated machines function to produce coded records, for example in the form of binary code punched in a paper tape, providing all the information necessary for the reproduction of lines and paragraphs of composition according to such manipulation of the keyboard, and wherein an independent photographic machine is provided which is capable of high speed operation from such coded record to expose a galley film or the like, and thus produce lines and paragraphs of composition justified as desired, at a rate of operation substantially greater than the rate at which the keyboard machine operates.

Another object of the invention is to provide a photographic type composing system as aforementioned which may comprise several keyboard machines each producing coded records, and wherein the photographic machine is capable of operation at such a rate that it can readily accept and utilize all of the coded records from several keyboard machines.

An additional object of the invention is to provide a photographic type composition system wherein the coded record may contain sufficient information for completely automatic functioning of the photographic machine according to information recorded at the keyboard machine or machines, or optionally wherein certain information may be omitted at the keyboard machine and later supplied by an operator of the photographic machine for purposes of flexibility of control over the galley film which is the end product of the photographic machine.

A further object of the present invention is to provide a novel photographic type composing system which is capable of automatically changing point sizes, including such changes within a line of composition, of automatically changing from one font to another at high speed, of automatically inserting leader characters, or automatically inserting pi characters, or under the automatic control of a prepared record which may be obtained from a separate machine compatible with the photographic machine of the system.

Another object of the invention is to provide a novel photographic type composing system including a photographic machine for exposing characters at high speeds, in the order of more than twenty characters per second, which will result, during text composition as in composing of books, in an output of about 22,000 ems per hour.

Another object of the invention is to provide a novel photographic type composing system wherein individual galley films for the making of printing plates can be obtained automatically through the operation of a film cutting mechanism which functions to sever an exposed section of galley film from a rolled supply of film upon instruction from the record which controls the operation of the machine.

Another object of the invention is to provide a novel photographic type composing system which is readily capable of tabulating operations, with the individual columns being justified or not, as desired, and incorporating suitable leader characters where such is desired.

A further object of the invention is to provide a novel photographic type composing machine wherein leading or line spacing operations are performed automatically at the end of the composition of a line, preferably under the control of a record which is prepared to operate the machine automatically, and during the returning movement of the film carriage in order to minimize the time required for leading operations.

Other objects and advantages of the present invention will become more apparent from the following description, the accompanying drawings and the appended claims.

In the drawings:

FIG. 1 is a perspective view showing the overall arrangement of a suitable keyboard machine in accordance with the invention;

FIG. 2 is a perspective view of the overall arrangement of a suitable photographic machine according to the invention;

FIGS. 3 and 4 are diagrammatic views of portions of suitable coded records produced by the keyboard machine and used to control the photographic machine;

FIG. 5 is a block type diagram illustrating schematically the general arrangement of the character selecting and space computing circuits in the keyboard machine;

FIG. 6 is a schematic diagram of the point size indicator circuit, including the meter which provides a visual guide to the compositor as he composes lines by manipulating the keyboard;

FIG. 7 is a circuit diagram illustrating approximately two stages of one of the counters shown in block form in FIG. 5;

FIG. 8 is a detail view of a computing disc which is shown generally in FIG. 5;

FIGS. 9A and 9B are circuit diagrams illustrating the manner in which auxiliary information and certain function indicating codes are encoded into the circuits of FIG. 5;

FIGS. 10, 11, 12 and 13 are schematic drawings of the keyboard tabulator circuits;

FIG. 14 is a schematic diagram of end-of-line control circuits for the keyboard machine;

FIG. 15 is a schematic block diagram illustrating the general arrangement and relationship of the apparatus and circuits in the photographic machine;

FIGS. 18 and 19 are schematic diagrams of the character decoder circuits and end-of-line (EOL) circuits, respectively:

FIG. 20 is a perspective view, with some parts broken away, illustrating details of the film carriage mounting and drive;

FIG. 21 is a sectional view, on an enlarged scale, taken through the carriage, its mounting, and a portion of the line spacing or leading drive;

FIGS. 22A and 22B are diagrams illustrating the manner in which the stepping motors function, for use in character spacing and line spacing operations;

FIG. 23 is a detail view, partially broken away, of the energy absorbing brake in the stepping motor drive for the film carriage;

FIG. 24 is a circuit diagram of the control for each of the stepping motors;

FIG. 26 is a front elevational view of the disc and optical system mounting, as viewed from the right of FIG. 25;

FIG. 32 is an exploded perspective view showing details of the mounting for the font selector prisms and for the master pi characters;

FIGS. 35A and 35B are circuit diagrams of the automatic size control;

FIG. 37 is a block diagram of the justification computer, including its memory and counter systems;

FIG. 38 is a diagram illustrating the controls for end-of-line (EOL) operation in the photographic machine;

FIG. 39 is a schematic diagram of the code director circuit which is shown in block form on FIG. 38;

FIG. 40 is a schematic diagram of the tabulator control, leader insert control, and pi character insert control for the photographic machine; and FIGS. 41, 42 and 43 are diagrams of controls for selecting characters without spacing, kerning, and cutting the galley film.

*General system*

Figure 16:
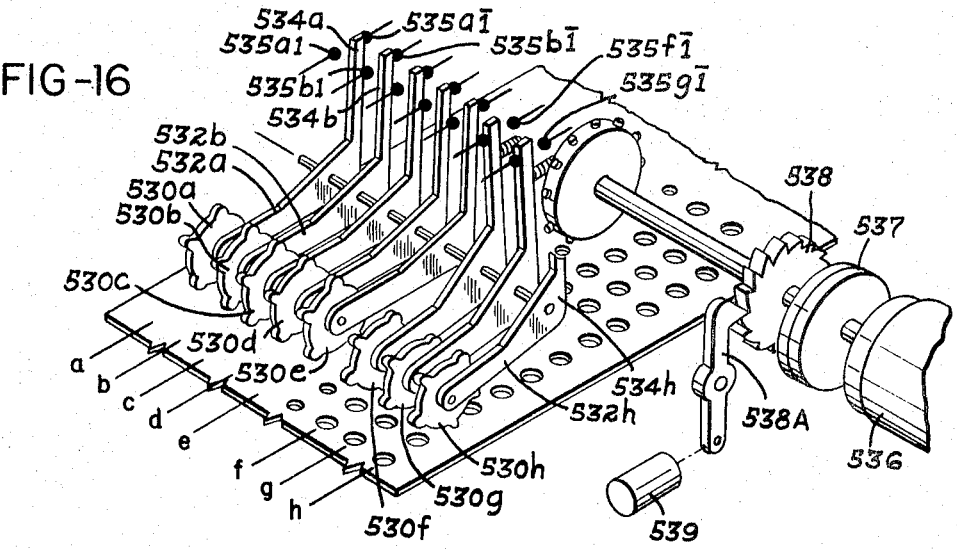
FIG. 16 is a schematic drawing of a tape reading device suitable for use in the photographic machine.

In the present invention a novel and flexible system of phototypesetting is provided wherein a complete record of information relating to selected sequences of characters and interword spaces for forming lines of composition, together with information relating to character sizes, type font, leading, justification information for each line, and other control information, is assembled in the form of a perforated paper tape or equivalent. This record or register is then used to control the automatic photographic machine, which responds to the information on the record and produces the lines of composition in final form upon galley film or the like.

One of the important features of this system is its use of a minimum of information in the record produced from a keyboard control console operated by the composer, to operate the second or photographic apparatus automatically from the prepared record. In the embodiment described herein complete control is provided through use of an eight digit control code. Thus, selective punching or other marking of the tape in any one or more of the eight channels or positions transversely thereof will produce a character selection or function code, as the case may be, which will convey all of the necessary aforementioned information to the automatic photographic apparatus.

With such a code system using a minimum number of digits it is possible to operate with commercially available punching and reading equipment, using standard commercial record tapes. It is also possible to transmit such a relatively low digit code over teletype transmission lines or over certain forms of long distance telephone communications equipment, and thus the system enables the composition of printed material in one location and the actual preparation of the galley and printing plate at any remote location to which the code information may be transmitted.

Also, since the photographic machine is not limited by the manual dexterity and the relatively time-consuming thought processes of a composer, it may be designed to operate at many times higher speeds than an expert typist can operate a typewriter keyboard. Thus, several record preparing or composing machines may be used to prepare different segments of a total composition simultaneously, and the records from these various machines may be supplied to the photographic apparatus in any desired order, with the latter apparatus being capable of maintaining a rate of composition equal to the total rate at which the several keyboard console or composing units are operated.

FIGS. 3 and 4 show a segment of a control record such as used in a system in accordance with the invention, illustrated in the form of a piece of standard paper record tape which may be marked by punching holes therein at any one of eight locations or channels transversely of the tape, indicated by the letters $a$–$h$. Channel $h$ may be employed as a recognition code which determines the function of the code described by the other digits in the same transverse alignment or path. Thus, for example absence of a hole in this channel can be used to indicate that holes in one or more of the other seven channels will be a code identification of a selected character. It is understood that commercial punching and reading devices such as mentioned previously will operate to form or sense all of the digits in a single code word aligned across the record tape.

In a typical system according to the invention one or more tape readers, such as shown in FIG. 16, and explained in detail hereafter, will be used to read or extract information from the record tape. These readers are of the type which provide a definite signal (as contrasted to absence of a signal) corresponding to whether a perforation exists or does not exist in any code. In other words, each channel of the reader has a sensing mechanism which produces one signal when a hole or perforation exists in a code number, and another signal if there is no perforation in that channel in the code number. In the present system if there is no perforation in channel $h$, then a so-called "not" signal ($\bar{h}$) is provided and suitable circuits are arranged, as will be described, to indicate that the code identifies a character. With the eight channel code used, translating this into decimal system means that all binary code numbers having a numerical decimal equivalent from 1 to 128 will be used to identify characters, and code numbers from 129 to 256 (or certain ones thereof) will be used to identify various function operations for the photographic machine.

Some of these codes, for purposes of example, are as follows:

*Functions*

| Channel | (1) a | (2) b | (3) c | (4) d | (5) e | (6) f | (7) g | (8) h |
|---|---|---|---|---|---|---|---|---|
| Skip Tape |  |  |  |  |  | 1 | 1 | 1 |
| Kern |  | 0 |  |  | 1 |  | 1 | 1 |
| Leader |  | 0 |  | 1 |  |  | 1 | 1 |
| Disc #2 |  | 0 | 1 |  | 1 |  |  | 1 |
| Disc #1 |  | 0 |  | 1 |  |  |  | 1 |
| Outer Circle Font | 1 | 0 |  |  |  |  | 1 | 1 |
| Inner Circle Font | 1 | 0 |  |  |  |  |  | 1 |
| Monitor |  | 0 |  |  | 1 | 1 |  | 1 |
| Cut Film |  | 0 |  | 1 |  | 1 |  | 1 |
| Auto. Size Change |  | 0 |  | 1 | 1 |  |  | 1 |
| Tabulate | 1 | 0 |  | 1 |  |  |  | 1 |
| Accept. Line | 0 | 1 |  | 1 |  |  |  | 1 |
| Just. Word Space | 1 | 0 | 1 |  |  |  |  | 1 |

*Characters*

| Channel | (1) a | (2) b | (3) c | (4) d | (5) e | (6) f | (7) g | (8) h |
|---|---|---|---|---|---|---|---|---|
| a | 1 |  |  |  |  |  |  | 0 |
| A | 1 |  |  |  |  | 1 |  | 0 |
| a | 1 |  |  |  |  |  | 1 | 0 |
| b |  | 1 |  |  |  |  |  | 0 |
| B |  | 1 |  |  |  | 1 |  | 0 |
| b |  | 1 |  |  |  |  | 1 | 0 |
| c | 1 | 1 |  |  |  |  |  | 0 |
| C | 1 | 1 |  |  |  |  | 1 | 0 |
| c | 1 | 1 |  |  |  |  | 1 | 0 |
| * |  |  | 1 | 1 | 1 | 1 | 1 | 0 |
| ( |  | 1 |  | 1 | 1 | 1 | 1 | 0 |
| : |  | 1 |  | 1 |  | 1 | 1 | 0 |

*Keyboard machine*

The keyboard machine, as seen in FIG. 1, includes a main keyboard 10 which may be conveniently a conventional typewriter keyboard, and which has a number of keys 12 for selection of different characters, as well as a space bar 13 which is operated in the usual manner whenever an interword space is required. Manipulation of the keyboard produces an ordinary typewritten text on a sheet 15, permitting the operator to observe his work as he proceeds with the composition.

The copy from which the operator reads is conveniently supported in a holder 16, and may be illuminated by a conventional lamp indicated generally at 17.

The keyboard machine also includes an auxiliary keyboard 20 having a number of keys 22 which are manipulated in accordance with different functions desired. To the left of the keyboard there is a conventional tape perforator 25, and the paper tape 27 is supplied from a roll within the housing 28 and passes through the perforator to a take-up spool 29. In between the perforator and the take-up spool the tape is guided over a plate 30 which forms a convenient backing where the operator may wish to write instructions or other information on a portion of the tape.

To the right of the keyboard, there are further controls including a tabulator matrix 35, which is described hereafter, as well as controls 37 for setting in line length information, and controls 38 for setting in line spacing or leading information. A dial 40 below the table surface of the machine provides a point size control while the lever 42 provides a control for shifting computer discs within the cabinet 45 according to different font selection. This cabinet also provides a housing for the electronic and electromechanical gear which is pertinent to the keyboard machine.

As is known, the various characters which make up a font of type are alloted space in accordance with their relative widths. One advantage of phototypesetting equipment is the fact that one master font may be enlarged or reduced photographically, thereby obtaining a variety of sizes of characters of the same font from a single matrix or set of photographic objects. However, such optical change requires allowance for variation in the image size of characters at different enlargements. The present invention achieves this purpose by determining the relative unit width of any selected character and multiplying the width by a point set factor, which is a function of the photographic enlargement or reduction. The product of this multiplication is representative of the actual width of the image of each selected character. The present invention utilizes unit measurement and point set factors selected such that actual widths of individual characters are represented by a digital output in picas and fractions of a pica (hereafter called piclets).

For determining the unit width of selected characters and computing the actual widths, the keyboard 10 is provided with conventional encoding apparatus in the form of conventional permutation switches 46, shown in block form in FIG. 5. Details of this diagram are explained in U.S. Patent No. 3,141,395 and are incorporated herein by reference. There are seven lines 48a–48g from switches 46, buffered into the first seven of eight encoding lines 50a–50h, on one or more of which a suitable electric potential or signal may be applied. The lines 48a–g are also connected respectively to seven buffer amplifiers 25a–25g, and these in turn are connected to preset the individual stages SC1–SC64 of a binary counter 55.

Counter 55 performs two functions:

(a) It cooperates with other circuitry to select the unit space information pertaining to a character identified by an input code through the buffer amplifiers 25a–g; and (b) It cooperates with other apparatus and circuitry in computing the actual space information for each character.

*Space selection*

The unit space information is provided by a six digit binary code formed as light controlling portions on a rotating space code disc 60 driven by motor 63. As mentioned, this apparatus is housed within the cabinet 45. The code is formed by having light transmitting slits (or inversely opaque marks) on the disc 60 in various ones of six code positions or bands at different radii from the center of the disc. The selected unit spacing information is read by flashing a high speed flash lamp 65, through a flash control unit 67, to energize appropriate ones of the six photocells 70, each one of which is positioned in alignment with a respective code position or band. These photocells have individual output lines 72 to the buffer amplifiers 25b–g for presetting corresponding stages SC2–SC64 of counter 55 in accordance with the selected space code.

Accordingly, depressing a key on keyboard 10 sets up a character selection code in lines 50a–g. This code is transmitted to the perforator or punch 25, and causes it to punch a code in the tape 27 which identifies the character selected, after which the punch advances the tape one step. At the same time the selection code passes through the amplifiers 25a–g and presets all seven stages of counter 55 to the identification code number. The unit space code information on the disc 60 is arranged such that the unit space code for a selected character is displaced angularly from a fixed point on the disc by a number of places which is, in the count of places, a complement of the selection code.

This fixed or synchronizing position is determined by a synchronizing mark 72 on a timing and computing disc 75, which is also driven by motor 63 in predetermined relation to code disc 60. Mark 72 cooperates with a synchronizing photocell 77 on one side of disc 75 and a continuously illuminated light source (not shown) on the opposite side of that disc to produce a synchronizing pulse for each revolution of the discs 60 and 75. This pulse is transmitted through line 80 to a gate circuit G1 which in turn is controlled by, and follows, a flip-flop F1. When flip-flop F1 is in its normal "zero" state, G1 is inhibited. When the state of F1 is reversed, G1 is enabled and pulses from line 80 pass through line 82 to a second flip-flop F2. F1 will switch and enable G1 in response to transmission of an initiating pulse through line 83 from the keyboard each time a character is selected by depression of an appropriate key.

The timing disc 75 also has pulse generating marks about its entire periphery, as shown in FIG. 8, in a separate band from the synchronizing mark. The timing marks cooperate with the aforementioned light source and a photocell 85 to generate timing pulses in line 87, which are transmitted to a further gate circuit G2 connected to follow flip-flop F2. F2 is normally in its "zero" state, and inhibits gate G2. Timing pulses will not pass through G2 until F2 is switched by receiving a pulse from line 82 through gate G1. Then, pulses from line 87 will pass through G2 and its output line 90 to the input on stage SC1 of counter 55. Also, a reset pulse will pass through a parallel line 91 to F1, causing it to revert to its normal "zero" state and inhibit G1 again. Timing pulses continue to pass through G2 into counter 55 until it fills up.

For example, assuming that the binary code for a selected character is 00101000, in order to fill up the counter 55 one hundred seven (107) additional pulses must be received, at which time the counter will read 1111111 (recalling that the eighth bit of the code, the last zero, merely identifies it as a character code). The next or the one hundred eighth (108th) pulse will clear counter 55 and cause an output pulse over its output line 94 to the input of a flip-flop F3, and at the same time, a reset pulse through line 95 to reset F2 to its "zero" state, inhibiting G2.

F3 is connected by line 98 to the flash control unit 67. F3 normally holds the flash control unit deenergized, but a pulse through the counter output 94 causes F3 to change its state and a pulse is transmitted through line 98 causing the flash control unit to produce a flash of light from the lamp 65 as the space code information in the one hundred eighth (108th) position past the synchronizing mark 72 is aligned with the photocell readout bank 70.

The pulses generated by one or more of these photocells will be transmitted through the six-wire cable 100 to the respective buffer amplifiers 25b–g, to preset the last six stages SC2–SC64 of the counter. These last stages of the counter now function in cooperation with computing disc 75 to compute the actual space to be occupied by an image of the just-selected character at a given point set.

*Actual space computing*

When F3 changes its state and the flash control unit 67 operates, this also produces a signal in line 102 enabling the normally inhibited gate circuits G3 and G4. The input to counter 55 is now through G3 into the stage SC2, from line 105 which receives impulses from the "units" photocell 107 cooperating with units pulse generating marks 108 (FIG. 8) on disc 75. There is one units mark for each quadrant, or four for each complete revolution of disc 75. Pulses from photocell 107 feed into stage SC2 of counter 55 to accumulate therein and eventually to fill up the last six stages of this counter, which have now been preset to the unit or relative space width of the previously selected character.

The input to gate G4 is from a "piclets" photocell 110 which transmits pulses through line 112 to G4, and when this gate is enabled, to the input line 115 of a reversible line length accumulator counter 118 having twelve cascaded binary stages identified as LC1–LC2048. The piclets input pulses to this counter each represent a discrete fraction of a pica (a standard printer's measurement equalling one-sixth of an inch).

There are a number of different radial zones or bands on disc 75 from which photocell 110 may read selectively, these bands being shown in FIG. 8. Selection is accomplished conveniently by moving photocell 110 into alignment with a desired one of the bands of pulse generating marks 121–125, such that a greater or lesser number of piclets pulses will be generated by the photocell between successive units pulses generated by the photocell 107.

As the units pulses are accumulated in counter 55 it will begin to fill. The number of units pulses required to fill it will be the complement of the unit space code set into counter 55 from the photocell bank 70. When the counter is filled from the units pulses input through G3, then the next units pulse will cause a counter output pulse to F3, and it will revert to its normal state, inhibiting G3 and G4. The total of pulses transmitted through G4 to the counter 118 during this interval will thus be a digital input the sum of which is the total actual space to be occupied by the image of the selected character. This information is stored in counter 118 for each selected character, subsequently receiving space information being added to that already stored in the counter to maintain a summation of the actual space in the line of composition to be occupied by the character images.

Interword space counter

Similarly, every time there is an interword space in the line of composition, the operator presses the space bar 13, and this causes a pulse to be transmitted to an output line 120, which may pass through a part of the auxiliary keyboard 20 for reasons which will be explained hereafter, and thence to the input on the first stage of a word space counter 125, comprising six cascade-connected binary stages WC1–WC32. This counter contains a summation of the number of interword spaces in the line of composition. At the same time, through operation of the space bar 13, a code is set up in the output lines 50a–h, and passed to the perforator 25, to produce a "code word" in the tape 27 indicating presence of an interword space which can be modified to justify the line.

The accumulator counter 118 can be preset to a given line length, by manipulating the controls 37 which are connected to preset at least the last few stages of that counter to the complement of the desired line length in picas. As the space to be occupied by the character images accumulates in this counter, it is added to such complement and the capacity of counter 118 reduces until at the end of the line it contains a binary number which represents that space in the line to be divided among the interword spaces for producing a justified line. This information, as well as the summation in the interword space counter 125, is then transmitted when composition of the line is completed, to the "end-of-line control." Before discussing the details of such control, the manner in which the information is obtained from counters 118 and 125 will be described, as well as the manner in which these counters may be operated in reverse to accomplish erasure and the subtraction of the actual space of the character erased, and reversal for the purposes of subtracting space in a kerning operation.

Erasing and spot kerning

Referring to FIG. 7, the first binary stage LC1 has input line 115 connected to capacitor 131 which in turn connects with both cathodes of the input dual diode. In each stage the plates of the dual diodes are connected to the plates of a dual triode incorporated in a conventional Eccles-Jordan circuit as shown. These plate circuits are also connected through 100 mmf. capacitors to the forward and reverse output contacts 132 and 133 for this stage, which may be alternately connected through the relay switch 135 to transmit carry pulses to the input line 136 of the next stage LC2. In the usual manner, one side or the other of the dual triode is conducting while the opposite side is cut off, and this condition reverses in response to each input pulse received at the input capacitor 131. Thus, the grids of the dual triode are alternately, and oppositely, at a slightly positive potential, and a following connection 137 is provided to the grid of a triode 138 which controls the flow of power through the coil of a relay 140. When triode 138 conducts, relay 140 will be energized to close and prepare a circuit through its contact 142 and a neon bulb 143 to a characteristic output line in the eight-channel output matrix (50a–h) which controls operation of perforator 25.

This circuit is not completed until the end of composition of a line is reached, as by controlling the potential applied to the normally open contact 142 of relay 140, and therefore the outputs are shown schematically from the line length counter 118 and the interword space counter 125, respectively, as output cables 145 and 146 (FIG. 5) which go to the end-of-line control 148. Therefore, although the relay 140 of each stage of these counters may be energized or deenergized a number of times during the composition of a line, only the final setting of these relays, after the line has been completed, is utilized to complete the read-out circuits which then cause coded information to be punched into tape 27 corresponding to the complement of the summation of space occupied by characters from the line length accumulator counter (i.e., the space remaining to be divided up for word spaces) and the number of word spaces in the line from the word space counter. Details of operation of the "End-of-Line-Control" are given later.

In the event that the operator strikes an incorrect character, he may press the correction key 150 on the auxiliary keyboard (FIG. 9A) and this will close switch 151 to obliterate the already recorded character identification code by punching holes in all eight channels (i.e., the rub-out code), since a pulse will be transmitted into each of the lines 52c through the neon tube matrix, a part of which is indicated by the general reference numeral 152. In reading the tape in the photographic machine the character-function reader will then ignore this code and move on to the next identification code. However, it is also necessary to subtract the space information from the accumulator counter in order to maintain the proper summation for arriving at the correct justifying data when the line is completed. This subtraction is provided by reversal of the accumulator counter.

Referring to FIGS. 5 and 7, assume for purposes of explanation that when each stage of counter 118 is in the 0 condition, the output at contact 132 of switch 135 is in condition to emit a positive pulse when that stage changes. Therefore, the output at contact 133 is in condition to emit a negative pulse when the stage changes, and if this stage is in the 1 condition the status of these outputs is reversed. When the counter is static there is no output at either contact, and switch 135 may be moved without disturbing the counter.

The following stages can accept only a negative pulse by virtue of the input diodes (6AL5). Accordingly, with the switches as shown (switch 135 closed on 132 contact), carry pulses from stage to stage can occur only when the preceding stage is going from the 1 condition to the 0 condition.

On the other hand, if all of the switches 135, 135a, etc., are thrown the other way, carry pulses from stage to stage will be effective only when the preceding stage is going from the 0 condition to the 1 condition, and the counter will count in reverse.

Thus, when the operator obliterates the code for an erroneous character by pressing the correction button 150 on the auxiliary keyboard, this will also close switch 156 and energize the reversing relay 155, and simultaneously disable the perforator 25 by a signal through the controlling line 157 while the operator again selects the erroneous character. The apparatus computes again the actual space for the erroneous character and transmits an appropriate number of pulses to the accumulator counter while it is connected for reverse operation, thus effectively subtracting this space from the summation in that counter.

The foregoing description relates to the reversing of the line length accumulator counter for subtracting erroneous space information. It should be understood that the word space counter 125, comprising stages WC1–WC32, is also connected in the same manner as generally illustrated in FIGS. 5 and 7 such that a count therein representing space or spaces between words can be subtracted if so desired. The operation is essentially the same, with the reversing relay 115 being energized from the auxiliary keyboard and the perforator 25 likewise disabled, after the word space identifying code is obliterated. When relay 155 is energized the space bar on the keyboard is depressed once for each word space which it is desired to subtract. The reverse operation of the word space counter is the same as previously described, and thus when relay 155 is deenergized to restore the forward cascade connections between stages of the word space counter, the desired subtraction will have been effected.

Auxiliary circuits from keyboard 20 include those for spot kerning, which is broadly defined as the provision of a less than standard space for a given character image. Kerning control is provided as a technique which the operator or compositor may exercise to decrease the space normally allotted to a given character image at a selected point size. The same reverse operation of the accumulator counter is employed in conjunction with function controls which place upon the record tape a function code (see chart above) indicating that a kerning operation is desired together with an indication of the decrease in space desired for the kerning function.

Thus, the operator may select a given character, at a desired point size, which it may be assumed will be constant for purposes of explanation. Taking the character T as a typical example, and assuming that the operator wishes to kern by placing a portion of a following character *a* beneath the arm of the T, he selects the appropriate key for T and the space to be occupied by this character at the selected point size is computed in the manner previously explained, with the full number of space pulses for T passing into the accumulator counter.

Then, prior to selecting *a*, the compositor depresses the kern key 160 on the auxiliary keyboard (FIG. 9A), and this completes two circuits. First of all, it completes a coding circuit through switch 162 to produce the function code for kerning through the perforator unit 25 onto the tape 27. Secondly, the kern key depression completes a circuit through switch 163 to energize the reversing relay 155. The compositor then depresses one of a bank of space representing keys on the auxiliary keyboard. In a typical embodiment of the invention there may be six space keys 165, 166, 167, 168, 169 and 170, representing, respectively, spaces of ⅓₂ em, 1%₂ em, 1%₂ em, %₂ em, 1%₂ em, and one em. Closing of a selected one of these keys completes a related circuit through the encoding matrix to emit pulses through the appropriate code output lines and preset the selector counter of the space computer to select appropriate relative space information from the space code disc 60. This information is then utilized to reset the selector counter 55 for space computing purposes in conjunction with the computing disc 75, thereby transmitting to the accumulator counter 118 a string of pulses representing the actual width of the kerning at the selected point size. Since the accumulator counter is set up for reverse operation by relay 155, this count is subtracted from the counter.

At the same time that the selector counter 55 was first preset by depression of the desired space key, this information is appropriately passed to the perforator unit 25 which produces a space representing code on tape 27 following the kerning function code. Therefore, photographic apparatus in reading the tape will be informed that the next information following the kerning code represents space to be subtracted in the photocomposing operation to produce the desired kerning.

The operator then selects the character *a* and its selection code is reproduced on the tape and the actual space which this character will occupy at the point size is computed as previously explained with this digital information passing into the accumulator counter, which is set up for forward counting when the kerning key is released.

*Indicator*

In order to give the compositor an indication of the actual space remainder in the line, since his typewritten text 115 may not be a correct guide, a set indicator and read-out is provided to determine and display the line space remainder as composition proceeds. Details of this device are explained in U.S. Patent No. 3,139,803, and are thus incorporated herein by reference. Since the input to the accumulator counter 118 is in terms of actual space occupied by the characters, an arbitrary unit width of an unjustified interword space is enlarged according to the same point set factor which has been previously utilized in computing the actual space occupied by the selected characters. The point set factor is determined by placing the piclet photocell 110 opposite an appropriate band of pulse generating marks (121–125) on the timing disc 75, this movement of the photocell 110 being accomplished by suitable mechanism (not shown) under the control of the dial 40. The same dial is connected to operate a multi-contact switch (FIG. 6) which provides an appropriate electrical potential equivalent to the size of an unjustified interword space in the set indicator mechanism.

In the indicator the space remainder is represented by controlling the amount of electrical current flowing between ground, to which one side of meter 175 (FIGS. 1 and 6) is connected, and a control line 177 to which the other side of this meter is connected. In practice meter 175 may be a one ma. meter having a scale calibrated in "picas remaining," to provide a direct reading of the space not occupied by characters which is available for division among the interword spaces in a line. The last nine stages of counter 118, namely LC8–LC4096, have, in addition to the read-out relays 140, corresponding indicator relays 180 (FIGS. 6 and 7), the contacts of which control connection of resistors 181–189 between the control line 177 and a +225 volt supply line 190.

The meter 175 need not come into operation until the end of a line of composition is near, therefore a bias current is provided by connecting line 177 to a −75 volt supply through a biasing resistor 193. In a similar manner the six stages of the word space counter 125 are provided with set indicator relays (not shown, but in the same manner as relays 180) the contacts of which control the connecton of six resistors 201–206 to a line 208. This line is connected to the center tap 210 of the selector switch (mentioned above) which is operated by the point set selector dial 40. The various contacts of this switch are interconnected with resistors of predetermined values (for example the values shown in FIG. 6) and thus the switch in effect operates in a manner similar to a graduated potentiometer and is indicated by the general reference numeral 212.

On the low side of the switch there is a ground connection, between the forty ohm resistor and the "four point" tap of the switch. The highest tap of the switch, shown by way of example as the "thirty-six point" tap, is connected to a −72 volt variable voltage supply unit 215 which is in turn connected to a suitable source of negative DC voltage. Adjustment of the variable supply unit 215 will increase or decrease the biasing voltage to a desired voltage which is proportionate to the unit value to be alloted to interword space. In the illustrated example the —72 volts is the setting for an interword space of eleven units.

Meter 175 is calibrated to show that amount of actual space remaining in a line that can be used for characters and word spaces. When the needle reaches the zero mark, the line will be justified with word spaces equal to the setting shown on the variable voltage supply control 215. At all times the meter 175 is under the influence of three separate currents: (1) the current through relay contacts in the word space memory, (2) the current through relay contacts in the space remaining memory, and (3) a bias current through resistor 193.

If the operator desires his interword spaces to be of a different size, he can adjust the variable voltage supply 215 to a different unit value of word space. This will change the current through the relay contacts in the word space memory (WSM) and as a consequence the needle of the meter will move to indicate the corresponding space available for more characters. Since the space remaining is in picas and interword spaces are accounted for as numbers, it is necessary to convert the word spaces into picas so that they may be subtracted from the space remaining. This is accomplished by the string of resistors in the selector switch 212. Thus all currents through the meter are directly proportional to picas.

*Tabulating system*

In the keyboard machine the tabulating system functions similar to the tabulating system on a standard typewriter. That is, the carriage can be advanced to a predetermined stop by depressing the "tab" key. In a typewriter movable mechanical stops are arranged to stop the carriage. In the system used on the keyboard machine herein stops in the form of plug-in electronic units are inserted into tabulator matrix 35 (FIGS. 1 and 10) in predetermined positions. When the tab key is depressed, the perforator punches a series of tab codes in tape 27 which will cause the carriage of the photographic machine to advance up to a first predetermined position. Any number of positions or stops may be selected, and each time the tab key is depressed in any one line, the system will function to place the proper number of tab codes in the tape to advance the carriage of the photographic machine to the next predetermined stop. In the present system the stop locations are measured with respect to the left margin in one-half pica increments. Details of the system are explained in U.S. patent application Ser. No. 293,483, filed July 8, 1963, now Patent No. 3,219,267.

The tab code used herein is 10010001, the significant portion of this code number being holes in the *a*, *d* and *h* positions, and absence of the hole in the *b* position or channel. Expressed another way, the tabulate code is 1, $\bar{2}$, 4 and 8. This code is punched during a tabulating operation every time the "one-quarter pica" stage of the accumulator counter passes through a one-half pica count (including zero) relative to the left margin.

The tabulating matrix 35 (FIGS. 1 and 10) is a plurality of columns (five in the present illustration) of four-receptacle female plugs, there being twenty such receptacles for each row providing a possible tab location at every one-half pica increment, with a capacity for a line of fifty picas in length. The compositor or keyboard operator has available to him a number of tab stop plugs 220, each one of which is a small circuit unit such as shown in FIG. 13, having four plug outlets which fit into the corresponding receptacles at any one of the one hundred positions in the matrix. Thus, the operator can insert one or more of such plug units 220 at the appropriate positions, and each time he depresses the tabulate key 225 (FIGS. 1 and 10), the keyboard machine will cause the perforator 25 to punch the tabulate code in the tape the necessary number of times, and a corresponding amount of space used will be transmitted as the corresponding number of pulses into the accumulator counter 118.

FIGS. 10–13 are schematic circuit diagrams of the various units of the tabulating system, showing also their connections into other portions of the keyboard machine. As an example of a tabulating operation, assuming that the first tab stop is desired at two picas from the left margin, one of the plug units 220 is inserted into the "two pica" position (fifth from the top in the first or left-hand column on FIG. 10). When the operator wants to tabulate to this position he merely depresses tab key 225 as he would on an ordinary typewriter. Tube V1A and its associated circuit (FIG. 11) constitute a pulse generator 227 of the blocking oscillator type. This generator is turned off and on selectively by the thyratron control circuit 230 whch includes thyratron V4, also shown in FIG. 11 together with its circuit components.

Normally, thyratron V4 is on or conducting, and holds pulse generator 227 off. When the tab key 225 is pressed, it completes a direct circuit between ground and the plate of V4, extinguishing the thyratron, and this in turn causes pulse generator 227 to begin transmitting pulses through its output line 232. This line is connected to apply pulses to the stage LC1 of the accumulator counter 118, it being understood that one pulse into this first stage of the accumulator counter has a value of 1/64 of a pica.

The output of stage LC8 is coupled through an inverter isolation amplifier (not shown) to the input of an auxiliary one-quarter pica counter 235 (FIG. 13) including the dual triode V2. Therefore, for every one-half pica of accumulated pulses, an output is obtained from the counting binary 235, it being noted that this output includes either of two lines 237 connected through the same type of isolating circuit as described in connection with the reversing counter (FIG. 7) and including the relay switch 238 which is controlled by the correct kern relay 155. It should be noted that "piclet" pulses are available at the input to the first stage LC1 of the accumulator counter from either the pulse generator 227 or the input line 115 in the character space computer system (FIG. 5).

The tabulate code is punched in tape 27 for every one-half pica of space accumulation, during the tabulating cycle only. The pulses available from the output of the auxiliary binary 235 are applied to the control grid of tube V1B (FIG. 11) which forms part of a punch matrix gate circuit 240. Normally, with thyratron V4 conducting, it will clamp gate V1B closed preventing any output to the punch matrix, shown in FIG. 9A. Only during a tabulating cycle is thyratron V4 in its "off" condition, permitting pulse generator 227 to be on and gate circuit 240 to be open. Then, for every one-half pica of space accumulation during a tabulating cycle a positive pulse from gate 240 is applied to the punch matrix, and this will cause the tabulate code to be punched in tape 27, and since the perforator will cycle, it will advance the tape one step at the same time.

The output of the auxiliary binary 235 is also applied through the contacts of relay switch 238 (the kern-correct relay) and through phasing network 244, of which details are shown in FIG. 12, to one of the output lines 244*a* or 244*b*, also selected by the kern-correct relay through its switches 238*a* and 238*b*, and thence to the input of two cascaded indicating decimal counters. Counter tube V5, together with its circuit components, makes up the "units" counter 245, and tube V6, together with its circuit components, makes up the "tens" counter 250. V5 has an output 247 on its 9 cathode which goes to the forward contact of a further kern-correct relay switch 238*c*, and an output 248 on its 0 cathode to the reverse contact of this switch, and the common contact of switch 238*c* in turn leads to the grid of tube V3B in the intermediate carry amplifier 252.

The output of the carry amplifier 252 is directed to switches 238d and 238e, which are further switches of the kern-correct relay, and one or the other of the common contacts of these switches transmits a carry pulse to tube V6 of the "tens" counter 250.

An output is available on any one of the ten cathodes (number 0–9) of each counter tube V5 and V6, corresponding to the actual count in half-picas. Normally, the cathodes of the counter tubes are held at a negative potential, except the one cathode in each tube that is producing an output. This output is a steady state positive DC voltage.

Recalling that in the example a tab stop plug unit is in the "two pica" position in the matrix, if at the beginning of a line the operator presses the tabulate key this will cause pulse generator 227 to begin generating pulses and at each one-half pica advance of the accumulator counter the gate 240 will send a pulse to the perforator, causing the tabulate code to be punched into the tape. When the output of the decimal counter reaches two picas there will be an output voltage on cathode number four of V5 and on the zero cathode of V6. The circuit of the tab stop plug-in unit 220 comprises an AND gate, and it will produce an output from line 255 of the first column of the matrix to the common output line 257 of the matrix which leads to the grid of the tube V3A in a cathode follower circuit 260. The output line 262 of the cathode follower is coupled to the grid of thyratron V4 in the control circuit 230. Therefore, when the count in the pica counter coincides with a tab stop, a positive pulse is applied to the grid of V4 and it will be triggered, turning off the pulse generator 227 and closing the punch matrix gate circuit 240 to prevent further pulses from passing either to the accumulator counter or to the perforator. The tabulating cycle being completed, the thyratron V4 will remain on until the start of the next tabulating cycle. In order to provide for use of more than one plug-in stop circuit in the matrix 35, each such stop unit includes an isolating diode 221 (FIG. 14).

At the end of a line the counters V5 and V6 may be at any condition depending upon the length of line desired. Accordingly it is necessary to reset counter tubes V5 and V6 and for this purpose the relay 265 (FIG. 12) has its switches 265a, 265b and 265c normally grounded, and arranged when shifted by energization of the relay coil to apply a pulse to the number nine cathodes of both tubes, resulting in a preset count of 99 in the counter. Since the first four stages of the accumulator counter 118, and the auxiliary stage 234, are all reset to the "one" condition and the picas counter, as aforementioned, is reset to 99 during an "end-of-line" cycle, one piclet of accumulation will result in a zero condition in both counters. Since the accumulator counter 118 and the pica counter (consisting of the decade counters 245 and 250) must remain in step throughout composition, the pica counter must also be capable of subtracting spaces. The contacts of the kern-correct relays which have been described in the tabulating circuit enable the pica counter to subtract space during kerning or correcting operations.

Tape perforator control

Before discussing the "end-of-line" cycle of the keyboard machine, it is desirable to elaborate upon the construction and mode of operation of the tape perforator 25, particularly the electrical controls for the perforator. The basic construction of the perforator is of known design, and is commercially available. Broadly, it embodies eight individual punches which are aligned across the path of travel of tape 27 according to the eight channels of information. These channels are designated by the letters a through h on FIGS. 3 and 4, and the corresponding lines of the perforator control matrix are likewise labeled a through h on FIGS. 9A, 9B and 14. Each individual punch of the perforator has an enabling solenoid, and these are marked 27a–27h in FIG. 9A. During a perforating cycle energizing of any one of these solenoids will result in its punch placing a hole in the record tape in the corresponding channel.

The power for operating the punches is provided by a motor 275 which is continuously running whenever the keyboard machine is in normal use. This motor has a one revolution clutch 277 on its output shaft which is under the control of clutch solenoid 278. It will be understood that the output shaft 279 from the clutch operates the punches which are controlled by the solenoids 27a–27h, although this is not shown in the drawings. In addition, this shaft is connected to rotate three cycle control cams, the functions of which will be described hereafter. The punch control solenoids are connected in the plate circuits of individual control thyratrons 280a–280h, and the grid circuit of each of these thyratrons is coupled into the eight respective lines 50a–50h which constitute the output of the main and auxiliary keyboards, the former being connected through the diodes 48r which are shown in FIG. 5 and have previously been described. The plate circuit of all these thyratrons 280a–280h is connected through a corresponding isolating diode 282a–282h into the ground line 284 of clutch solenoid 278. Thus, when any one of the thyratrons is conducting clutch 278 will have a connection to ground through it. A switch 285, normally open, is connected between line 284 and ground, and can be closed manually by the operator if he wishes to advance tape through the perforator without punching any holes in the tape.

The clutch solenoid and each of the punch control solenoids 27a–27h is connected to a power supply line 287 which in turn leads to the power control switch 288 operated by cam 290 on the clutch shaft 279. This cam is arranged so that when the perforator completes one cycle of operation switch 288 is closed, providing a power supply through the various solenoid coils to the plate circuits of the thyratrons. When the clutch solenoid 278 is energized and shaft 279 makes one revolution cam 290 will open switch 288, breaking the power supply and extinguishing whatever ones of the thyratrons are conducting, as well as breaking the circuit to the clutch solenoid.

Function codes and controls

The difference between a character selection or identification code and a function selecting and control code punched in the tape is determined by absence or presence of a hole in the h or eighth digit channel. If there is no hole, the code identifies a selected character (or in some cases merely a selected fixed space as will be explained) but if there is a hole in the h channel the code identifies some function to be performed, and may in some cases also provide information that the next following code or codes represents specific information concerning this function. Some of the function control codes have been identified and described previously, for example, the code for correcting, the code for kerning, and the code for tabulating. Also, the fixed space codes identified with switches 165 through 170 have been described with reference to their use in correcting or kerning functions. Some additional function codes and their purpose are as follows.

Referring to FIG. 9A, the fixed space code selecting switches 165–170 have been previously identified, and it will be noted that the common power supply line to the normally open contacts of these switches is also connected to the normally open contact of a double throw switch 300, which has its normally closed contact connected to the encoding lines 50a, 50c and 50h. This combination, together with absence of a hole in the b channel identifies an interword space which should be justified. The common contact of switch 300 extends to the normally open contact of a switch 305 adapted to be closed whenever the word space bar 130 of the keyboard 10 is depressed. This applies a positive voltage through the switch 300 and causes the aforementioned code to be punched into the tape.

If a standard or non-justified interword space is desired, or if for any reason a standard or fixed space is to be inserted in the line of composition, the operator depresses the key on the auxiliary keyboard which moves switch 300 to its normally open contact, thereby applying a positive voltage derived from closing of switch 305 to the normally open contacts of the various switches 165–170. Then, by appropriate closing of one of these switches the operator can insert the code for this fixed space. It should be understood that this is a relative width code, based on ems or fractions of an em, and that this code will in addition to being punched in the tape operate as a selection code and be entered in the selector counter 55, causing a computing operation just as if a character had been selected, and obtaining a product which is the space code so introduced, multiplied by the point set factor. It should be mentioned that in the photographic machine which later operates from this code record, as will be explained, this standard space is again selected and handled the same as any character, the only difference being that when the machine attempts to photograph a character identified by this code there is an opaque portion in the character matrix and no light passes on to the photosensitive material, with a result that a blank space of the desired length appears on the material.

Another function code shown in FIG. 9A is the "skip tape" code which comprises holes punched in the $f$, $g$ and $h$ channels. This is accomplished by the operator pressing the skip tape key on the auxiliary keyboard to close switch 308 and apply a positive potential to those three lines representing the $f$, $g$ and $h$ channels. The skip tape code may be used for any number of reasons, but it is primarily for the purpose of obtaining a length of tape which the reading apparatus in the photographic machine can merely pass over, much the same as it does with the correction code. Thus, it is possible to create areas in the tape which can be available for splicing various sections of tape or for any other reason.

Another function code is the so-called "monitor" code which is obtained by depressing the monitor key on the auxiliary keyboard to close switch 310. This switch is a double-throw type having its common contact connected to a suitable capacitor 311, the other side of which is grounded. The normally closed contact of switch 310 is connected to the lines 50$e$, 50$f$ and 50$h$ in the encoding system or matrix. When the monitor key is depressed, it moves switch 310 to its normally open contact which is connected to a source of positive voltage, thus placing a charge on capacitor 311. Then, when the key is released, switch 310 reverts to its normal position as illustrated and the capacitor discharges to produce the required positive pulse into the encoding lines.

In similar fashion a "cut film" code is provided for instructing the photographic machine to sever a previously exposed portion of photosensitive material from a roll of unexposed material. Switch 315 is controlled by the cut film key on the auxiliary keyboard, and has its common contact connected to capacitor 316 which in turn has its other side grounded. The normally closed contact of switch 315 is connected to the encoding lines 50$d$, 50$f$ and 50$h$, and when the cut film key is depressed, this switch shifts to its normally open contact discharging condenser 316 from the positive voltage source, and when the key is released, the switch reverts to its normally closed position, and the capacitor discharges into the encoding lines.

It should also be noted in FIG. 9A that the tabulate code, requiring perforations in the $a$, $d$ and $h$ channels, is obtained by a positive pulse from the gate circuit 240 (FIGS. 10 and 11) into the appropriate encoding lines 50$a$, 50$d$ and 50$h$.

Another function code which is provided is the point set code, which enables the keyboard machine to form a record using various sizes of magnification and/or mixing fonts in the same line of composition. It will be recalled that the operator can turn dial 40 to move the photocell 110 to the appropriate channel with reference to the computing disc 75. At the same time, this operation moves the center tap 210 of the set indicator selector switch to the appropriate tap on the resistor string 212. A further selector switch 325 (FIG. 9B) is also rotated appropriately by turning the dial 40. Switch 325 may be an appropriate printed circuit switch or the like having a common input line 327 from a positive potential source, into which a normally open "enter" switch (to be described) is interposed. There are five output lines 330$a$, 330$b$, 330$c$, 330$d$ and 330$e$ from switch 325, connected to the encoding lines 50$a$–$e$ respectively.

The circuit for entering the point set code into the encoding lines is shown in FIG. 9B, and includes the "point set change" common line 331 which extends from the normally open contact of a separate "enter" switch 333 to the encoding lines 50$d$, 50$e$ and 50$h$. The common contact of switch 333 is connected to a capacitor 335 which is grounded at its other side. The normally closed contact of switch 333 is connected to a source of positive potential. Thus, capacitor 325 is normally charged and awaiting operation of the circuit. When the operator presses switch 333 to transfer to its normally open contact, capacitor 335 discharges through the encoding lines 50$d$, 50$e$ and 50$h$, causing the "point set change" code to be punched into the tape.

At the same time, this positive pulse is transmitted through a normally closed relay switch 338$a$ into the grid circuit of a control thyratron 340. The grid circuit is normally biased negative to cut off the thyratron, as shown. The relay coil 338 is in the plate circuit of this thyratron and is thereupon energized through the normally closed contacts 338$b$, closing the normally open relay switch 338$c$ which is interposed in the positive potential supply to the common line of selector switch 325. The normally open relay switch 338$c$ constitutes the "enter" switch previously mentioned. At the same time, when the relay is energized, 338$b$ will open to extinguish the thyratron 340.

During the previous cycle of the perforator, entering the change "point size" code, the punch shaft 279 makes a revolution. Thus, cam 344 (FIGS. 9A and 9B) on this shaft closes a normally open switch 345 which is connected between a source of positive potential and the relay switch 338$c$. The timing is such that switch 345 is closed when relay 338 is energized. Depending upon the position of selector switch 325, according to rotation of dial 40, this will direct a positive pulse to one or more of the code entry lines 330$a$–$e$. The code then caused to be punched into the tape will represent the desired point size at which all following characters are to be produced until another point size change code appears in the tape.

Other function codes, identifying different character fonts from which characters are to be reproduced are provided as follows. The photographic machine used in the present system employs at least two rotating character matrix discs, and on each such disc there are two separate font circles, each embodying a complete font, including upper and lower case characters, small capital characters, and the various special characters or signs which make up a complete font. Therefore, the keyboard machine provides encoding circuits for directing the photographic machine to choose between the matrix discs and to choose between the fonts on the discs. When the lever 42 is moved to shift a different computer disc 60 into position, this likewise closes one of switches 350 or 351 and opens the other completing an appropriate circuit from the positive potential source to one of the font selection encoding lines 353 and 354. It will be noted that each of these lines is connected to direct a positive pulse into different combinations of the encoding lines 50$a$–$h$ to the perforator, there being in each case a circuit completed through the eighth or $h$ channel. The resulting code punched into the tape will identify the corresponding disc to be used.

Similarly, the operator will shift the lever 42 in or out to close one or the other of double throw switches 360 and 361, which also have their common contacts connected to grounded capacitors 362 and 363, respectively. The normally closed contacts of these switches lead to a source of positive potential, and thus the capacitors are normally charged. When the appropriate switch transfers to its normally open contact, this causes the associated capacitor to discharge into one or the other of the code entry lines 365 or 366 which lead to appropriate ones of the encoding lines 50a–h. Therefore, appeareance of one of these codes on the tape will cause the photographic machine to shift from one font circle to the other on the disc then in position.

Finally, the operator can control the entry of one of three "end-of-line" (EOL) codes. If the line that he has just composed is acceptable, the operator merely depresses the carriage return button on the keyboard 10. This merely initiates the operation of an end-of-line circuit, which will be described, and causes entry of the "accept line" code, which is 01010001, the significant digits being holes in channels $b$, $d$ and $h$ and absence of a hole in the $a$ channel.

If the operator wishes to reject the line which he has just composed, he closes the reject switch 375 (FIGS. 9 and 15) by depressing the reject key on the auxiliary keyboard. This energizes relay 377 which then locks itself in through its switch 377a, to cause eventually the reject code 01001001 to be entered during the end-of-line sequence, as will be described.

Finally, if the operator desires a non-justified line, for example where he has inserted fixed interword spaces, he can close switch 380 (FIGS. 9 and 15) by depressing the non-justify key on the auxiliary keyboard. This will energize relay 382 which locks through its switch 382a and eventually will cause the non-justified end-of-line code 01000101 to be entered in the tape during the end-of-line sequence.

*End-of-line sequence*

The end-of-line circuits are shown primarily in FIG. 14, although certain of the read-out connections are shown in FIGS. 5 and 7. In accordance with the present system it is desirable that a minimum lentgh of tape exists between the end-of-line codes which identify the ends of subsequent lines. As an example, such a length may be established as that amount of tape containing no less than ten "code words," this term being generic to either character identification or function identification codes as previously described. If the operator should compose a line that uses less than ten such code words, the keyboard machine includes automatic circuits arranged to enter automatically sufficient skip tape codes (00000111) to make up the necessary minimum length of tape. This circuitry is included in the end-of-line circuits, and is built around a stepping switch 400 having the stepping coil 401 and three gangs or sets of multiple sequentially arranged contacts numbered 402a, 402b and 402c. In addition, the coil 401 is arranged to operate on each step thereof, as by an appropriate cam connected to its shaft, a normally closed switch 402d and a normally closed switch 402e.

The switch 402d is connected to the grid circuit of thyratron 405 which in turn has its plate circuit connected in series through the normally closed switch 402e with the stepping switch coil 401. In the perforator (FIG. 9) there is a cam 407 driven by the shaft 279 and arranged to close a normally open switch 408 once for each revolution of the perforator shaft. This switch when closed provides a ground connection on line 410 (FIGS. 9 and 15) which leads to the first contact in the first level 402a of stepping switch 400. This contact is in turn connected to all subsequent contacts around to the tenth. Thus, at the beginning of each line of composition, every time a "code word" is punched into the tape, a ground circuit is completed through the wiper of the first level 402a of stepping switch 400, and this raises the potential on the grid of thyratron 405 (through normally closed switch 402d) causing that thyratron to fire and step the stepping switch 400 one step, during which the switches 402d and 402e are open to extinguish the thyratron and to permit the potential on its grid to lower, due to its connection to the negative voltage source as shown.

So long as the perforator continues to punch at least ten code words into the tape, the stepping switch 400 will advance simultaneously one step at a time. If the operator reaches the eleventh code word, the next advance of stepping switch 400 will move the wiper of the first level 402a to its eleventh contact, which has a separate, and at this time open, ground connection 412. Therefore, if the operator enters eleven or more code words into the tape for one line of composition, the stepping switch 400 will advance to its eleventh contact and remain there. If the operator should stop composing before he reaches the tenth code word, the stepping switch 400 will stop accordingly with its wipers at one of the contacts between one and ten, and will be prepared to fill out the information for that line on the tape with skip tape codes as follows.

When the operator reaches the end of an acceptable line he depresses the carriage return key on the keyboard, and this closes a normally open switch 415 which connects the source of positive potential to the first contact in the first level of a four-level stepping switch 420. This switch has an operating coil or solenoid 421 and four levels or gangs of eleven sequentially arranged contacts numbered 422a, 422b, 422c and 422d. In addition, through a cam or the like (not shown) which is connected to the stepping switch shaft, the coil during each step causes switches 422e and 422f (normally closed) to open momentarily and then close again. Closing switch 415 thus applies a positive potential through the first contact of level 422a of the stepping switch 420, and through its wiper, through the closed switch 422f into the grid circuit of stepping thyratron 425. The thyratron fires and thus energizes coil 421 through the closed switch 422e, stepping switch 420 to its second contacts and at the same time momentarily opening switch 422e in the plate circuit of the thyratron to extinguish it.

If stepping switch 400 is stopped at any of its contacts other than the eleventh contact, a circuit is completed from a source of positive potential through the wiper of the level 422d into its number two contact and thence into the first through tenth contacts (all interconnected) of the level 402c, and through its wiper to the encoding lines 50f, 50g and 50h, causing the skip tape code to be punched into the tape. This action of the perforator, of course, will cause switch 408 (FIG. 9) to apply ground potential through line 410 into the grid circuit of thyratron 405, unless the stepping switch 400 has advanced to its eleventh position. If it has, the stepping switch 400 stops at that point, and the operation of stepping switch 420 continues. If stepping switch 400 has not yet reached its eleventh contacts, a further positive pulse will be applied to the skip tape code lines and the aforementioned sequence will repeat until switch 400 reaches its eleventh position and stops.

When this occurs, ground potential is applied from the eleventh contact in level 402b through its wiper to line 428, and this line in turn leads to the second contact in level 422a, where the stepping switch 420 has stopped until the stepping switch 400 reaches its "ten code word" capacity. Ground potential thus is applied to the wiper of switch 422a through switch 422f to the grid circuit of thyratron 425 and it fires, causing the switch 420 to step to its third contacts. At this point the circuits are prepared to punch the appropriate end-of-line code, signifying whether or not the line is acceptable, and whether or not it is to be justified. As previously explained, selection of the appropriate encoding lines for this purpose has been set up by closing switches 375 or 380 if it is desired to reject a line or to have a non-justified line.

Since the perforator is just completing a punching operation, switch 408 will close again and connect line 410 to ground. This completes a ground circuit through line 430 into the third contact in level 422a, and through its wiper into the grid circuit of the stepping thyratron 425. At the same time, the wiper of level 422b carries ground potential through line 432 holding either of relays 377 or 382 energized, if they had been energized by closing of either switch 375 or switch 380. This maintains an appropriate circuit through switch 377b or 382b into the encoding circuits as shown in FIG. 14.

Assuming that the line has been accepted and should be justified, the switches 377b and 382b will remain as shown, and the "accept line" code will be set up by connecting the line 435 from the third contact of level 422d into the encoding lines 50b, 50d and 50h. The wiper of level 422d is connected to the positive potential source, and thus, when stepping switch 420 moves to its third level, a positive potential will be applied through these lines to the perforator, and the end-of-line code will be entered into the tape. Obviously, if relay switch 377b has shifted by energizing the reject relay switch 377, the code punched into the tape will be the reject code by substituting a positive potential in line 50e for that in line 50d. Similarly, if a non-justified line is desired, relay 382 will have been energized and switch 382b will shift to substitute the positive potential onto line 50f instead of 50d, entering the non-justified code.

As the perforator moves through its cycle, a ground potential again appears on line 410 and to the contacts "three" through "eleven" of level 422a, causing the stepping thyratron 425 to fire and move stepping switch 420 to its fourth position. The circuit between line 432 and ground, through the wiper of 422b, is broken, and relays 377 or 382 are deenergized, if they had been previously set up, and the switches 377a and 377b and 382a and 382b are restored to their normal position.

The fourth position of the wiper in level 422d is connected to apply a potential through line 440 into the common line 442 leading to a printed circuit switch 445 which is located on the keyboard machine, designated by the general reference numeral 38, and preset by the operator to the fractional value of line spacing or leading required. The dial for this switch is calibrated in one-quarter points, and it has a two line output cable 447 which leads into the encoding lines 50a–50f. Depending upon the position of switch 45, at this time a positive potential may be applied to one or more of the lines in cable 447, causing the entering of a code word by the perforator which represents fractional values of the desired line spacing.

In the event that there is no fractional value, the positive potential will still be applied through line 442 and diode 443 into a common encoding line 444 which leads to the encoding circuit line 50g. A hole in this position of the tape during the end-of-line code is meaningless, but it provides a nominal code word for the reader of the photographic machine which it can perceive and ignore, causing the reader to advance. Again, as the perforator goes through the cycle a ground circuit is completed through line 410 and the stepping switch 420 moves to its sixth position, wherein a positive potential is applied to the wiper of level 422d, to line 450 which in turn is connected to the common line 452 of the line spacing printed circuit switch 455.

This switch also is located on the keyboard, and is calibrated in increments of full points of leading and the output from switch 455 is a six line cable 457 which also leads to the encoding circuit lines 50a–50f, causing the appropriate code word for the selected leading value to be entered into the tape. If for some reason there is no value for full points of leading, then in any event a potential is applied through diode 458 and line 444 into the seventh encoding circuit 450g, for the same purpose described.

When the perforator goes through its cycle, the ground circuit through line 410 is again completed to fire thyratrons 425, and stepping switch 420 moves to its sixth position, where a positive potential is connected through line 460 which is the common input line to the code entering switches WC (FIG. 14) which are controlled by the following relays connected to the six stages of the word space counter 125. Thus, the six lines shown leading from these switches through the encoding circuit lines 50a–50f constitute the six line cable 146 (FIG. 5) which provides the read-out from the word space counter. For each one of the stages of the word space counter which is in the "zero" state, there will be a corresponding WC switch which is closed, and it will be seen that the appropriate code number for the line is now caused to be entered into the tape and will identify the number of word spaces in the line. A pulse from line 460 also passes through diode 462 into the line 444, in the event that for some reason there is a line without any word spaces.

The next cycle of the perforator completes a ground connection through line 410 and steps switch 420 to its seventh contact. This completes a circuit through line 465 which supplies a positive voltage to the common line of the read-out switches (such as switch 142) associated with the six lower stages of the accumulator counter 118, i.e., stages LC1–LC32. The resulting code impressed on the encoding lines 50a–50h represents fractions of a pica available for distribution among the interword spaces for justification, also expressed herein as "piclets remaining." At the same time, in the event that there are no fractions of a pica in the space remaining, line 465 is coupled through diode 467 to the common encoding line 444 for the same purpose as previously explained. Entry of the piclets remaining code by the perforator causes it to go through its complete cycle, and again a ground circuit is completed through line 410 to advance the stepping switch 420 to its eighth position.

In the eighth position the wiper of level 422d completes a circuit from the source of positive voltage to line 470, and this line leads to the common connection of the six read-out switches associated with the six higher stages of the accumulator counter, i.e., stages LC64–LC2048. The stage LC64 is the so-called "one pica" stage, and thus this upper section in the counter represents the space remaining in whole picas. Appropriate ones of these switches will be closed to enter the code in the encoding circuits 50a–50h and the perforator will again go through its cycle, and complete the ground connection through line 410, causing the stepping switch 420 to advance to its ninth position or contact. Line 470 is connected to line 444 through diode 472, for the same purpose as the other connection to line 444.

In level 422d the ninth, tenth and eleventh contact positions are all connected to the encoding line for the skip tape code. Accordingly, the circuit automatically enters three skip tape codes into the tape, providing some area on the tape which may be used for splicing at the end of a line, and after the third such entry stepping switch 420 returns to its home or first position and stops. This completes the end-of-line cycle.

Accordingly, from the foregoing it will be seen that an end-of-line code, as shown in FIG. 4, includes nine separate "code words." The first is the end-of-line signal. The second and third code words are the fractions of points and the full points of line spacing or leading information. The fourth code word is the number of interword spaces to be justified. The fifth and sixth code words are the piclets and picas available for justification, i.e., for distribution among the interword spaces. Finally, the last three code words are the skip tape codes which leave an area in the tape as mentioned.

Thus, it will be appreciated that the product of the first or keyboard machine is a perforated eight channel tape (or equivalent) which is a complete record of all information necessary to provide justified lines of composition, whereby a photographic machine (to be described) can read this record tape and automatically produce justified lines and paragraphs of composition. The record tape is, so far as the reading mechanism is concerned, a "clean" record. In other words, the reading mechanism will ignore any correction or rub-out codes and any lines which have been indicated as unacceptable, and reading mechanism can be arranged to pass over such information at a high rate of speed if so desired.

Photographic machine

The photographic machine is designed to operate with a minimum of operator attention. It reads the code information from the tape or tapes 27 and projects onto suitable photosensitive material correctly sized images of the selected characters, in their order of selection. It causes a spacing movement between the character field in the projection system and the photosensitive material for each character image, according to the actual width of the character image focused on such material. The photographic machine also produces the required spacing operations for functions such as kerning, justifying, tabulating, leader insertion, and other required standard spaces. The machine reads the "end-of-line" information on the record tape and from it determines, computes, and transmits the necessary spacing information for line spacing or leading and for the sizes of justified word spaces to produce justified lines of composition where such is desired. It also performs automatically such functions as font change, size change, and film cutting.

Referring to FIG. 2, the overall configuration of the photographic machine includes a base cabinet 500 in which the electric gear, including appropriate computers, power supply, amplifiers, gate and pulse generator circuits, etc., are housed in suitable mounting racks (not shown). Above the base cabinet there is a further cabinet 502 having an end access door 503, which houses the character font discs, the optical system including the flashing light source and lenses, and appropriate mechanism, to be described, for changing font discs, and altering the position of the lenses to achieve desired image sizes, etc.

On the front of this upper cabinet there is a supply reel 510 on which record tape 27 is placed for use by the photographic machine, and opposite the supply reel there is a suitable take-up reel 512. The tape passes from the supply reel to a first reader 515, which is referred to hereinafter as the "EOL" reader, signifying that it searches for and reads end-of-line information. The tape can form a loop 517 of varying size beyond the first reader 515, after which it enters the second reader 520. This is the character and function code reader which controls the operations of the photographic machine other than those operations connected with an end-of-line cycle. Also mounted on the front of cabinet 502 are two rows or banks of switch buttons 525, providing manual controls which may be manipulated by the operator for various purposes, as will hereafter be described.

To one side of the above-described cabinets there is a photographic cabinet or booth 527, provided with an access door 528 through which the operator can enter cabinet 527 to remove exposed pieces of photosensitive material or film, which are the products of the photographic machine. Within the cabinet 527, at the junction thereof with the cabinet 502, there are suitable mountings for the spacer carriage which controls the spacing movement between the optical system and the photosensitive material or film.

The readers 515 and 520 are basically of the same construction, are known commercially as "star wheel" readers, and may be of the type disclosed in U.S. Patent No. 3,027,072. The readers used in the present machine are capable of handling information from eight channels, i.e., the channels $a$–$h$ on tape 27. Referring to FIGS. 15–19, there is a toothed reading wheel 530$a$–$h$ for each channel, and the pitch of the teeth on each wheel corresponds to the pitch or spacing between successive code words on tape 27. The wheels are each, independently, rotatably mounted on one arm of a bell crank or lever 532$a$–$h$, and these levers are urged by springs to carry the associated star wheel into contact with the tape. The levers are independently mounted on a pivot axis as shown in FIG. 16, and another arm of the lever provides a common contact 534$a$–$h$ of eight double pole switches, having spaced pairs of contacts 535$a$1–535$h$8 and 535$a\bar{1}$–535$h\bar{8}$.

Each of the readers operates in essentially the same way. Every time that the reader reads a code word it transmits an appropriate code to its corresponding decoder circuit, and unless delayed, this also sends a tape step signal to its stepping control. The power to drive the tape is derived, in each reader, from a motor 536 (FIG. 16) driving through a slip clutch 537 a ratchet wheel 538 which is normally held against movement by a pawl 538$a$ controlled by the solenoid 539. This drive is caused to advance one step by pulsing the solenoid 539.

In the character reader 520, a read pulse is passed at the appropriate time to the common input connections of its switches, and thence into the decoder circuits according to the setting of the reader switches at that time. This will cause the decoder circuits to produce an appropriate output and a signal is routed either to the character selector or to the appropriate one of the function control circuits, and a step signal is sent to the reader solenoid causing the reader to step to the next code and wait. Then, when the appropriate character is selected and its spacing completed, or the function completed, a "go ahead" signal is transmitted to the OR gate 542 (FIG. 18). The output of this gate circuit drives a read pulse generator 543 which has two output lines. One line 543A leads to the common contact connections 534$a$–$g$, and the other leads to the common contact connection 534$h$ via the automatic point size control, as later described. In the reader 515 the read signals are in the form of gating signals, as will be described.

Figure 19:
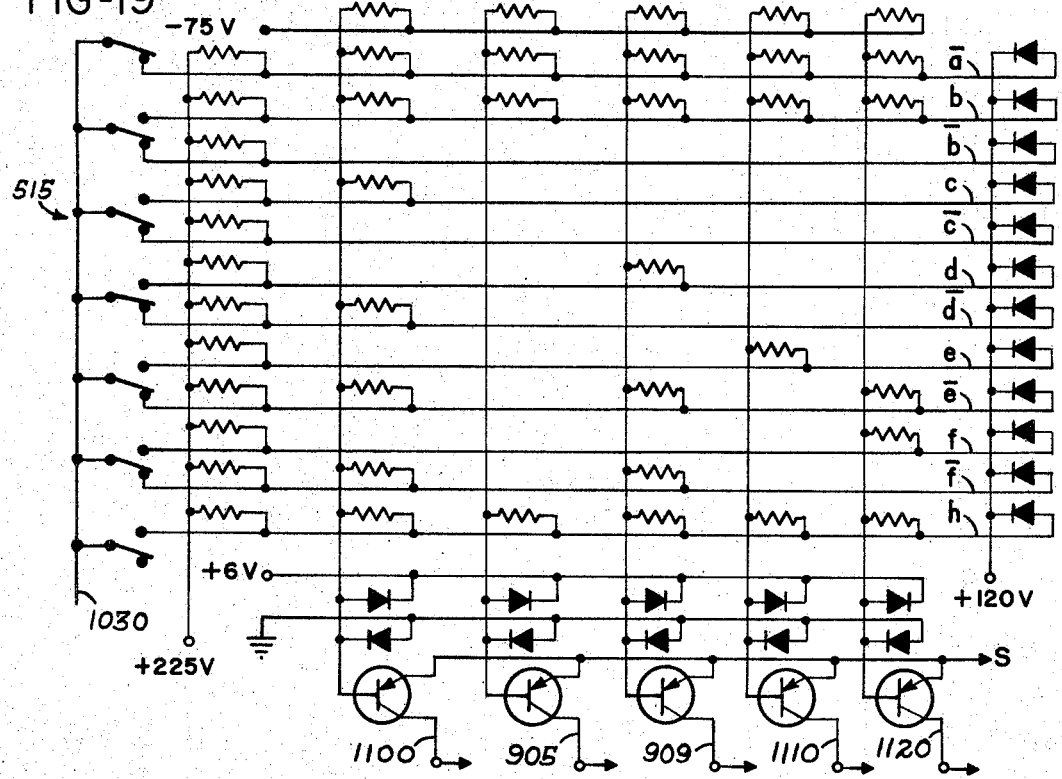

Thus, any code word on the tape will comprise a hole or absence of a hole in the channels $a$–$h$, and the common contacts 534$a$–$h$ will complete appropriate circuits to one or the other of the contacts. The tape 27 passes first through the reader 515 which is arranged to pass all code words except the "end-of-the-line" codes, which indicate an accepted line or a rejected line. The output contacts of reader 515 are connected through a cable 540 to an end-of-line decoder circuit 545 (FIGS. 15 and 19). This circuit includes appropriate controls for the escapement solenoid of the reader 515, and thus this escapement will continue to be pulsed and tape will continue to advance through the reader 515 until one of the three aforementioned codes appears in the reader. At this time the reader will stop and await a further signal.

The reader 520, the "character reader," also has its outputs connected through a cable 550 to a separate character decoder circuit 555. This circuit includes controls for the stepping solenoid of the drive in reader 520, and these likewise are arranged to stop the reader 520 whenever one of the three "end-of-line" codes appears in the reader. Therefore, the reader 520 will stop, for example, one the end-of-line codes for a previously composed line, and the reader 515 will be stopped on the end-of-line code for the line which is recorded on the loop of tape between the readers, as shown particularly in FIG. 15. This loop will include all the necessary information to compose the line of composition which is recorded on the loop of tape between the two readers.

Before describing in detail the various forms of apparatus and circuits in the photographic machine, it is desirable to outline in a general way the function of the end-of-line reader 515 and the corresponding decoder circuits 545. Details of these circuits and their operation are described later. Briefly, there are six significant code words in the end-of-line information. The first code word at which the reader 515 stops, informs the machine whether the line which preceded this information through the reader 515 is or is not acceptable, and whether the line if acceptable should be justified or not. The next code word represents fractions, in quarter points, of line spacing or leading, and this information is decoded and passed to the two lowest stages of an eight stage leading counter 560. The third code word read by the reader 515 and decoded is passed to the six higher stages of the leading memory and is used to preset the leading counter for values of one point or more of line spacing desired.

The fourth code word represents the number of interword spaces, and this is decoded through the circuits 545 and passed to the six stage word space memory 562 which is used to preset the six stage electronic counter 565. The next following code word represents the space available for distribution among the interword spaces for justification purposes in terms of fractions of a pica, or piclets. This information is transmitted from decoder 545 to the first six stages of a twelve stage length memory circuit 567 which is used to preset the length counter 570. The final or sixth code word represents the available space for justification in one or more picas, and this information moves to the last or highest six stages of the memory circuit 567.

This is but a brief description of the operation, and that in fact the end-of-line decoder circuits 545 include controls for initiating certain operations of the machine while portions of the foregoing sequence are performed by the circuits included with the decoder circuits, including controls for directing the information from the various code words to the various aforementioned memory circuits. When the scanning of the end-of-line information is completed, a "go ahead" signal or pulse will be transmitted to the character reader 520 and it will commence scanning and reading of the character code words on the tape. The reader 520 is caused to step along with reader 515 through the end-of-line codes for the preceding line upon which it stopped, as previously mentioned. Therefore, at this time reader 520 is prepared to read the first character code in the accepted line for which the end-of-line information has just been decoded and disseminated to the various memory circuits.

*Character selection*

It will be assumed for purposes of explanation that the proper character matrix disc is in position and that the proper font and size (point set factor) have been determined, and that the photographic machine is prepared to select and photograph the character images in succession. Details of the manner in which these various functions can be performed to change point size or font matrix discs, and various other function control circuits, will be described hereafter.

As mentioned, the readers will present possible outputs on their contacts according to the position of the corresponding star wheel, and for every code word there will be a possible completed circuit through each lever arm 84a–84h, differentiating between presence and absence of a hole. In the character reader 520 not all of the available output circuits are required for decoding, however. Note in FIG. 18 that no circuit is used for $\bar{c}, \bar{d}, \bar{e}, \bar{f}$ or $\bar{g}$.

Each time the reader 520 presents a code word, the decoder 555 will read and decode this code word and distinguish between a character identification code and a function controlling code. Basically, the difference between these two types of codes is determined by the presence or absence of a hole in the channel 10h, i.e., an $h$ or a $\bar{h}$ signal.

Referring to FIG. 18, it will be noted that such a condition is represented by a completed circuit between the contact arm 534 and the $\bar{h}$ contact, identified as 535h$\bar{8}$. Presence of a $\bar{8}$ signal (no hole in channel $h$) will determine that the code word pertains to selection of a character. Conversely, presence of an 8 signal determines that the code word is for some function control. Various ones of the functions are noted as legends over the corresponding circuit output lines shown in FIG. 18. For example, the EOL circuit, which is the end-of-line signal, is represented by completed circuits from $\bar{1}$, 2 and 8. These are the significant digits of the end-of-line code word.

Assuming for purposes of explanation that a character code is presented to the reader 520, then appropriate signals will be presented on one or more of the character code output circuits which are identified in FIG. 18 as 580a–580g. Each of the decoding circuit lines is connected through a transistor amplifier, one of which is shown schematically at 582. The seven selection output lines from these amplifiers pass through cable 585 to a character selector circuit described hereafter.

Figure 27:
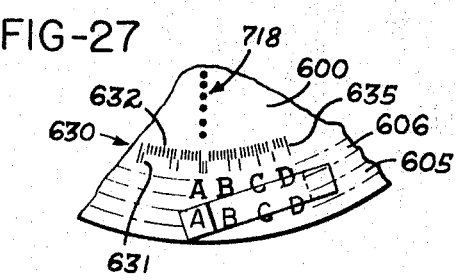
FIG. 27 is an enlarged view of a segment of one character disc, showing the general arrangement of the two circles providing different fonts, the selection code, a portion of the relative space code, and the relationship of the font selector prism with respect to the disc.
Figure 30:
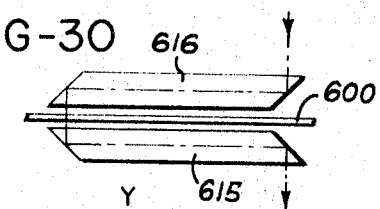
FIG. 30 is a diagrammatic view showing the manner in which a single light source is used in cooperation with the multiple font circles.
Figure 33:
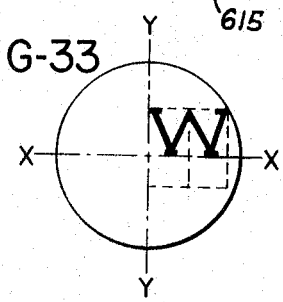
FIG. 33 is a diagram of one lens of the optical system, showing the general relationship of the character image bearing beams and the lenses.
Figure 28:
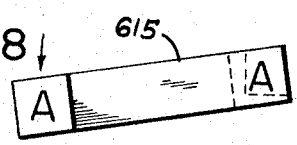
FIGS. 28 and 29 are views illustrating the positions of the font selector prism as used in projecting images of master characters from the different font circuits on the disc.
Figure 29:

Referring to FIGS. 15 and 27, the character matrix disc is in the form of a generally opaque plate 600, having a plurality of font rows, shown as two in number, 605 and 606. The characters in each row are aligned on a predetermined radius of the disc with corresponding characters in the other row, such that a single selecting signal will be sufficient to select a character from either row. The characters are formed as light transmitting or shaping areas, and a light beam is formed from a high intensity, short duration, flash light source 610, for example a spark gap formed by a pair of electrodes as shown, and this light is shaped into a beam by a lens 612 which passes it into a first light controlling prism 616.

The beam of light is then directed, according to the position of the prism 616, to one or the other of the character rows 605 or 606, and as it passes to the selected character it emerges from the other side of the disc 600 shaped as an image bearing light beam which passes into the prism 615, along the optical axis of the machine through a pair of size controlling lenses 620. These lenses focus a character image of the desired size in a predetermined image plane. As will be explained, the image plane is always the same distance from the disc 600, regardless of the magnification of the character image from the master character on the disc. In this image plane there is supported a sheet of photosensitive material 625. This material may be any suitable high speed photographic film or paper or the like, for forming a final negative or positive image, as may be desired.

The selection code for the various characters is provided in the band 630 (FIG. 27) immediately inside the two font bands on disc 600. This code consists of, for each character, a series of seven pulse generating marks in one of two different radial bands 631 and 632, followed by a reset mark 635 formed in both selection beams or paths. If there is a selection code mark in one of the bands 631 or 632 there is a corresponding space or absence of a mark in the same position in the other band. Thus, these two bands form a binary code address arrangement in which pulse generating marks in band 631 can be considered as "one" pulses and marks in band 632 considered "zero" pulses. Cooperating with each of these bands is a light source 638 (FIG. 17), and the rays of light from the two lamps of this source can pass through the marks in the respective bands to create electronic pulses from the selector photocells PC–1 and PC–0. The outputs of these two photocells pass to the character selector circuits, indicated generally at 640 in FIG. 15. Details of the selector system and circuits are explained in U.S. Patent No. 3,059,219.

Figure 17:
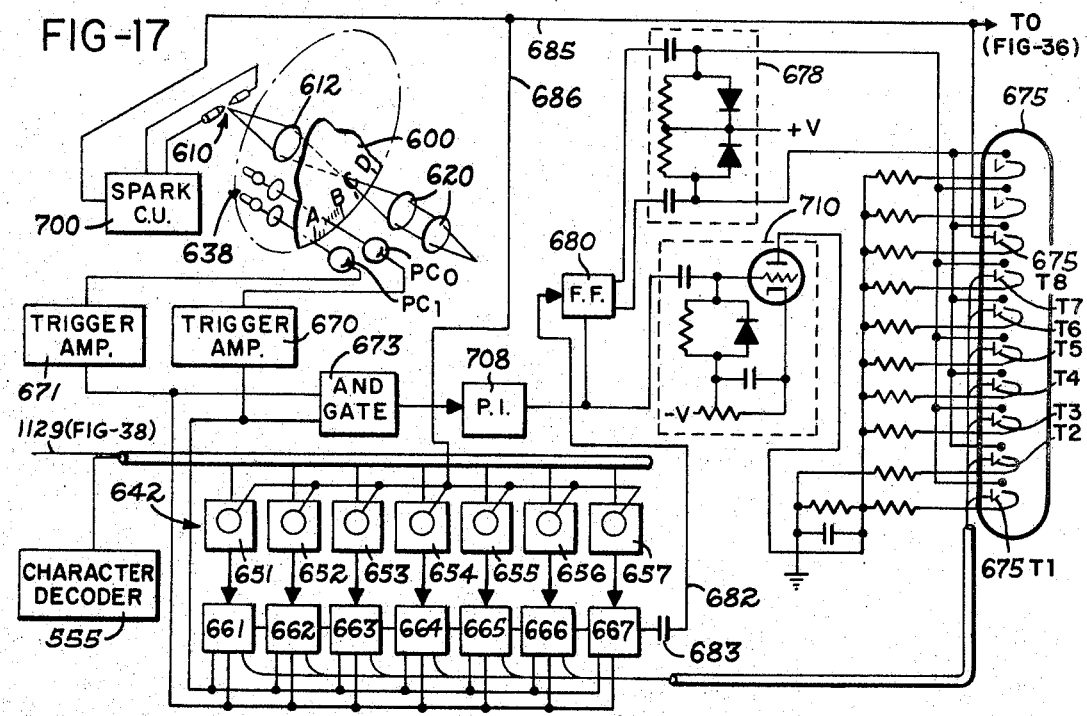
FIG. 17 is a diagram of the character selector circuits in the photographic machine.

Referring to FIG. 17, the character selector includes a seven stage memory or temporary storage circuit 642 including individual gate circuits 651–657. Each one of these gate circuits is coupled into a corresponding comparing circuit 661–667, and these circuits in turn have inputs from the trigger amplifiers 670 and 671 which receive pulses from the selector photocells PC–0 and PC–1, respectively, the outputs of each of the amplifiers 670 and 671 are likewise coupled to AND gate 673 for resetting purposes.

Each of the comparing circuits 661–667 are connected in a switching circuit which includes a magnetron beam switching tube 675, of known construction, which is shown schematically in FIG. 17. If desired, an equivalent stepping circuit, such as a ring counter, may be provided, so long as such circuit is capable of switching positively and at a sufficiently high rate to accommodate the input of pulses to the selector circuits from the selector photocells PC–1 and PC–0. For purposes of explanation, the circuit incorporating the beam switching tube will be described.

This tube is provided with a plurality of so-called "spade" elements, an equal number of plate elements, an equal number of target elements, and a corresponding number of grid elements, and a common cathode. The usual tube of this type has ten sets of the aforementioned elements, and is used as a decade counter. However, for present purposes only the first eight elements of the tube are used, those numbered 1–8. The first target element 675T1 is connected to the first comparing circuit 661. Likewise, the next target element 675T2 is connected to the comparing circuit 662, and so on for the first seven target elements of the beam switching tube. Accordingly, unless the electron beam in tube 675 is directed to the particular target element associated with a comparing circuit, there cannot be any effective operation of the comparing circuit. By stepping the electron beam from one target element to the next, the switching function of the selector circuit is obtained.

Stepping of the beam switching tube is caused by controlling the potential on the grid elements of the tube 675 through a conventional beam switching circuit 678 which is in turn controlled by a flip-flop circuit 680. This flip-flop circuit receives switching pulses through a line 682 and capacitor 683 which are connected in series with a parallel circuit 684 connected to all the comparing circuits 661–667. Every time one of the comparing circuits conducts a switch pulse passes through line 682 and causes the beam switching tube to shift, moving the electron beam to the next highest target element. As a result, a stepping or switching pulse through line 682 can occur only when a pulse from a selector photocell corresponds with the state of a memory circuit and the beam switching tube is also in position to complete a circuit through the cathodes of the AND gate tubes in the corresponding comparing circuit. If the selector circuits find a complete digit-by-digit coincidence between the code placed in the memory circuits 642 from the character decoder, then a total of seven stepping or switching pulses will pass to the beam switching circuit 678 and on the last such pulse the electron beam will shift to the eighth target 675T8, instantaneously completing a triggering circuit through line 685. At the same time, this pulse passes through line 686 into the reset circuits of the memory circuits 642, resetting all of them.

The triggering pulse through line 685 is transmitted simultaneously to a spark control unit 700 and a flash control unit 702 (FIG. 15). The spark control unit causes a high intensity flash to occur immediately across the spark gap 610 (shown in FIGS. 15, 17, 25 and 34). The resulting high intensity light beam will pass through the selected character in the disc 600 and an image bearing light beam will pass through the lenses 620 and onto the photosensitive material 625. Now it is necessary to produce spacing movement between the optical axis of the machine and the photosensitive material, according to the width of the character image which has just been recorded on the photosensitive material.

When the photocells PC–0 and PC–1 scan a reset mark 635 following the selector code on the disc, a pulse will pass through both trigger amplifiers 670 and 671, and as a result the AND gate 673 will transmit a pulse through a phase inverter circuit 708 and into a reset circuit 710 for the beam switching tube which causes the electron beam to return to the first target element 675T1. The selector circuits thus immediately prepare for selection of another character, and there is no need to await a completion of scanning of the remainder of the font, or a part thereof before the next character can be selected and projected through the optical system. The only time required between the successive projections of character images is that time necessary for the spacing circuits to perform their formation.

*Space computer*

The triggering pulse through line 685 causes the flash control unit 702 to fire a relatively long flash lamp 715 which causes light to pass to the "relative space code" sections of the disc 600. These sections are designated generally at 718 in FIG. 27, and comprise twelve separate areas or bands at different radii, one space code word being a section across the space code bands which is aligned with a given character and in which there may be a transparent or translucent portion in any one of the bands. Further details are described in copending application Ser. No. 286,859 filed June 10, 1963. Recalling that there are two font circles or bands, this provides a six digit relative space code for each character, and the preferred arrangement utilizes every other one of the space code bands to form a code word, the two code words for the two different characters in the different font segments being intermeshed. The read-out is provided by six photocells 720 which are mounted in a common carrier on bracket 722, spaced apart by a distance equal to the spacing of every other space code band. Thus, by shifting the carrier 722 the photocells 720 can be aligned with the appropriate relative spacing code on the disc, according to which font circle is in use. Apparatus for performing this function automatically is described hereafter.

Figure 36:
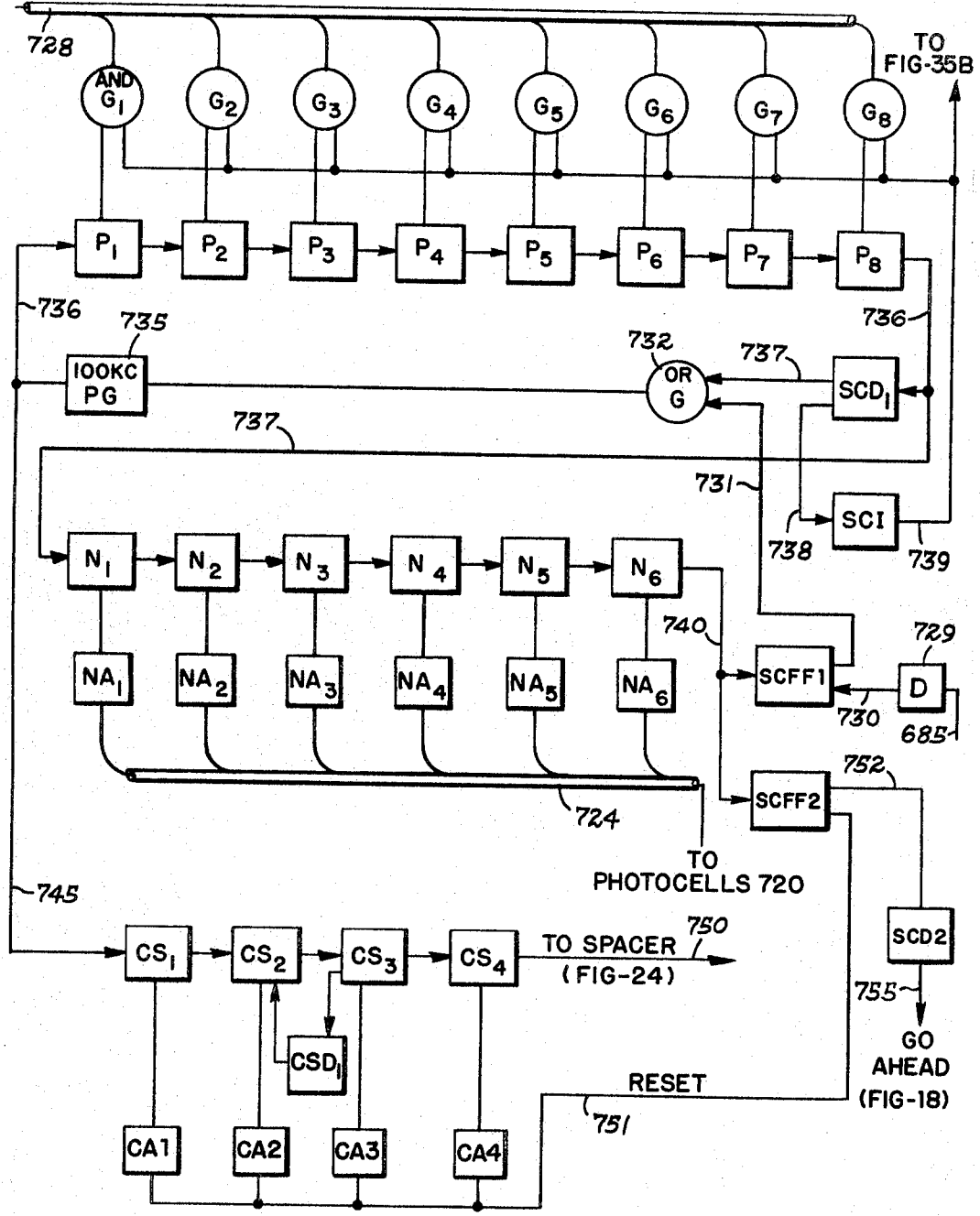
FIG. 36 is a block diagram of the electronic space computer employed in the photographic machine.

The output from the photocells 720 is a six-line cable 724 which leads a space computer 725. Details of this computer are shown in FIG. 36. Broadly, it consists of a fourteen stage binary counter, including a so-called P counter which is preset, either manually or from the record 27, according to the desired point set information (or magnification) and an N counter which is comprised of six cascade connected binary stages preset by pulses from the photocells 720.

When the lenses 620 are adjusted to the position desired for a predetermined magnification of the object or master character on the disc, this operation likewise presets a selector switch 727 (FIGS. 15 and 35B) to produce an output on one or more of the lines of an eight-line cable 728 leading to the space computer, and particularly to the AND gates G1–G8 (FIG. 36) which are connected to preset the eight stages P1–P8 of the P counter. The outputs from the photocells 720 are connected through amplifiers NA1–NA6 to preset the six stages N1–N6 of the N counter according to the relative space code for the just-photographed character.

The space computer is started into operation by a delayed output pulse, as from the triggering line 685 of the character selector, through a delay circuit 729. This pulse is received over line 730 for changing the state of the space computer control flip-flop, designated SCFF1. When this flip-flop changes state, it functions, through the connecting line 731, to send a starting pulse through an OR gate circuit 732 to begin operation of the space computer pulse generator 735. This is a high speed pulse generator operating, for example, at 100 kilocycles. Pulses from it are transmitted through lines 736 to the first stage P1 of the P counter, and thence through the various stages P1–P8 in the usual fashion of a cascade connected binary counter. In an actual construction the P counter is preset to a number which is the 256-complement of two times the desired point size. Thus, when the eighth stage P8 transmits an output pulse on line 737 the total number of pulses transmitted by the pulse generator 735 will be equal to twice the desired point size.

Input pulses to the N counter are provided by the output of the P counter, i.e., line 736. This line is also connected to a delay circuit SCD1. One output 737, which is direct or not delayed, extends to the OR gate 732. A delayed pulse from the delay circuit SCD1 passes through line 738 to a phase inverter circuit SCI, and thence through line 739 which is connected to each of the AND gates G1–G8 for the purpose of resetting the P counter.

For each group of pulses received into the P counter, one output pulse is available at line 736. After a ten microsecond delay, provided by the circuit SCD1 and during which time pulse generator 735 is shut off, an inverter pulse will pass through line 739 to reset the P counter to the same value. The same output pulse will go to the stage N1 of the N counter to fill it up, taking into account the preset relative space code number there, an output signal from N6 will pass through line 740 to the control flip-flop SCFF1, causing it to turn off pulse generator 735 until the next character selection.

As an example, assuming that the P counter will transmit one output pulse for every nine pulses received, and that N counter will transmit an output pulse after receiving five input pulses, a total of forty-five pulses are caused to be generated. These pulses are transmitted during the above-described computing operation through line 745 into a divider counter, which is part of the space computer, and comprises the binary stages CS1, CS2, CS3 and CS4. This counter is arranged to divide its input by twelve, to convert the product of twice the point size times the unit width value into piclets, equal to one-sixty-fourth of a pica or approximately 0.0026 inch. In the example, the forty-five pulses coupled into CS1 will result in three piclet or output pulses in line 750 (FIGS. 36 and 15) leading to the space control circuit 752, and a remainder of nine pulses will be left in the divider counter (forty-five divided by twelve). These extra nine pulses will change the stages CS1, CS2 and CS4 into the "one" state, where the divider counter will stop at the end of its computing operation.

An output pulse from line 740, signifying the end of the computing operation, is also transmitted to a stretcher flip-flop circuit SCFF2, which in turn causes a reset pulse to pass through line 751 and through the reset amplifiers CA1, CA2, CA3 and CA4 which are connected to the corresponding four stages of the divider counter to preset each stage to the "zero" condition. At the same time that a pulse passes through line 751 there is an output from SCFF2 through line 752 to a delay circuit SCD2 which in turn will transmit a delayed output pulse through line 755. This is a so-called "go ahead" pulse which is directed to the character decoder 555 to permit it to decode the next character code word, which is already presented in the reader 520, awaiting the "read" operation.

The divider counter performs two functions. First it has an output available through line 750 after twelve input pulses are received from line 745, thus performing the division by twelve and converting the computer pulses into output pulses equivalent to a space of one piclet. Also, the divider counter will hold a remainder therein which is less than one-half a piclet, while converting a remainder equal to or greater than one-half piclet, but less than a whole piclet, into an output pulse through line 750. These functions are accomplished by reason of a feedback loop in the divider counter coupled from the third stage CS3 into the second stage CS2 through a delay circuit CSD1 which may provide a delay in transmission of about ten microseconds.

When the divider counter is cleared by the reset pulse through line 751, an extra piclet pulse is available in line 750 if CS4 was in the "one" state, and will pass an output pulse when reset. This clearing action of the divider counter after each computing operation has the effect of always providing an integral number of piclets to the space control, matching the output of the computer disc 75 (FIG. 5) in the keyboard machine. If the result of computation in an electronic computer system of the photographic machine leaves a remainder of less than one-half piclet (five or fewer remainder pulses through line 745), the remainder is dropped when the divider counter is reset.

*Space control circuit*

The space control circuit 752 is connected to drive a stepping motor 755. The motor is preferably of a type having a magnetically polarized rotor 757 and a stator 760 having a plurality of coils which provide at least two different phases. For purposes of illustration, the motor is shown in FIG. 22 and described as having a five-toothed rotor 757 including teeth 757a–757e, and a four-coil stator providing phase windings or coils 760a and 760b, also shown in FIGS. 23 and 24. It will be understood that these coils, hereafter designated A—A and B—B coils, are respectively in series circuit and each provide one phase or winding of the stator.

In practice, a motor of this type may actually have considerably more coils, for example eight, and considerably more teeth in the rotor as desired to provide more stepping increments per revolution. The same principles apply, however, in which progressive stepwise movement or rotation of the rotor 757 is provided by changing the flow of electrical current through the phase windings of the motor, and such progressive change is illustrated in FIG. 22B in the four schematic showings of the windings of the motor. The arrows adjacent to the coil illustration indicate the flow of current through that coil for a particular position. There are four possible conditions, as shown, it being understood that after the third condition, the motor returns to the zero or starting position insofar as the current flow through the winding is concerned. FIG. 22B, therefore, illustrates the change of connections in the windings for one complete stepping sequence.

With the current flow as shown in condition zero, there is effectively a north pole at the top of the stator and a south pole at the bottom, indicated by the letters N and S in part A of FIG. 22A. The position of the rotor 757 at this time is indicated by the indexing arrow I drawn on the rotor.

The rotor is constructed of a plurality of toothed members forming a sandwich with a permanent magnet 762, thus, there are two rotor pieces 757, each having teeth 757a–e, and the teeth on each piece are offset or out of phase such that the teeth in one are opposite slots in the other rotor piece. The permanent magnet causes the rotor pieces to be polarized such that one is a north pole and the other is a south pole. For purposes of explanation it will be assumed that the rotor pieces 757 shown in FIG. 22A is the north pole and thus in part A of FIG. 22A the tooth 757a is aligned with the south pole.

Reversing the current flow through winding A—A will shift the magnetic field 90° clockwise, and the rotor will advance one-quarter tooth in that direction with the tooth 757b moving into alignment with the effective south pole S as shown in part B of FIG. 22A. Next, as shown in condition two on FIG. 22B the reversal of current flow through B—B will shift the magnetic field another 90° clockwise and tooth 757c will align with the effective south pole. In the third condition the flow of current through A—A is changed back to its initial direction causing a further 90° shift in the magnetic field in the clockwise direction as shown in part D in FIG. 22A. The magnetic field shifts another 90° clockwise and the tooth 757d aligns with the effective south pole in this condition. Finally, restoring the current flow conditions in B—B to the initial condition brings the magnetic field back to the same condition at the start and tooth 757e is aligned with the south pole at the bottom of the stator.

Therefore, by systematically changing the flow of current through the windings of the stepping motor, the rotor 757 can be made to advance in precise increments of a revolution. In each condition the rotor is locked magnetically in an exact position. With a film-handling carriage 760 (to be described) of relatively light weight, for example about one pound, it is possible to obtain sufficient torque and precise control of movement of such a stepping motor to achieve repeated spacing movements from a drive connected to the rotor 757 through increments of one-thirty-second of a pica or 0.0052 inch, or precise multiples thereof, at rates of approximately 300 movements per second.

For purposes of finer space control movement a light displacing member 765 (e.g., an optical plate) is mounted across the optical path, being carried on a rotatable shaft 767. This structure is shown in FIGS. 15 and 21. The member 765 is movable between two positions by a lever 768 connected to the shaft and driven by a pneumatic cylinder 770 to displace the light beams coming from the lenses 620 before such beams reach the photosensitive material 625. Movement of the refracting member 765 will provide spacing movements of projected images in the order of one-sixty-fourth of a pica. Therefore, coordination of the stepping motor drive with the activation of the cylinder 770 will provide a complete range of spacing movement at extremely high speeds with achievement of precise increments of spacing movement as little as one-sixty-fourth of a pica.

The output of the stepping motor 755 is from the rotor 757 through a positive toothed clutch 772 (FIGS. 20 and 23) controlled by a solenoid 773, to a pinion 774 which is in mesh with a rack 775. Linear motion of the rack causes spacing movement of the film carriage, as will be described. In order to damp the decelerating and settling movements of carriage driving motor 755, a brake control is provided, as shown schematically in FIG. 23. This control includes a disc 776 fastened to the motor rotor, and having a cooperating brake coil 777 mounted on suitable spring arms 778. Energizing of the brake coil 777 is controlled through a brake control circuit 779, details of which are not important to an understanding of the general system. Suffice to say that this control operates in response to a signal on line 725, which is the input to the stepping motor control circuit as shown in FIG. 24. Whenever stepping pulses are supplied to this line it is at a relatively low level, and when these pulses cease, the level or potential in this line rises immediately, and in response to this rise a suitable pulse generating circuit (not shown) generates a pulse which passes through the coil 777 and produces a retarding force on the disc 776 opposing its continued rotation. This action is only momentary, with the eventual position of the motor output being under the control of the electromagnetic fields produced by the stepping motor control.

The output pulses from the space computer 725 pass through line 750 into the space control 752, where they are applied to the input of a switching or divider flip-flop 780 (FIG. 24), and this flip-flop binary divides by two the number of input pulses and transmits one-half of these pulses through line 785 to the control circuit of the stepping motor.

By using the light displacing or refracting member 765 the speed requirements of the stepping motor are reduced by one-half. Thus, the opposite sides of binary 780 are connected to control the alternate energizing and deenergizing of solenoids 787 and 788 which in turn control conventional valves in the supply system for directing pressure fluid to the pneumatic cylinder 770. Each pulse from the space computer can produce a movement of the member 765, first in one direction and then in the next. To avoid having the solenoids continuously energized and deenergized during a spacing operation, the connections 790 and 791 from flip-flop 780 are directed to gating amplifiers 792 and 793, and these gates normally prevent energization of the solenoids by applying a suitable potential through a connection 794 which leads to the control flip-flop SCFF1 in the space computer. Whenever the computer is operating the gates 792 and 793 are closed, and when the computer is stopped by its own last output pulse, the gates are opened and according to the state of flip-flop 780 one or the other of the solenoids will be energized to achieve the final fractional spacing step.

Line 725 directs the space controlling pulses to a relay selector switch 800A, which can be manipulated to apply the incoming space pulses to one or the other of two input circuit lines 802, or 803. The position of this switch will depend upon whether it is desired to rotate stepping motor forward or in reverse. Each of the stepping lines 802 and 803 is tied to a pair of flip-flop circuits 805 and 806, respectively. For purposes of explanation it will be assumed that when binary 805 is in its "zero" condition the righthand side of its triode (plate 805b) will be conducting and in the "one" condition the left side of the triode will conduct and plate 805a will be at a relatively negative potential. This latter condition will produce a negative output signal in control line 808 which is connected directly to plate 805a. Similarly, when binary 806 is in the "one" condition, plate 806a will be relatively negative and output control line 810 leading from that plate will be at a negative potential.

The switching of the binaries 806 and 805 is caused by input pulses received, during normal forward stepping operation, on line 802 and being directed into the steering networks shown in FIG. 24. Details of these networks and the manner in which they provide steering interconnections between the binaries is explained in detail in copending application Ser. No. 117,454 filed June 15, 1961, now Patent No. 3,183,806, and assigned to the same assignee as this application. For purposes of the present explanation it is sufficient to understand that these steering networks assure that the stepping motor control circuits always cause it to proceed in either the forward or reverse direction, as desired, keeping the binaries in phase such that they must always change state in a predetermined pattern and thus avoiding the possibility that one of them might be switched out of phase with the other to accidentally reverse current flow in one of the stator windings of the stepping motor, thus causing it to operate accidentally in the opposite direction from that intended. The output lines 808 and 810 of the stepping binaries 805 and 806 are connected through respective gating control circuits 815 and 816 to control the flow of current through the separate phase windings of the stepping motor, between the power supply lines 817, 818 and 819 (ground).

The foregoing explanation covers the selection of a character and computation of its width, as well as the result of that computation in terms of spacing movement between the optical system and the photographic film or paper. Selection proceeds, once photographing of a line has begun, through an entire word or sequence of character codes. This may, of course, include punctuation marks, hyphens, or the like, all of which are treated as characters, being photographed and spaced in the same fashion.

When it is necessary to provide a fixed space, such as an em space or an en space, or to insert a non-justified word space, these spaces are treated as character codes, and selection and photography occurs just as with a character. However, the area of the font disc corresponding to that selection code is opaque, so that no light passes through the disc and hence there is actually no photography, but the spacing operation occurs with the result that a blank space appears in the line of composition with that space having the desired width. When a line of composition should be justified, then a justified word space code appears in the reader, and as a result of its decoding, the justification computer is brought into operation.

*Justification computer*

FIG. 37 shows, in block diagram form, the parts of the justification computer. Basically, this computer comprises two cascade connected binary counters, namely the line length counter LS which is a twelve-stage binary counter having stages LS1–LS2048 as shown, and the word space counter WS which is a six stage counter having binary stages WS1–WS32. These counters are arranged to operate from the justification information which is part of the end-of-line information on the record tape 27. When the end-of-line information is read by the reader 515, before beginning to set a line, a portion of the code information read relates to the amount of space to be divided among interword spaces to produce a justified line. This space is also referred to sometimes as the "line remainder." As part of the sequence operation of the decoder circuits 545 (later described) this coded information is set into a bank of memory units or binaries, one for each stage of the LC counter. These memory units are designated LM1–LM12. They are connected to the corresponding stages of the spacing counter LS1–LS2048 through normally inhibited gate circuits GL1–GL12. Similarly, the word space counter is provided with a corresponding bank of memory binaries, designated WM1–WM6, and these are connected to preset corresponding stages of the inter word space counter through normally inhibited gate circuits GW1–GW6.

The purpose of this computer is to divide whatever number is stored in the LM memory by whatever number is stored in the WM memory whenever the character reader and decoder call for a justified word space. The code for this purpose is identified on FIG. 18 as the JWS code, $a$, $\bar{b}$, $c$, $h$ ($1$, $\bar{2}$, $3$, $8$), and the output from the corresponding decoding line is a pulse through a suitable amplifier (not shown) on the line marked JWS in FIG. 37. This pulse passes through the normally closed contact of a non-justify relay switch 1000B (later identified) and thence through line 832 to provide an "on" signal to the control flip-flop 835. This flip-flop in turn is connected to control the operation of a low frequency pulse generator 838 which may operate, for example, at a rate of about six hundred cycles per second. Pulses from this generator are directed through its output line 840 to the space control circuits 752, this input being shown in FIG. 24. Each pulse from line 840 is equivalent to one piclet (one-sixty-fourth of a pica) of space.

The output line 840 of the low frequency pulse generator is also provided with a non-feed back coupling, as through diode 841 or its equivalent into the control line 842 which provides an "on" signal for a further control flip-flop 844. This flip-flop is connected through an intervening amplifier circuit (preferably a cathode follower) 845, which in turn is connected to turn on and off a high frequency pulse generator 850. The generator 850 provides output pulses at a much higher rate than the generator 838, for example at around sixty kilocycles. The output line 852 of the high frequency generator is directed to the first stages of both counters, namely to provide pulses into LS1 and into WS1. As a result, the receiving of a justified word space signal on the JWS line turns on the low frequency generator 838 which immediately begins to send piclet pulses through line 840 to the space control, and the first of these pulses results in turning on flip-flop 844 which in turn turns on the high frequency generator 850. It then begins to send pulses at a much higher rate (one hundred times as great) into the counters of the justifying computer.

As soon as the word space counter overflows, an output will occur on line 855 from WS32. When this will occur, of course, depends on the number set into this counter. That output pulse is coupled through line 855 into a first delay circuit D1, which preferably has a delay time of about one hundred microseconds. This delay circuit is such that a first output from it occurs on line 857, and that line is coupled to flip-flop 844 to turn it off, effectively stopping the operation of the high frequency pulse generator 850. The delay pulse passes through line 860 to each of the gate circuits GW1–GW6, causing the word space counter to be reset from the word space memory WM1, etc. This operation may repeat several times before sufficient high frequency pulses are generated to cause the LS counter to overflow.

When the LS counter fills up, it overflows into the output line 862 from LS2048, and that output is directed into another delay circuit D2, which has a much shorter delay period than circuit D1, for example about thirty microseconds. One output from D2 is connected on line 865 to provide off signals immediately (non-delayed) to each of the flip-flops 835 and 844. As a result, both pulse generators stop.

There are two conditions that may occur at this time. It is possible that the LS counter has overflowed at a time when the WS counter has not yet been refilled to capacity, in other words, a condition may occur where the number of interword spaces does not divide evenly into the line remainder. In such a situation, it is necessary to restart the high frequency pulse generator until the WS counter next overflows. To accomplish this, one delayed output 866 is provided in circuit D2 leading to another delay circuit D3 having a somewhat greater delay time, for example fifty microseconds. It is important, however, that the total delay time of D2 and D3 be less than the delay time of D1, for reasons which are subsequently explained. The output from D3 is connected through line 867 into the line 842 which provides an "on" signal to flip-flop 844, thus the high frequency pulse generator is again turned on. Since the LS counter has been filled to its capacity, it has been necessary to reset it to the space remainder value, and this is accomplished by a delayed output from circuit D2 on line 870, at the same time as the delayed output on line 866, which extends to all of the gate circuits GL1–GL12, causing the number stored in the LM memory circuits to be transferred again into the LS counter. It will be recalled that during this operation the low frequency pulse generator 838 is turned off, so no additional pulses are passing through line 840 to the space control. The output of the high frequency generator 850 continues under these circumstances until the word space counter overfills, and a pulse through line 855 and D1 results in the high frequency generator being turned off. The WS counter is again preset. As a result of this operation the extra pulses required to cause overflow of the WS counter are stored in the LS counter until the next computation, and these represent the quotient remainder of the division of the interword spaces into the space remainder value.

Where the number of interword spaces divides evenly into the space remainder value, or when the quotient remainder is used up, a somewhat different condition exists. In that circumstance there will be a simultaneous overflow output from LS2048 and WS32, hence there will be simultaneous inputs to the delay circuits D1 and D2. The signal from D1 through line 857 maintains the flip-flop 844 cut off for one hundred microseconds, and since this time is greater than the time required for the circuits via D2 and D3 to turn the high frequency generator on again, the signal on line 857 from the delay D1 holds the pulse generator 850 off, but the output on line 870 results in the enabling of gates GL1 through gates GL12 to preset the LS counter for the next operation, and the output on line 860 presets the WS counter.

With the control flip-flop 835 returned to its off condition, a pulse occurs on line 875 which is directed to the input OR gate on the character reader 520. It therefore reads the next code, which is already presented, and the next operation occurs, for example selection of the first character in the next word.

The operation of the justification computer, therefore, is such that for every piclet output pulse by the low frequency generator 838 the value of one word space is subtracted from the line remainder value set into the LS counter, with the result that the division is accomplished by a sequence of subtraction operations. If it is not possible to divide the number of interword spaces evenly into the line remainder value, then any remainder is placed in the LS counter at the end of the computation, and automatically adds onto the total number of pulses which are required to cause the LS counter to overflow in the next computation, thereby decreasing that number of pulses by a corresponding amount. It has been found that with this arrangement it is always possible to end a justified line with the last justification computation (e.g., the last interword space) resulting in a simultaneous output from the LS and WS counters. Since it may be possible that at least one interword space in a line will have a width of one piclet more than the other interword spaces, in that line, the remainder is distributed in such a way that it is not discernible, since the physical value of a piclet is only one-sixty-fourth of a pica.

End-of-line control

The foregoing description of character selection and justification, for purposes of convenience, was based upon a general description of the manner in which control information is supplied to the justification computer. For purposes of description, it was assumed that the line length remainder information was available and set into the LM memory (FIG. 37), and similarly that the number of interword spaces was available and set into the WM memory.

For a more detailed explanation of the end-of-line sequence and operations, it is desirable to make certain assumptions. To begin with, the tape 27 feeds first through the reader 515 and then through the reader 520, and as previously mentioned the reader 515 is arranged to ignore all codes except the end-of-line codes. These codes include the basic end-of-line code, which is $\bar{a}$, $b$ and $h$, or in other words absence of a signal in the first channel, and presence of a signal in the second and eighth channels. This code combination is incorporated in each of the several end-of-line codes, as will be noted from FIG. 3. For explanation purposes, it will be assumed that the accept code is present, and that this indicates that the information preceding this code forms an acceptable line which it is desired to reproduce in justified form. The accept end-of-line code is $\bar{a}$, $b$, $d$, $\bar{e}$, $\bar{f}$, and $h$, the significant additional digits being presence of a signal in the fourth or $d$ channel and absence of signals in the fifth and sixth or $e$ and $f$ channels.

The tape 27 fed into reader 515 will be stepped continuously through it until that reader finds an end-of-line signal, at which time it stops. In the meantime, the tape may be passing on to the character reader 520, and when an end-of-line signal (of any type) reaches the character reader 520, this will be decoded, so that reader will stop, and a signal will be transmitted over line 900, and this signal, after being amplified in amplifier 901 (FIG. 18), is received in the end-of-line control circuit, being directed into an AND gate circuit 902 (FIG. 38). When any EOL signal appears in the decoder circuit 545 (FIG. 15) this results in an output from this circuit on line 905 directed to the EOL control flip-flop 907. A signal on this line tends to cause this flip-flop signal to turn off. For purposes of explanation it will be assumed that this flip-flop was previously in its "on" condition, and the reason for this will be explained hereafter.

The accept signal, resulting from decoding of an "accept-line" EOL signal, is directed through line 909 into a code director circuit 910. Details of this circuit are shown in FIG. 39. The significant signal is an output to the off or reset control of the reject control flip-flop 912 and a similar reset signal to the non-justify flip-flop 913 and to the multiple justification control flip-flop 914.

When there is a coincidence of inputs to the AND gate circuit 902, signifying that both reading heads are stopped on an end-of-line signal, this results in an output on line 915 to an end-of-line stop control switch 916. This switch is located on the console of the photographic machine (FIG. 2), and may be opened or closed at the choice of the operator. If open, the machine will stop at this point, in other words when an end-of-line signal is reached. If closed, the signal passes through switch 919 into a pair of amplifier circuits 920A and 920B. These circuits are preferably individual amplifiers, but are coupled together such that they may function as a monostable multivibrator circuit. An input through switch 916 to amplifier 920B results in one output pulse on the output line 921 of this amplifier circuit to a further control amplifier 922, which is connected to control the potential on the grid of a stepping control thyratron 923. This output from amplifier 922 will cause a sufficient rise in the grid potential of this thyratron to fire it, completing a circuit through the interrupter switch 926, and through the coil 930A of the end-of-line stepping sequence switch. The interrupter switch 926 opens when the coil 930A is energized to extinguish thyratron 923, thus only one step of the stepping switch results from each input to the thyratron.

The stepping switch is shown diagrammatically, and includes eight levels designated L1–L8. Each level of the stepping switch includes a wiper which can complete a circuit to any one of eleven contacts, and these contacts thus define the successive positions of the stepping switch. They are labeled H (for the home or initial position) and 1 through 10 to designate the successive positions as the switch is stepped.

The decoding circuits 545 are connected through suitable gating amplifiers 935 to the wipers of each of the first six levels (L1 through L6) of the stepping switch. These amplifiers are connected to produce a signal potential on the wipers whenever there is a "not" signal in channels $a$ through $f$ of the record tape 27. Accordingly, the various sections of the amplifiers 935 are identified as $\bar{a}$, $\bar{b}$, etc. The plate circuit of thyratron 923 is connected through a normally closed switch 930B to a delay circuit 937 which provides a suitable delayed output, for example with a delay of about sixteen milliseconds. The output from this delay circuit is directed to a pulse generator 940. Where a signal is received from the delay circuit 937, the pulse generator 940 merely functions as a further delay circuit, with a delay time of about an additional ten milliseconds, after which it provides an output pulse to a third delay circuit 942, having a much shorter delay time, for example in the order of two hundred microseconds, on line 945 to the wiper of the level L7 of the stepping switch.

Recalling that the EOL coincidence pulse resulting from an EOL signal in each of the readers had caused one step of the stepping switch, the wiper in level L7 is thus in the number 1 or reset position, when the delayed pulse is received on line 945, and the contact in level L7 at the number 1 position is connected through line 947 and to a suitable amplifier 948. The amplified signal output from this circuit is connected on line 950 to the coil of a first interlock relay 952A, and since the other side of this relay coil is connected to the + voltage supply bus 953, that relay closes whereupon a ground circuit is established through the normally open contact 952-1 and to the coil of a second-interlock relay 952B. The same signal on line 950 is connected to the coil of a reset relay 980, and therefore it is energized.

At the same time, the signal in line 950 is transmitted through diode 957 and line 958 to the common contact connection on switch 960A of the multiple justification relay 960. The normally closed contact, as shown, connects line 958 to line 962 which leads to the coil of the carriage return relay 965. Therefore, the carriage return relay is energized, provided the multiple justification relay is not energized. The switch 965A of the carriage return relay has its common connection to a negative voltage source, and its normally open connection leads to line 966 which provides power to energize the carriage return control solenoid and open the clutch 772. The common connection of relay switch 965B is connected through line 968 to the "carriage at home" switch 970 (FIG. 20) which is a normally closed switch, and opens only when the film carriage contacts this switch when the carriage is in position to begin the recording of a line. The normally open contact of switch 965B is connected through an isolating resistor 972 into the line 962 which leads to the coil of the carriage return relay 965.

As a result, therefore, of the pulse through the stepping switch wiper in the level L–7, via line 947, the interlock relay 925A is energized and locks itself in through the normally open contact of its switch 952–1, and a holding circuit is completed through resistor 967 to hold this relay on. Similarly, a circuit is completed through the same normally open contact of relay switch 952–1 to the coil of the second interlock relay 952B, and it is energized provided that the line 968 connected to the other side of its coil is connected to a source of positive voltage. This is accomplished through a safety switch (not shown) on the door 503 (FIG. 2) normally enclosing the optical system and the flash light source. If the door is closed, the safety switch is closed, and a circuit is completed which will hold relay 952B. Its relay switch 952–2 will then open to break a circuit connection from the positive voltage bus 953 to the output line 917, which it controls.

The pulse from line 947 is coupled through capacitor 972 into a line 973 leading to a reset control amplifier 975. The output line 976 from this amplifier extends to the reset connections in the LM and WM memory binaries (FIG. 37), so that they are reset to a zero count in preparation to receive the information for the next line about to be reproduced. The reset relay 980 is also energized by the pulse on line 950, it holds momentarily, and then is again deenergized. Thus, its relay switches 980A, 980B and 980C all transfer momentarily to their normally open contacts and then return.

The same pulse, as previously mentioned passes through diode 957 and the normally closed contacts of relay switch 960A on the multiple justification 960, and energizing the carriage return relay 965 will cause it to form a holding circuit from the carriage-at-home switch 970 and line 968, through relay switch 965B and resistor 972 and through the coil 965 of the carriage return relay. At the same time, this causes relay switch 965A to transfer to its normally open contact and apply a negative potential to the control line to the carriage return solenoid 773. Since this opens the toothed clutch 772 in the stepping motor drive to the film carriage, the carriage return spring will immediately start to return the carriage to its at home position. Later, once the carriage reaches its home position, the "at home" switch 970 will open to break the holding circuit, and carriage return relay 965 will drop out at that time.

In the meantime, a further stepping pulse has been applied to the stepping switch coil 930A. This pulse comes from capacitor 972 and diode 982 through line 984 to the amplifier 920A. As a result, the stepping switch moves to its number 2 position, which position is used only for gaining additional time to permit the reset relay to open and close.

In order to understand the function of the reset relay, it is necessary first to identify further relays in the circuit, although their operation is not explained until later. Specifically, there is a reject relay 990 which has one end of its coil connected to the positive voltage bus 953, and the other end is tied through line 991 to an AND gate circuit 992. This circuit is connected to be actuated under the control of the reject flip-flop 912 and a pulse from the character reader EOL input line 900. In other words, if the reject flip-flop 912 should be set in its "on" condition, in response to an EOL signal for a rejected line, the AND gate 922 would be enabled to energize relay 990. Similarly, there is a non-justify relay 1000 which is tied through line 1001 to another AND gate circuit 1002, and that AND gate responds to a pulse from the character decoder EOL output line 900 if the non-justify control flip-flop 913 is in its set or "on" condition, in response to a "non-justify" EOL code ($\bar{a}$, $b$ $\bar{e}$, $f$ and $h$). In similar fashion, the multiple justification relay 960 has one end of its coil connected to the positive voltage bus 953. The other end of its coil is tied through diode 1006 to the reject AND gate output line 991, and it is also separately connected through line 1007 to an AND gate circuit 1008 which is under the control of the multiple justification control flip-flop 914 and the character stage EOL signal line 900. As will be further explained, the multiple justification relay will be energized either in response to a signal from its AND gate 1008 or a signal from the reject AND gate 992.

Each of the relay coils 960, 990 and 1000 have holding circuits through individual diodes 1010 and the normally open contacts of their corresponding relay switches 990A, 960B and 1001A. The common connection of each of these relay switches extends to a reset control line 1015 which leads to the common connection of the reject relay switch 900B. As will be noted, the normally open contact of this relay switch is grounded, but whenever relay 900 is energized, it breaks this ground connection, and hence breaks any holding circuit which may have existed through any one of the relays 960, 990 or 1000. Hence the reset relay will reset these control relays to respond to the EOL code now existing in the decoder circuit 545. In order to assure that this is accomplished, the stepping switch is permitted to move through an extra step, which is its number 2 position, permitting some extra time to guarantee the reset function. The delayed pulse will again result in line 945, for the same reasons as previously explained, and this pulse is coupled into the stepping control through line 1018 which connects to line 984, resulting in a further step of the stepping switch 930.

At the number 3 position, the contacts in the first and second levels of the stepping switch are connected into an output cable 1020 which is a part of the cable 32 shown in FIG. 15. This cable leads to the leading counter 560, and the two lowest order lines of the cable 1020 are connected to the first and second level contacts at the number 3 position of the stepping switch. If a "not" signal is received at the corresponding gating amplifiers 935 there will be a corresponding output signal to one or both of the wipers at levels L1 and L2, when the next delayed stepping pulse reaches the wiper in level L7. This pulse travels through line 1022, which is directed to the stepping control for the character reader 550, and also via diode 1023 into line 1024 which leads to the stepping control for the EOL reader 515. An amplifier 1025 is connected to line 1024 and produces an enabling pulse to each of the gating amplifiers 935. Therefore, whichever of these amplifiers are receiving a "not" signal from the EOL decoder 545, those amplifiers will be enabled to pass a signal to the corresponding wiper of stepping switch 930.

Normally the common input line to each of the reader switches in the EOL decoder circuit (FIG. 19) is supplied with a positive voltage through the wiper at level L8 of the stepping switch. This output line is indicated at 1030 in FIGS. 19 and 38. Thus, the EOL decoder circuits provide output signals, but these signals are used by gating them into the stepping switch 930 through the amplifiers 935. At the third and fourth positions in level L8 the positive voltage supply is connected into a separate input line 1028 which leads to a double throw manually operated switch 1029 on the front of the console, in the switch bank 525. When this switch is closed as shown it completes a circuit back to line 1030, and line spacing or leading information is read automatically into the leading control from the tape 27. If this switch is transferred, the power circuit to the EOL reader is interrupted at positions 3 and 4 of stepping switch 930, and the leading counter 560 is not preset from the tape. If the switch 1029 is transferred, the leading counter 560 is preset by means of appropriately actuated ones of eight binary switches in the switch bank 525. This is accomplished by diverting the positive voltage supply into line 2000 through the binary switches in 525 and through cable 2001 to the leading counter 560.

Similarly, the pulse on line 1022 is applied through diode 1032 into line 1033 which is connected back into line 1018. Hence, the delayed stepping pulse is obtained via line 984 and amplifier 920A causing the stepping switch to move to its fourth position. In this position, all the levels L1 through 6 have connections into the cable 1020, hence wherever a "not" signal is gated through the amplifiers 935, an appropriate signal will be sent to the leading counter, setting it to the complement of the line spacing or leading desired in whole points, since the information obtained through the cable 1020 from stepping switch position 3 was in fractions (one-quarter points and half points). The sequence of operations is the same in that the stepping pulses to lines 1022 and 1024 are provided to step both readers, and a stepping pulse is fed back via line 1018 and 984 to advance the stepping switch.

In the fifth position of the stepping switch the wiper L7 completes a connection to line 1035, providing an "on" signal to the leading control flip-flop FF3, which is shown in FIG. 15. With this flip-flop in its set or "on" condition, it activates the leading pulse generator 1038 which immediately transmits pulses into the leading counter 560 and simultaneously into the leading control circuit 1040. This circuit is a simplified version of the stepping motor control circuit shown in FIG. 24, and it is coupled to drive the line spacing or leading stepping motor 1045 to produce leading movement of the film 625 in increments of one-quarter point.

This stepping operation of the leading motor 1045 produces a corresponding step-wise rotation of the elongated spline or leading gear 1050 (FIGS. 15, 20 and 21). Rotation of the spline 1050 is coupled into the gear 1052 which drives the film advance sprocket 1055 on the film carriage 760. This sprocket engages perforations formed in the edge of the film 625, with the film being urged into contact with the sprocket by a spring-biased idler roller 1056. It will be noted, particularly from FIG. 20, that the gear 1052 remains in contact with the spline 1050 through the entire traversing movement of the film carriage, thus as the carriage returns, the film simultaneously is advanced, producing the required leading movements as the carriage returns to its home position.

At the home position, the carriage will open switch 970 (FIG. 20), and this breaks the holding circuit for the carriage return relay, which previously had been established through switch 970 and the normally open contact of the carriage return relay switch 965B. The return of the relay switch 965C to its normally closed contact completes a circuit through amplifier 1058 to the position 10 contact for the L7 wiper and to capacitor 1060, and this capacitor in turn is coupled through diode 1061 into line 1018. The purpose is to prepare for a signal that the carriage has returned and the line space operation is completed. When the leading counter 560 spills over, it produces an output pulse which resets its control flip-flop FF3 and turns off its pulse generator 1038.

When the wiper L7 reaches positions 5 and 6 it sends stepping pulses into line 1018, and thence to amplifier 920A, the first pulse from position 5 coming through diode 1063. Hence, as the carriage returns and line spacing or leading occurs, the stepping switch advances to the seventh position without waiting for the leading operation to end.

Levels L1 through L6 in the seventh position of the stepping switch 930 are all coupled into an output cable 1065 which leads to the WM memory circuits, shown on FIG. 37. Thus, in this position a code is set into the WM memory which corresponds to the number of interword spaces in the line about to be reproduced. A delayed stepping pulse also is provided through wiper L7, line 1022, and diode 1032 back into line 1018 causing the stepping switch to advance to the eighth position.

In the eighth position all of the levels L1 through L6 are connected into a cable 1070. This cable leads to the LM memory, FIG. 37, with the leads from position 8 extending to the first six stages, i.e., LM1–LM6. At the same time, a stepping pulse is applied through line 1022, diode 1032, and back through line 1018 to advance the stepping switch to the ninth position. There the levels L1 through L6 are connected into the six higher order lines 1070, leading to stages LM7 through the memory LM12 in the justification computer. As a result, the LM memory has placed in it a code which corresponds to the space remaining in the line, to be divided among the interword spaces, as previously explained.

When the stepping switch reaches its ninth position, switch 930B is opened, breaking the circuit from the thyratron 933 to the delay 937. Thus, the stepping pulse through diode 1032 from the wiper L7 in the ninth position causes a stepping movement to the tenth position, but the delayed pulse is not returned to wiper L7, hence the stepping switch stops in the tenth position. In order to move the stepping switch 930 back to its home position, it is necessary that the carriage be in its home position and the line spacing or leading operation be completed, signifying that the reading and use or storage of the end-of-line information has finished.

Thus, as previously mentioned, until the carriage opens the normally closed "home" position switch 970, the carriage return relay 965 is sealed in through its switch 965B. When switch 970 is open as the carriage reaches its home position, it is still necessary to assure that the line spacing operation has been completed. This is accomplished by completing the circuit from line 1075 which extends from an AND gate 1078 in the line space control to the normally closed contact of relay switch 965C and thence through amplifier 1058 to the L7 wiper at position 10. When the wiper reaches this position the amplifier 1058 is at a high level, producing an enabling signal to AND gate 1078. Then when the line spacing or leading counter 560 spills over, signifying the end of the leading operation, this causes a pulse through line 1082 to amplifier 1080, and that amplifier is coupled through line 1083 into the delay circuit 937 causing it to send a pulse which goes through the same delay sequence as previously mentioned, resulting in a stepping pulse through capacitor 1060 and diode 1061 into line 1018. Therefore, the stepping switch returns to its home position.

The output from the gating amplifier 1080 is coupled also through a further amplifier 1085 which provides a start signal to the character decoder circuits through line 1086. The delayed pulse which resulted from the step of stepping switch 930 from the tenth to the home position is coupled back into wiper L7 and thence via line 1090 to provide an "on" signal to the flip-flop 907, which was turned off at the start of the end-of-line sequence. Turning on this flip-flop results in starting the pulse generator 940 running (as a pulse generator). The pulses which it transmits, at the rate of about sixty pulses per second, are coupled through the delay 942 and line 945 into the wiper at L7, where they pass through the first diode 1092 into the output line 1024. These pulses are blocked by diode 1023, therefore the stepping switch remains in its home position. The pulses through line 1024 cause the reading head 515 to step ahead until it reaches the next EOL code (of any kind) whereupon a signal through line 905 will reset or turn off the control flip-flop 907, with the result that the pulse generator 940 is turned off to end the sequence.

Thus, the circuit remains in readiness until the character reader 520 reads the next EOL code (that code which was in the reader 515 at the start of the above-described sequence) resulting in a signal through line 900 to begin the next EOL sequence.

Multiple justification

If the EOL signal which appears in the EOL decoder circuits 545 at the beginning of an end-of-line sequence is that for multiple justification ($\bar{a}$, $b$, $c$, $\bar{d}$, $\bar{e}$, $\bar{f}$, $h$), then, after the stepping switch 930 goes through its reset position (position 2) and all of the flip-flop circuits are reset, there will continue to be a signal input on line 1100 (FIG. 39) which will produce a set or "on" signal to the multiple justification control flip-flop 914. Thus, when an end-of-line code appears in the character decoder circuit 555, the AND gate 1008 will transmit a signal on line 1007 to energize the multiple justification control relay 960. The purpose is to inhibit the line spacing or leading function, but permit the remainder of the end-of-line sequence to provide, in order to set into the WM and LM memories a new set of justifying values which the machine can use to justify the next line, which will appear aligned with the line previously photographed.

When relay 960 is energized, it completes a circuit, through line 1102, which leads to line 1015 and thence to the common contact of the reset relay switch 980B, where a ground holding circuit is completed. Therefore, the multiple justification relay 960 is locked in. Opening of its relay switch 960A breaks the circuit through line 962 to the coil of the carriage return relay 960, thus preventing the carriage from returning. Relay switch 960C transfers to its normally open contact, to which is connected a line 1105 returning to the line spacing or leading control. This forms a direct connection from the positive voltage bus 953 which provides an inhibiting signal to the leading control. The multiple justification relay 960 remains energized until the next end-of-line sequence, at which time the reset relay 980 is energized to break the holding connection at its switch 980B, and the flip-flops 912, 913 and 914 are reset.

Reject

If the EOL code is the reject code $\bar{a}$, $b$, $e$, $h$, after the reset portion of the end-of-line cycle there will be a control signal on line 1110 to the code director circuits 910. As shown in FIG. 39, this signal passes through the code director circuits to set the reject flip-flop 912 and provide a reset signal for the flip-flops 913 and 914. With flip-flop 912 in its "on" or set condition, once the AND gate 922 is enabled by an end-of-line signal from the character decoder circuits via line 900, a signal is provided in the output of AND gate 922 which energizes both the multiple justification relay 960 and the reject relay 990. Both of these relays are locked in through the holding circuits completed to line 1015 and the common connection to the reset relay switch 980.

As mentioned previously, the multiple justification relay when energized inhibits the line spacing control and breaks the circuit to the carriage return relay so that it cannot be energized.

The relay switch 990B establishes an inhibit circuit between the positive voltage bus 953 and the character select inhibit line 1112 which extends from the normally open contact of that relay switch. This line leads to the character selector gate circuits 651–657 (FIG. 17) and inhibits them to prevent operation of the character selecting device. In addition, relay switch 990C in transferring to its normally open contact, breaks a circuit through lines 1115 from the $\bar{b}$ contact of the character decoder circuits (FIG. 18). The codes are so arranged that all function codes except the EOL functions requires a $\bar{b}$ signal. The end-of-line sequence proceeds until the stepping switch 930 again reaches its home position and stops on the next EOL code. The character head reads through the codes in the rejected line, but no characters are selected, no functions performed, but rather the character reader merely steps through all of the codes until it reaches the next following EOL code, where a further end-of-line sequence is initiated.

Non-justified line

If the EOL code present in the EOL decoder circuits 545 designates a non-justified line ($\bar{a}$, $b$, $\bar{e}$, $f$, $h$), a signal is placed on the line 1120 to the code director circuits, which sets the non-justify flip-flop 913 and provides a reset signal to the flip-flops 912 and 914. Then when the next EOL code reaches the character reader, and a signal results on line 900, the AND gate 1002 is enabled, and this causes the non-justify relay 1000 to be energized. Its switch 1000A completes a holding circuit from the positive voltage bus 953 through diode 1121 and line 1122 into the line 1015, which extends to the reset relay switch 980B and thence to ground, as previously described. The relay switch 1000B transfers from its normally closed contact to its normally open contact. The common contact of this relay switch is connected through line 1125 to the character decoder circuit 555, and particularly to the output therefrom for a word space, identified on FIG. 18 as JWS. When photographing a line to be justified, this signal is sent from line 1125 through the normally closed contact of relay switch 1000B to line 1127 which provides an "on" signal to the justification computer control flip-flop 835.

When the non-justify relay 1000 is energized, the signal on line 1125 is transmitted instead to line 1130, which leads to the character selector circuit (FIG. 17) to set up a code in the input gate circuits 642 for a non-justified word space. This is a particular code identifying on the character disc a part which is opaque in the character position, so that no light passes through from the flash, but a predetermined space code is provided to cause a corresponding word space movement, thereby inserting a predetermined standard interword space.

Automatic size change

The significant digits of the codes for the point sizing changing function are $\bar{b}$, $d$, $e$ and $h$, identified AUTO SIZE in FIG. 18. When the reader 520 reads this particular code word, a control output will result on the automatic size change output line 1130 which is embodied in the cable (FIG. 15) leading to the size control circuit 1135.

Automatic control of the size of character images produced from a common size of master character on the matrix disc involves automatic positioning of the size control lenses 620, and corresponding control of the point size input to the space computer 725. Details of the circuit 1135 are shown in FIGS. 35A and 35B. A detailed explanation also is given in copending application Ser. No. 294,474 filed July 12, 1963, and assigned to the assignee of this application. Since all operations of the machine require an output pulse through either the $h$ or $\bar{h}$ line of the character decoder (note FIG. 18), it is possible to suspend normal operation of the machine for the automatic size change function by interrupting the read pulse circuit to the common input of the eighth station (534$h$) of the reader. The purpose and details of this operation are more fully explained hereinafter.

Thus, when the automatic size change code appears in reader 520, the next read pulse causes a pulse through amplifier 1136, through an isolating diode as shown in FIG. 35A to the grid of a control thyratron 1138. In the plate circuit of this thyratron there is connected the operating coil 1140A of a stepping switch 1140, and between the plate resistor and the coil there is a normally closed switch 1142 which is also controlled by coil 1140A, such that the thyratron is extinguished once it has been fired to d advance the stepping switch 1140 through one step.

The stepping switch 1140 has five positions (actually position 4 is an extra and performs no real function) and six different levels or connections which are indicated by the separate wipers, shown as arrows in the drawings. This control stepping switch is normally in the fifth position, when the control is at rest, as shown in the drawings. The first pulse resulting from the start signal, as just explained, moves the wipers to the first position.

As a result, a number of circuits are completed. First of all, power is supplied to line 1143 from the wiper connected to the AC power supply at the first position in the fifth level. This circuit line leads through the winding 1150 (FIG. 35B) of the reversible lens drive motor 1152.

Figure 34:
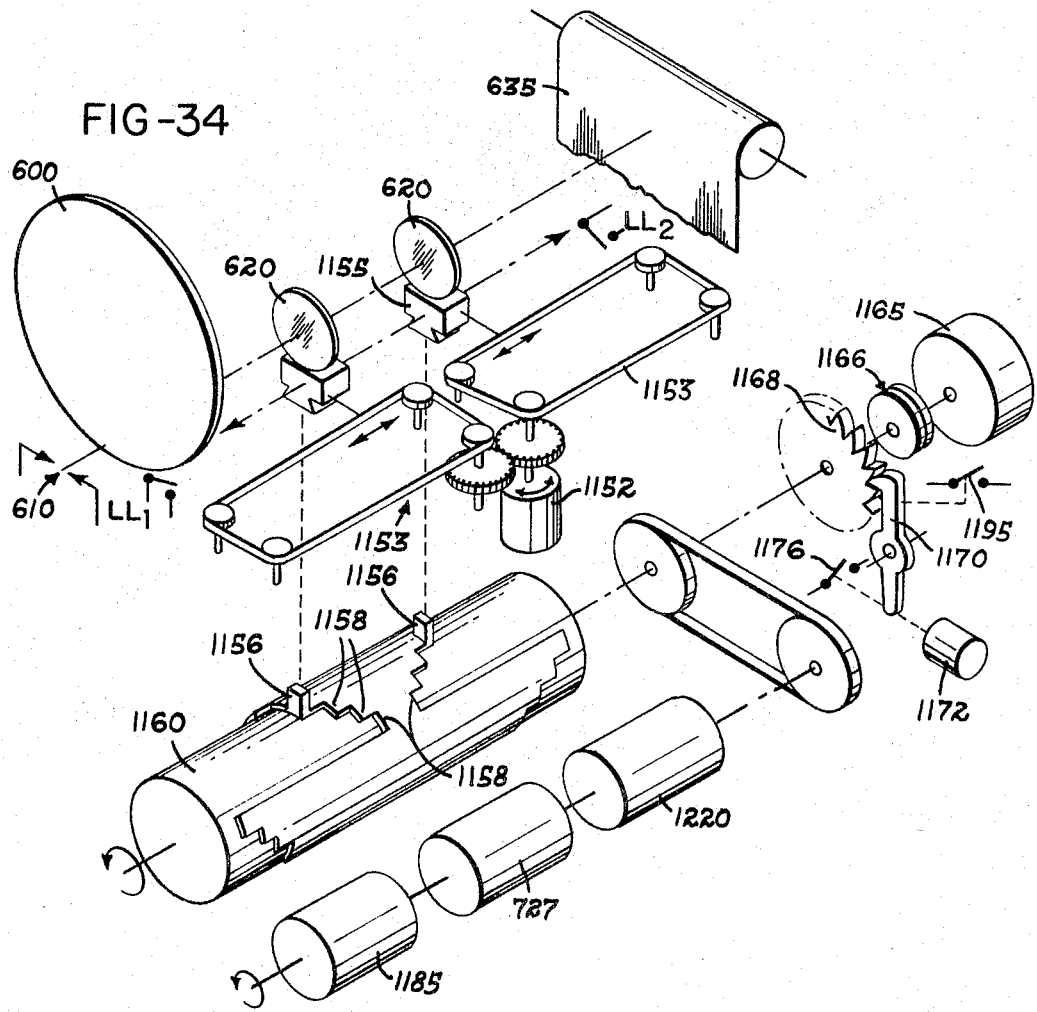
FIG. 34 is a drawing of the selector mechanism for automatic size control, by positioning the lenses of the optical system.

As shown in FIG. 34, this motor is connected through suitable drive gears and through suitable sprockets or belts 1153 to the carriages 1155 of the lenses 620. These carriage include stops 1156 engageable with sets of different abutments or stops indicated schematically at 1158, and carried on a lens position control drum 1160. As explained in U.S. Patent No. 3,118,354 issued Jan. 21, 1964, different ones of the abutments or stops 1158 will provide for appropriate spacings of the lenses for photographic enlargement or reduction, and thus the size of the character images is varied to provide the desired change in point size. For example, in one embodiment according to the present invention a range of point sizes is provided, according to the known scale of printer's measure, from 4 point to 36 point characters.

Completion of the circuit through winding 1150 of motor 1152 causes the carriages to move to the ends of the drum 1160 so that the stops 1156 are withdrawn and the drum is free to be rotated. When the carriages 1155 reach the limit of movement, or in other words, the "clear" position, they close the series connected limit switches LL–1 and LL–2, shown in FIGS. 35B and 34. This completes a circuit through line 1162 resulting in a pulse on the grid of the control thyratron 1138 and advancing the control stepping switch 1140 to its second position.

In both the first and second positions the AC supply (FIG. 35A) is connected through the wiper of the sixth level to the power supply line 1163, which in turn leads to the winding of the selector drive motor 1165. This motor is also shown schematically in FIG. 34. It drives through a slip clutch 1166, a ratchet mechanism including a ratchet wheel 1168 controlled by a pawl 1170 which in turn is controlled by a solenoid 1172. The coil of this solenoid (FIG. 35B) is connected between a 20 mf. capacitor and the plate circuit of a second control thyratron 1175. In its plate circuit there is also a normally closed switch 1176 which is controlled by the pawl 1170 (FIG. 34), to open and extinguish the thyratron whenever solenoid 1172 is energized, causing power to be withdrawn from the escapement wheel. Thus, the pawl returns immediately, and the escapement mechanism functions to permit the drum 1160 to rotate one step.

When the control stepping switch 1140 moves to its second position, a circuit is completed from the wiper of the fourth level through the line 1178 (FIG. 35A) causing a read pulse to be transmitted to the read pulse generator 543. In the meantime, the normal read pulse supply circuit from this generator is suspended due to the now open circuit between the common contact or blade 535h of the reader and the read pulse supply line 543b which extends from the fifth position in the first level of stepping switch 1140.

The read pulse generated in this manner by the stepping switch thus is transmitted back through the tape reader and to the input lines 1180 (FIGS. 18 and 35B) from the reader to the size selector rotary switch which is shown schematically in FIG. 34 at 1185. The schematic diagram of this switch appears at the bottom of FIG. 35B. It will be noted that the inputs from the various circuit lines of the reader pass through different positions of the size selector switch and the wipers of this switch are connected in parallel through diodes 1186 to a common output line 1188. This line leads through a manually operated selector switch 1190, as shown, to the grid of an inverter amplifier 1192. The output of this inverter drives the grid of thyratron 1175, and thus if a through connection appears for the pulse from the reader at any one of the wipers of the size selector 1185, this pulse will pass to the inverter amplifier and thyratron 210 will be fired momentarily causing the stepping solenoid 1172 to release drum 1160 for another step.

The purpose of this operation is to read the same code word, which now appears in the reader 520, a number of times, so that the size selector controls may be interrogated to determine whether the size selector switch is in a position corresponding to that dictated by the size code word. The correct position is determined by an open circuit at all wipers at the size selector switch, such that the read pulse does not reach the feed back line 1188. Until this condition is obtained, operation of the tape reader 520, with its normal mode of advancing with each read pulse, is suspended, and the automatic size control continues to repeat the interrogation-advance sequence of the size selector switch until the proper position is reached.

Each time the escapement mechanism for the selector switch operates, it momentarily opens the extinguishing switch 1176 of thyratron 1175. Then, as the pawl 1170 moves back toward a position in engagement with the ratchet wheel 200, it momentarily closes a switch 1195 (FIGS. 34 and 35A), and this sends an interrogating read pulse to the read pulse generator 543 so that interrogation of the selector switch in the next position is accomplished.

When the size selector switch reaches the desired position, and there is no longer any closed circuit to the feed back line 1188, no pulse will pass to the inverter for the purpose of firing the thyratron 1175.

The anode of the thyratron is also coupled through a capacitor 1197 and line 1198 to a resistor, capacitor, diode delay circuit 1200 connected to a cathode follower circuit 1202. The capacitor of the delay circuit is charged each time thyratron 1175 fires. When the drum 1160 reaches the desired size position, the read pulse will not fire the selector thyratron. The delay capacitor will continue to discharge, and when its potential is near zero, the cathode follower 1202 will fire the control thyratron 1138, thus advancing the stepping switch 1140 for the next part of the size control sequence, at its third position.

The selector drive motor 1165 is deenergized since power to line 1163 is cut off (sixth level, third position). A circuit is completed from the AC supply through line 1205, applying power to the winding 1150a of the lens drive motor 1152. This causes the lens drive to set the lens system by bringing the carriers 1155 inward until its stops engage the abutments now in position on the size control drum 1160.

A tape advance signal is sent from the fourth level, third position of switch 1140, through line 1207, to the control of tape reader 520 to prepare it for normal operation. A time delay relay 1208 (FIG. 35B) is energized, but its normally open contact 1208a remains open for a short period. This time delay is put in so as to provide time for the lens stops to reach the abutments now in position to locate the lenses.

When the time delay relay 1208 operates, a circuit is completed through line 1162 and the thyratron 1138 is again fired, moving switch 1140 to its fourth position, deenergizing the lens motor 1152.

In this four position of switch 1140 a biasing circuit is also completed through line 1209 in the second level, leading to the grid of the inverter circuit 1192, and maintaining it cut off, and a similar biasing circuit is completed through the third level and line 1210 to the delay circuit 1200 in order to prevent this circuit from operating the cathode follower 1202. In the fourth level, a pulse generating connection is formed through line 1212 around the control thyratron 1138 to energize the coil 1140A of the stepping switch, causing it to move to its fifth or rest position.

In this position, the circuit is completed through line 543B and the wiper of the first level to the eighth channel common contact of the reader, e.g., switch 535h shown in FIG. 18. The biasing circuit is maintained through line 1209 to the inverter and the delay biasing circuit is maintained through line 1210. In the fourth level of the switch, a ground connection is completed to the pulse generating circuit 1215 which in turn directs a pulse to the OR gate 542 for causing normal operation of the phototypesetting machine to resume. In addition, the AC supply (FIG. 35A) is connected through line 1217 to the common input buss of a spark intensity control switch 1220, shown schematically in FIG. 35B and in FIG. 34.

This is a multiple connection switch which rotates in unison with the size selector switch 1185 and the size control drum 1160. Through this switch, connections can be completed at the five different levels thereof to five AC relay coils, shown generally at 1222. The contacts of these relays, shown at 1223 are connected to form parallel circuits with a plurality of spark firing condensers 1225, and these condensers in turn are connected according to the selected pattern, to the spark control unit. In this manner the intensity of the spark is varied such that greater capacitance and a more intense spark discharge is employed at the larger point sizes, where greater illumination is desired for the larger character images. Similarly, the capacitance and thus the intensity of the spark is reduced at the lower point sizes.

The third selector switch 727 is also arranged to rotate with the switches 1185 and 1220. This is the point size computer control switch which has seven output circuit lines from its seven different levels connected through the cable 728 to the space computer 725. During space computation a read pulse from space computer 725 passes from line 739 (FIGS. 35B and 36) to switch 727 and as is apparent from the circuit connections shown in FIG. 35B these pulses will be transmitted through one or more of the lines of cable 728 back to the space computer 725 for the purpose of resetting the P counter portion of this computer. At any position, those contacts of switch 727 which are not connected to the output are held at a positive voltage bias by the connection through the biasing resistor 1228.

There are included provisions for manual control of the point size selector circuits if desired. For that purpose the double pole selector switch 1190 can be operated manually to shift from its normal position, shown in FIG. 35B. When this happens the feed back pulse circuit is broken at 1190 and in addition a biasing circuit is completed through line 1230 to the delay circuit 1200. Manual withdrawal and return of the lenses can be accomplished by momentarily closing the normally open control switch 1232 (FIG. 35A) which completes a power circuit to the stepper circuit 1140A of the control stepping switch 1140. In this manner the appropriate circuits can be completed through this stepping switch. Rotation of the point size control drum 1160 is accomplished by pulsing the inverter amplifier 1192 (and thus thyratron 1175 and the selector stepper control coil 1172) through a normally open manually operable switch 1233, shown in FIG. 35B. Each time this switch is closed momentarily, with switch 1190 in its manual or alternate position, the drum 1160 and the associated switches 727, 1185 and 1220 will be moved one step.

*Tabulate*

When a tabulate code appears in reader 520, a read pulse will cause an output from line 1240 of the decoder circuit (FIG. 18). The resulting signal is used to set the tabulate control flip-flop FFT to its "on" state, and it in turn sends an "on" signal to a pulse generator 1242 (FIG. 40). This pulse generator can be an astable multivibrator which when triggered on will continue to generate pulses until it is turned off.

The output from the tabulating pulse generator 1242 is illustrated as line 1245, a branch of which leads to the line 750 (FIG. 24) which is the input to the spacer control. In an actual construction, it may be desirable to have an amplifier interposed, and also to direct all of the pulses through the spacing motor control circuit. For purposes of simplification the pulses from generator 1242 are shown as directed into a tabulating counter 1248. The important point is that for every thirty-second pulse generated from pulse generator 1242, there is an output pulse from the counter 1248; hence for purposes of simplification, this counter is shown here as a five stage counter having the binary stages B1–B5.

Accordingly, there will be an output on line 1249 from the counter 1248 which corresponds to spacing of one-half pica, and this line feeds back to the tabulate control flip-flop FFT to reset or turn it off, and at the same time send a pulse to the OR gate circuit 542 which causes the read pulse generator 543 to produce the next read pulse. Thus, the character reader reads the code then present and advances to the next code on the tape, in its usual manner, and this reading operation causes additional tabulate codes to be read, if they are present, and the sequence may be repeated with an "on" pulse being transmitted over line 1240 to the control flip-flop FFT each time a further tabulate code is read. In other words, every time a tabulate code is read, a space of one-half pica will occur.

*Leader-tabulate*

Figure 31:
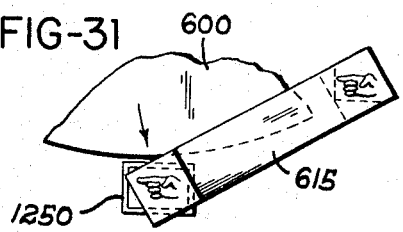
FIG. 31 is a view, including a fragment of a character disc, illustrating a third position of the prism for introducing the images of pi characters into the optical system.

Another function provides for the insertion of leader characters in tabulating operation, for example inserting dots or dashes from the end of the characters in one column to the point where the next column begins. For purposes of explanation, a leader dot will be described. This dot is obtained from a suitable pi character on the pi character plate 1250 (FIGS. 31 and 32).

When the character reader 520 reaches a leader code instructing the insertion of leaders, this will produce an output signal from the character decoder circuit 555 on line 1255. This signal is transmitted through an amplifier (not shown) to line 1257 of the leader control circuit to the grid of thyratron 1260, causing this thyratron to fire. As a result, a circuit is completed through the latching coil 1262L of a leader control latching relay 1262. As is characteristic with this type of relay, there is also an unlatch coil 1262U, and energizing of the appropriate coil will cause the relay to shift and remain in that position to which it has been shifted until the other coil is energized.

The switches of this relay are identified as 1262b, 1262c, 1262d, 1262e and 1262f. Corresponding contacts for each relay switch are identified by the suffix C (for common, U (for unlatched position contact), and L (for the contact which is closed in the latched position). Relay switch 1262b is connected between the plate circuit of thyratron 1260 and one or the other of the relay coils 1262L and 1262U. The normal position is a shown in FIG. 40, hence when thyratron fires due to a leader signal input pulse on line 1257, all of the relay switches transfer, and as a result thyratron is extinguished.

At the same time the thyratron is fired, it transmits a pulse through line 1264 to an OR gate circuit 1265, and this line also leads to the leader insert control flip-flop FFL. A pulse from line 1264 sets the circuit FFL to its "off" condition. The pulse passing through OR gate 1265 is directed through a delay circuit 1266 to the character reader input OR gate 542, which in turn causes a read pulse through the decoder circuit 555. It will be recalled that any read pulse to the reader also causes it to step to the next code in readiness for the next operation, hence the code in the reader at the time of the read or "go ahead" pulse through OR gate 1265 is the next code following the leader code, which had resulted in an input through line 1257 to fire the leader insert thyratron.

In this particular mode of operation a number of tabulate codes will follow the leader code. Therefore, the operation will proceed essentially as previously described in the tabulate function. However, each time the counter binary B5 emits a negative pulse, when it transfers from "1" to "0" state, this is transmitted through line 1270 to the relay switch 1262e, which is now in its latch position. The pulse is directed through the contact 1262eL into the "set" or "on" input of the leader control flip-flop FFL and to the leader insert control gate 1272. As soon as the relay 1262 transfers to its latch position, a ground circuit is completed through the relay switch 1262d and line 1274 to the pi relay 1275 on the position control for the font selector prisms 615 and 616. This causes the prisms to be moved to the pi character position, as shown in FIG. 31 so that a flash of light from the spark gap 610 will be directed through the pi character plate.

The negative pulse from B5 through line 1270 sets the leader control FFL to its "on" condition, and when this control flip-flop circuit is on, it enables the gate circuit 1272. This gate circuit will be enabled by positive pulses from line 1270. Therefore, when the counter 1248 runs over (B5 changes from one to zero) the first time after the leader circuits have been set up, this will cause the leader control flip-flop FFL to be switched on and enable the leader insert gate 1272. However, the feed back pulse through line 1249 will momentarily turn off the tabulate control flip-flop FFT and cause the next code to be read at the reader 520. This will also be a tabulate code, hence the sequence will be repeated, but during the next sequence when B5 changes from its zero to one state, a positive pulse will pass through line 1270 and will enable the gate circuit 1272, and thus a pulse will result on its output line 1278 to the spark control unit 700, resulting in a flash of light which will cause the leader character to be photographed.

It is significant to note that this will occur one-half way through the tabulating operation, following the first operation which set up the leader insert control FFL. In other words, the pulse which changed B5 to its one state occurs when a spacing of one-quarter of a pica has occurred from the time the tabulate counter 1248 first overflowed. Therefore, if the leader code occurred at a time when the counter was almost full, for example less than one pulse, the next pulse resulting from reading of the tabulating code immediately after the leader code will operate merely to set up the leader insert control, and it will not be until one-half way through the next following tabulate operation that the first leader dot will be actually photographed and inserted. Therefore, the minimum spacing that a leader character will have from a preceding character will be one-quarter pica, and the maximum possible such spacing will be three-quarters of a pica, in that instance when the counter 1248 has not yet received any spacing pulses when the leader code appeared.

The leader-tabulate operation is compled by the insertion of another leader code at the end of the tabulate codes. When this final leader code appears at reader 520, the character decoder circuits will cause a further signal through line 1257 to fire the thyratron 1260. This time, however, the relay switch 1262b will be in the latching position (i.e., on contact 1262bL), and the result will be energization of the unlatch coil 1262U to transfer the leader insert latching relay 1262 back to its unlatched position shown in FIG. 40, thereby terminating the leader operation.

A safety circuit is provided, in the event that the keyboard operator preparing the control tape or other record should neglect to insert a further or ending leader code when tabulating to the end of a line. It is possible that this can occur where the operator has performed the leader-tabulate function out to the end of the line, and from force of habit, merely adds the end-of-line code. In the event that the machine is in the leader-tabulate mode and an end-of-line signal occurs, this signal will be transmitted over the line 1280 and through the isolating diode 1281 to the contact 1262cL of the latching relay 1262. Since the relay will be in its latch position, this signal will be carried through line 1282 to the grid circuit of thyratron 1260, causing it to fire and thus transferring the relay to its unlatched position. Obviously, if a terminating leader code has been inserted, the latching relay will already have transferred as previously mentioned, and the signal over line 1280 will terminate at the open contact of the relay.

*Leader—justified word space*

Another function is to insert leader characters between words or phrases which are to be flush with the beginning and ending margins in a column, but where a substantial space is desired between these words or phrases. For purposes of explanation, it will be assumed that a single word should be formed flush with the lefthand margin of a column, followed by a space filled with leader dots, followed by a final word which ends flush with a predetermined righthand margin. It will be understood that in place of these single words at the beginning and end of a line, phrases of several words can also be formed.

The general scheme of operation of the machine in performing this function, aside from the insertion of leader characters, is described in U.S. Patent No. 2,714,843. Basically, the operation consists of forming the first word or phrase at the beginning of the line, and if it is a phrase, inserting standard or fixed spaces between words, then following this first word or phrase with a justified word (code JWS, see FIG. 18) followed by the final word or phrase, with appropriate standard spaces between words if there is more than one. Due to the fact that the end-of-line (EOL) code includes in code form the number of justified word spaces and the amount of space to be divided up among these justified word spaces, this information is stored in the justification computer, as previously mentioned, during the previous EOL sequence. In the example set forth above, there will be only one justified word space, hence the line remainder space set into the justification computer will all be inserted at this one space, i.e., between the words or phrases as desired.

Therefore, if it is desirable to fill this space with leader characters, a leader code will be inserted ahead of the justified word code. The leader code will result in a signal through line 1257 to energize thyratron 1260, as described before, and the leader insert latching relay 1262 will shift to its latch position. This will result in setting the leader insert control flip-flop FFL to its off condition, and the tape read or go ahead pulse will be generated via line 1264, OR gate 1265, delay circuit 1266, and the read pulse OR gate 542. Thus, with the font selector prism in the pi character position, and the leader insert circuits ready to receive pulses from the counter 1248, the justification computer will begin operation as the JWS signal is read.

Pulses from the justification computer will be transmitted via line 840 (FIG. 37) into the space control circuits 752, and the stepping motor 755 will be driven accordingly. The counter 1248 will follow along, and the outputs from its stage B5 will function to control the leader insert flip-flop FFL and the leader insert gate 1272 in the same manner as previously described, so that the spark control unit will receive an energizing pulse at half-pica intervals after the first leader insert output signal on line 1278. Stated another way, the spark will be fired at half-pica intervals, but from the quarter pica pulses into counter 1248. When the justification computer completes its operation, it will send a signal over line 1290 (FIGS. 37 and 40) and since relay 1262 is in the latched position, this signal will energize thyratron 1260 and in turn energize the unlatch relay 1262U. With the relay then returned to its unlatched position the "finished justification" signal is applied from line 875 from the justification computer, and via relay switch 1262F to line 1292 which leads to OR gate 542, whereby the reader reads the next code in the tape and begins to compose the next word.

*Monitor*

There will be occasions when the compositor preparing the control tape wants to call the attention of the operator of the photographic unit to some particular item. This can be accomplished by introducing a monitor code into the control tape 27. The code, as shown on FIG. 18, is $\bar{b}$, $e$, $f$, and $h$. An output on the monitor signal line 1300 produces a gating signal on the grid of triode 1302, as a result of which this triode conducts and energizes a lamp 1304. If desired, a suitable buzzer (not shown) can also be energized in the same fashion. Since no further read pulse results, the machine stops on the next code, to which it is automatically advanced, and the operator can start it again by manually causing the read pulse generator 543 to generate a read pulse, by closing an appropriate one of the switches on the console, shown generally in FIG. 2.

*Font change*

In the machine illustrated in the drawings, there are provisions for four complete typographic fonts, to which access can be obtained through automatic control, and in addition, pi characters can be inserted automatically by having an appropriate pi character plate 1250 in position. This general position was previously described with respect to insertion of a leader character. As shown in FIGS. 26 and 32, the pi character plates 1250 are removably mounted on a slide 1310 having a suitable handle 1311 by means of which the slide can be inserted to its active position where the pi character plate is in the same plane as the disc 600, immediately beyond its peripheral edge.

Each of the discs 600 and 600a carries two type fonts (note FIG. 27) in separate rows, at different radii. As previously mentioned, selection between these two front rows is obtained by shifting the position of the prisms 615 and 616. These prisms are mounted on suitable rotatably arranged arms 1315 (FIG. 32) provided with apertures at their center of rotation. One of these apertures is shown at 1316. Beams of light from the spark gap are arranged to enter and leave through these apertures. The arms 1315 can rotate in the bracket mounting 1318 which is carried on a support block 1320 arranged for mounting on the same way or support as the lens carriers 1155. This assures that the apertures 1316 are properly aligned with the center of the optical path.

The block 1320 also provides a mounting support for a font change pneumatic cylinder motor 1325 and a pi character control pneumatic cylinder or motor 1327. The piston rod of the motor 1325 is arranged to push against, but is not connected to, an arm 1328, which in turn is fixed to the structure including the arms 1350, in order to control the movement of the prisms. A link 1329 connects this arm to the piston of the pneumatic cylinder 1328. Inside the cylinder of the motor 1328, there is a spring 1330 which tends to rotate the arm 1328 in a counterclockwise direction, as shown in FIGS. 26 and 32, urging it toward a stop or locating screw 1332 which defines the position of the prisms in alignment with the inner of the font character rows. The mountings, etc., are described in greater detail in U.S. Patent No. 3,099,945.

Automatic selection movement of the prisms is provided for under control of a latching relay 1340 having coils 1340U and 1340L which are connected to a source of positive potential as shown in FIG. 32. This relay has four relay switches designated 1340a, 1340b, 1340c and 1340d. The common contact of relay switch 1340b is connected to the plate of control thyratron 1342, which has a grounded cathode. In the position shown, it is assumed that the prisms are aligned with the inner font row, thus the relay switch 1340a is on its open or unused contact. The common contact of this switch leads to the positive voltage supply. The other contact is connected through line 1344 to a control (such as a solenoid) 1345 for a valve 1347 which controls the supply of air under pressure to the pneumatic cylinder 1325. In the condition shown the spring 1330 moves the arm 1328 against the stop screw, and the valve 1347 is cut off. If the relay switch 1340a is transferred, power supplied to the control 1345 will open valve 1347 and the piston of the motor 1325 will move to its other limit position (which can be adjusted precisely by internal stops not shown) thereby swinging the prisms in a clockwise direction from the position shown in FIG. 26, and aligning them to the outer font row.

The relay switch 1340c has its common connection coupled through a suitable resistor to the grid of thyratron 1342. In the position shown relay switch 1340c connects the thyratron grid circuit to line 1350 of the character decoder circuit (FIG. 18) which is arranged to produce an output signal when the code for the outer font circle ($a$, $\bar{b}$, $f$ and $h$) is read by the character reader. This signal fires the control relay 1342, which then energizes its unlatch coil 1340U and in the course of transferring its contacts the thyratron is extinguished. At the same time, an output is provided on line 1352 to the OR gate 542 (FIG. 18) to initiate the next read pulse in the character reader.

In the same manner, the other contact of relay switch 1340c is coupled to line 1355 which leads to the character decoder circuit, FIG. 18. A signal appearing on this line indicates selection of the inner font circle (code $a$, $\bar{b}$, $g$ and $h$) and if the latching relay were in the latch position, with the prisms aligned with the outer font circle, this will cause the font circle selector system to switch back to the outer circle by energizing the coil 1340L. The two input lines 1350 and 1355 are coupled through suitable diodes to the switching contacts of relay switch 1340d, and its common contact is connected to a line 1357 which leads to the character read OR gate 542. This arrangement provides for an immediate read pulse in the event that the font selector for some reason should already be in the position called for by the code appearing in the reader.

Also shown in FIG. 32 is the control valve 1360 for the pi character control cylinder 1330. If this valve is opened, it causes the cylinder 1330 to override the cylinder 1325 and move the prisms to the third or pi character position. This control is provided by a control device 1362 which may contain a suitable relay (not shown) adapted to be energized either manually, by closing switch 1365, or through the line 1274 (FIG. 40) during the leader insert operation. As an example, a monitor code as previously mentioned might be inserted followed by written instructions on the tape for the operator to cause photographing of a particular pi character. He would then insert the proper pi character plate, and close the switch 1365 to actuate the control 1362. This same operation will produce a firing pulse to the spark control unit 700 (connection not shown) in order actually to photograph the pi character. Spacing for the pi character can be provided for in the control tape by a subsequent code or codes which provide one or more fixed spaces. It will be recalled that this operation is previously explained, and involves the use of a code which causes spacing in the same manner as normal character selection, except that there is an opaque part at the character position and no exposure occurs. When the pi character control is deactuated, the spring 1330 returns arm 1328 to whichever position it was in before entry of the pi character (or leader), since the arm simply swings back into engagement with stop 1332, or the piston of cylinder 1325 if it is extended.

In the photographic machine as illustrated, there are provisions to complete character matrix discs 600 and 600a. The character decoder circuits (FIG. 18) have provisions for codes to accommodate four discs, and these are identified by the decoding lines D1, D2, D3 and D4. Lines D1 and D2 correspond to discs 600 and 600a respectively. Lines D3 and D4 are not actually used, but remain available if it is desired to use a disc mounting and locating mechanism capable of handling two more matrix discs.

Figure 25:
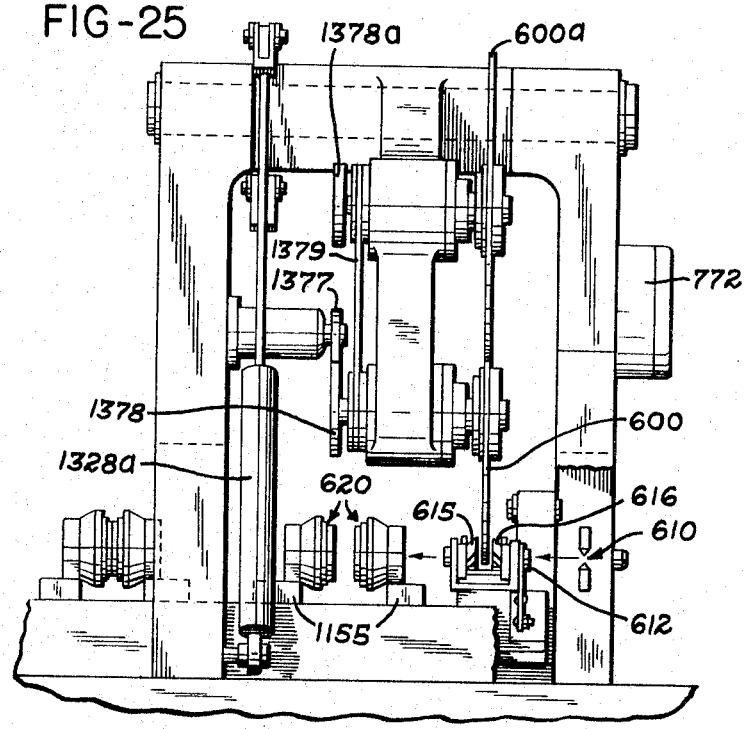
FIG. 25 is a side elevational view of the mounting for the character matrix discs, the font selector mechanisms, and the optical system, with parts broken away to show the general location of the source of flash light.

The disc mounting and control mechanism, and the control circuit therefor, is shown in FIG. 26, and parts thereof are also shown in FIGS. 15 and 25. The essential structure, which will be described broadly since it is described in greater detail in said U.S. Patent No. 3,099,945, includes the yoke 1370 which is pivotally mounted in a bearing support 1371 on the frame of the machine over the optical system. This yoke is of generally inverted T-shape and has on its opposite arms mounting spindles 1372, for the disc 600, and 1373 for the disc 600a. It will be understood that these spindles includes provisions for removing the discs and substituting others having different fonts, if so desired. A suitable disc drive motor 1375 is provided, with an output friction wheel 1377 (FIG. 26) which is adapted to engage either of the driven friction wheels 1378 or 1378a, depending upon which of the discs is in operative position to bring its driven friction wheel into engagement with the motor drive wheel 1377. The spindles mounting the discs are interconnected by a suitable belt 1379 so that both of them rotate when either one is driven. When transferring from one disc to the other, the discs themselves function as fly wheels so that during disc shifting operation there is essentially no slowing of their rotation.

Movement of the mounting yoke 1370 is controlled by an arm 1380 fastened thereto and having pivotal connections at its opposite ends to the rods of pneumatic cylinders 1382 and 1382A. It will be obvious from FIG. 26 that when one or the other of the rods of these cylinders is retracted, the corresponding disc will be in position for use. As shown, the rod of cylinder 1382 is retracted, and disc 600 is in position.

The operation of the pneumatic cylinders 1382 and 1382A is controlled by valves 1385 and 1385A, respectively, which may be of the type arranged to supply pressure air from the air source, shown schematically, or to vent the lines to these cylinders to atmosphere, as the case may be. In the position shown valve 1385A is venting, and valve 1385 is supplying air to cylinder 1382A, thereby holding disc 600 in the active position. The operation of these valves is under the control of a disc control device 1388 shown in block form. It may include connections to limit switches, etc., in order to signal the fact that the selected disc is in proper position, but since such arrangements are conventional, details are not shown. The control also has an output line 1390 which leads to the OR gate 542 on FIG. 18 to provide a "go ahead" signal to the character reader. Signals to position the discs are received by the control 1388 on one of two input lines 1392.

A latching relay 1395 is provided having the usual two operating coils 1395L and 1395U. These coils are connected to a source of positive voltage, and they are in turn connected to the switching contacts of the latching relay switch 1395A. The common connection of this switch leads to the plate circuit of a control thyratron 1398. As shown in the drawing, the relay switch 1395B is connected to apply ground potential to one or the other of the lines 1392, depending upon the condition of the latching relay.

The cathode of thyratron 1398 grounded, as shown, and its control grid is connected through line 1399 to the common connection of relay switch 1395C. In the position shown, this switch is engaged with one of its switching contacts which in turn is connected to a signal line 1400. This line leads to the character decoder circuit (FIG. 18), specifically to the decoding line marked D2. The code which produces a signal on this line is $\overline{b}$, $c$, $e$ and $h$, signifying that it is desired to select from disc No. 2, or in other words the disc 600a. Similarly, the other switch contact of relay switch 1395C is connected to an input signal line 1402 which leads to the character decoder circuit and will produce a signal when the code for disc No. 1 (i.e., disc 600) appears in the character reader.

The relay switch 1395D has its common contact connected to an output line 1405, and its switching contacts are connected through suitable diodes, as shown, to the signal lines 1400 and 1402. Thus, if the disc called for should already be in the active position, the relay 1395 will not shift, but a read pulse will immediately be generated through line 1405 back to the OR gate 542.

The machine thus provided automatically, under control of the record tape 27, for positioning of the proper one of the character matrix discs in active position between the flash light source of spark gap 610 and the lenses 620 which make up part of the optical system.

*Select non-space*

In some circumstances it may be desirable to select and photograph a character without going through the spacing operation to give to the character image its normal typographic width. For example, it may be desired to select a certain character and give it a standard space which is greater than its normal width or to perform a type of kerning operation by photographing the selected character and giving it somewhat less than its normal width. To provide this function, the keyboard operator codes into the tape the "select non-space" code ($a, \overline{b}, e$ and $h$), followed by the identification code for the desired character, followed by one or more standard space codes as necessary. When the "select non-space" code appears in the reader and is decoded, the resulting pulse on output line 1410 (FIG. 18) produces a signal to the circuit shown in FIG. 41. This circuit includes a latching relay 1415 having the usual pair of coils 1415L and 1415U. These coils are connected to the positive voltage source and to opposite ones of the switching contacts of relay switch 1415A of the latching relay. This same common contact of switch 1415A is connected to plate circuit of the control thyratron 1420 and to an output line 1422 which leads to the character decoder input OR gate 542.

From the foregoing, it is seen that a "select non-space" code will cause the thyratron 1420 to fire, and this will in turn energize the coil 1415L, at which time the latching relay will transfer its switches 1415A, 1415B, 1415C and 1415D, and the thyratron will be extinguished as the switch 1415A transfers. The resulting pulse on line 1422 produces a read pulse, and the character reader reads the next code, which identifies the character to be selected. The selection operation proceeds normally except that, with the relay switch 1415C open, there is no connection from the line 685 to the code flash control unit 702, and as a result the flash lamp 715 does not fire as the character is photographed.

Furthermore, the branch of line 685 that leads to the character space computer control (see FIG. 36) passes through relay switch 1415D, and the pulse indicating that the selection is completed is diverted through line 1424 into the pulse generator network 1425, which is coupled through a diode into the base circuit of the transistor in amplifier 1418. In the meantime, since a relay switch 1415B has transferred to an open contact, the output line 1410 is disconnected from the circuit. As a result there is an output from the amplifier 1418 through diode 1427 into the grid circuit of the thyratron 1420, and it fires again, this time energizing the coil 1415U of the latching relay and that relay transfers its switches back to the initial condition (as shown) whereby the normal circuits are restored. The connection on line 1428 from the thyratron plate into the capacitor 1429, within the amplifier 1418, causes a further output from that amplifier which overlaps the previous pulse coming from the selector. This latter pulse is rather short in time, and this "stretching" arrangement assures that a pulse is applied to the thyratron grid for enough time to fire it without fail. This second firing of the thyratron 1420 produces a further output on line 1422 to the OR gate 542 at the character decoder circuit, therefore the next code is read and operation of the machine proceeds. If the code for one or more fixed or standard spaces follows, then the spacing operations will result as previously explained.

Kerning by reverse spacing

It will be recalled from the description of the keyboard machine that it is possible for the keyboard operator to introduce a so-called kerning code ($\bar{b}$, e, g and h) which indicates that a certain amount of space should be subtracted from the space alloted to the previously photographed character. In other words, it might be desirable to reproduce the word "To," and have the "o" spaced partly inward under the upper arm of the "T," as an example. To do this, the character "T" would be selected and spaced at the point size in which the work is being done, and before selecting the "o," the kerning code would be introduced along with information as to the amount of space to be subtracted (i.e., the reverse spacing desired). This requires, as previously explained, a kerning code followed by a fixed space code on the desired amount.

When the kern code is read, this produces an output on the decoding line 1440, and the resulting signal is coupled into the circuit shown in FIG. 42, passing through the diode 1442 into the grid circuit of a control thyratron 1445. This completes a circuit through the coil 800L of the kern control latching relay 800, which then transfers from the contacts shown as closed to the contacts which are shown open. The relay switch 800B, in transferring, extinguishes the thyratron. As the thyratron is energized, however, a pulse is transmitted through line 1448, from the thyratron plate circuit to the character decoder input OR gate 542, to produce a read pulse for the next code in the reader.

When relay switch 800A transfers, this changes the connections in the input to the stepping motor control circuits (FIG. 24) such that stepping pulses from line 725 are applied to line 803 instead of line 802. The result, as previously explained, is that the stepping motor will step in a reverse direction as long as this switch condition is maintained. Relay switch 800C transfers at the same time as the other relay switches, and completes a ground circuit to control line 1450 which leads to a reversing control 1452 for the counter 1248 (FIG. 40). This is to assure that the tabulator counter 1248 is kept in phase with the operation, since it is possible that the kerning operation might cause a reverse movement through a position in the line which is at a one-half pica interval from the beginning of the line.

One or more fixed space codes may follow the kern code, therefore the machine will read these codes and select the fixed spaces. But there will be no exposure due to the lack of a character at the fixed space positions on the disc although the stepping system will be driven in reverse by the proper amount. At the end of the kerning operation there is customarily a further kern signal which produces another pulse on the input line 1440, again energizing the thyratron 1445, which will complete a circuit through the coil 800U and cause the latching relay to transfer back to its normal condition (as shown). This of course restores the forward connections in the spacing controls and in the tabulating counter 1248. In order to assure that the kern control will not be set for reverse operation at the beginning of a line, for example in the case where a kerning operation occurs at the end of the line, the common contact of relay switch 800D is connected through line 1454 to the end-of-line output line 900 in the character reader. If the kern control relay 800 be left in position for reverse operation at the end of a line, a pulse signal on line 1454 resulting from the basic EOL code ($\bar{a}$, b and h) will be applied through diode 1455 to the grid circuit of thyratron 1445, causing it to fire and transfer to the normal condition for forward operation.

Cut film

The machine also has automatic controls for cutting an exposed piece of the photographic film or paper 625 from the supply. For example, once a complete section has been composed for making up a page of composition, it may be desired to sever the exposed film or paper, and the keyboard operator can provide for this function by inserting the cut film code ($\bar{b}$, d, f and h) after the end of the last line to be composed before the film is to be cut. The cut film sequence, including this code, also contains end-of-line information, since the machine must first advance the film and move the line just previously completed out of the film carriage. Ordinarily, the keyboard operator, in preparing the tape, will insert one or more EOL codes by pressing the carriage return key one or more times. This provides enough additional leading or line spacing information to cause the leading motor 1045 to move a sufficient amount of the film through the film carriage. The other portions of these EOL cycles are, of course, of no meaning. The cut film code follows.

When the cut film code is read in the character decoder, this results in an output signal on line 1460 (FIGS. 18 and 43). This signal is coupled into the grid circuit of a control thyratron 1462, and will cause it to be energized. This completes a circuit through the normally closed contact of relay switch 1465A to energize the coil 1465L of a latching relay 1465 which controls the cut film operation. The switch 1465A then moves to its normally open contact, and the thyratron 1462 is extinguished.

Transferring of relay switch 1465B completes a circuit from a negative voltage source through the knife control solenoid 1468 to ground. As a result, the knife blade 1470 is projected into the path of travel of the film as the carriage moves from its home position. Transferring of the relay switch 1465C completes a circuit from a negative voltage source to line 1472 which produces an "on" signal directly to the pulse generator 1242 (FIG. 40) to begin transmitting pulses which are fed into line 750 (FIG. 24) to drive the stepping motor 755. The pulses supplied from this generator to the counter 1248 are inhibited (by a connection not shown), thus the feed back connection tending to turn off the flip-flop FFT when the counter 1248 overflows, is inhibited or deactivated.

As a result, the stepping motor drives the film carriage forward completely across the farthest position that it can attain from its home position, and the film is carried across the knife blade 1470, thereby severing that portion of the film below the blade. The part of film removed can drop into a suitable tray or receptacle (not shown) within the cabinet section 527 (FIG. 2). When the film carriage reaches its fully extended position, it closes a normally open limit switch 1475 (FIG. 20) and completes a circuit from ground through line 1477 to the common contact of relay switch 1465D, which in turn completes a connection through delay coil 1465U which is energized and transfers the latching relay back to its normal position. This, of course, deenergizes the knife solenoid. At the same time, a "go ahead" signal is transmitted on line 1480 to signify that the cut film operation has been completed. This will result in a read pulse to the character decoder, generated through the input OR gate 542 and the pulse generator 543, whereby the next code on the tape is read. In most instances this will be a further EOL code signifying the beginning of a further EOL cycle. The EOL reader 515 will have advanced a full line through it, and be waiting on the EOL information for the next line to be composed. Thus the carriage will be returned to its home position as the machine goes through a complete EOL cycle and readies itself for the next line.

*Summary*

There are a few miscellaneous items that should be mentioned. On FIG. 18, there is a decoding output line 1485 for causing an output whenever the skip tape code (*f, g* and *h*) occurs. A signal on this line is directed back to the OR gate 542 to produce another read pulse, and this may occur several times in succession where a number of skip tape codes appear in the tape. Also, there is a manually operable start switch 1490, normally open, which can provide an input to the OR gate 542, and thus produce a read pulse under manual control. In an actual machine this pulse may be coupled through suitable delay circuits (not shown) in order to provide adequate warm-up time for the various electronic components of the machine. Also, the read pulse generator circuit 543 preferably incorporates a built-in conventional delay circuit which limits the repeat time of the output of this pulse generator. In this manner, it is possible to control the rate of operation and avoid inadvertently missing or misapplying, a code due to the fact that a feed back or go head pulse was received from some spurious signal, such as might result from noise in the electronic circuitry. In a successful embodiment of the machine, such a delay has been provided to assure that there is a time span between successive read pulses of approximately 250 milliseconds.

From the foregoing description, it will be apparent to those skilled in the art that the present invention provides a novel high speed photocomposing system which is capable of operating at speeds far in excess of typesetting machines heretofore known, while obtaining a high quality product (e.g. the exposed galley film) which is entirely acceptable under the high standards of typography which are expected of a machine for setting type. A substantially wide range of point sizes is available, automatically, and the machine can quickly change between several different fonts, thereby providing a versatile device which is still capable of automatic operation at high speeds. Average outputs have been attained with this system at rates of about twenty character exposures per second. In book composition, or the like, this is considered to be equivalent to about 22,000 ems per hour. In one embodiment constructed according to the invention, line lengths are available in one-quarter pica increments, up to fifty-one picas. Leading or line spacing is available in one-quarter point increments up to sixty-three and three-quarter points.

In the system, a character matrix disc containing two hundred forty character images has been used, thereby making available in a two-disc machine a total of four hundred and eighty character images readily obtainable for automatic selection and exposures. In this machine, the basic size of the character transparencies on the discs is ten point, and the size changing system, including the adjustable lenses 620, is capable of obtaining nineteen different type sizes from the one standard size on the disc. A wider range of sizes is available by providing matrix discs with character transparencies in larger point sizes, for example fifteen point or twenty point.

While the form of the apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a phototypesetting system of the character described, the combination of a first machine including a keyboard for preparing a coded record of a selected succession of characters and interword spaces forming a line of composition to be produced, a record member adapted to be marked in coded form by said first machine, means for producing on said record member a coded representation identifying each character in the sequence selected, means for marking said record member to indicate the location of interword spaces, first computing means responsive to the selection of each character for computing the actual width of its character image to be reproduced, means for recording on said record member the number of interword spaces in a line, means in said first machine maintaining a summation of the actual space to be occupied by the character images during preparation of the coded record of a line, means for marking on said record member a coded representation of the actual space not occupied by character images in a line of predetermined length, a second machine comprising a photographic unit including means responsive to character identification codes on said record member for projecting image bearing light beams of the individual characters along a common optical axis in the order of recording on said record member and at a predetermined point size for each character image as determined during preparation of said record member, second computing means responsive to projection of each character image to compute the actual space occupied by the character image, carrier means for mounting a photosensitive member upon which the character images are focused for recording thereof to form lines of composition, means controlled by said second computing means to produce relative spacing movement between said projecting means and said carrier means in the direction of composition to allot the computed space to each character image, and justifier control means in said second machine responsive to information on said record element relating to the number of interword spaces and the amount of space not occupied by characters in a line of predetermined length for producing relative movement between said carrier means and said projecting means wherever said record element indicates the location of an interword space to apportion said unoccupied space among the word spaces and thus to produce a justified line of the predetermined length.

2. A phototypesetting system as defined in claim 1, including an auxiliary keyboard in said first machine arranged to produce in the coded record function control codes including information absent from all character identification codes to distinguish function and character codes broadly from each other, and decoding means in said second machine operative to detect a function code identification information and thus to segregate function control information from character selection information.

3. A phototypesetting system as defined in claim 2, including means in said first machine for forming an end-of-line code representation including a code signifying an accepted line to be reproduced or a code signifying a rejected line, and second decoding means in said second machine having circuits responsive to a rejected line code to cause said second machine to pass over all codes in the rejected line.

4. In a phototypesetting system of the character described, the combination of a first machine including a keyboard for preparing a coded record of a selected succession of characters and interword spaces forming a line of composition to be produced, a record member adapted to be marked in coded form by said first machine, means for producing on said record member a coded representation identifying each character and space in the sequence selected, first computing means responsive to the selection of each character for computing the actual width of its character image to be reproduced, means in said first machine maintaining a summation of the actual space to be occupied by the character images and the number of interword spaces during preparation of the coded record of a line, and means for marking on said record member a coded end-of-line representation including the actual space not occupied by character images in a line of predetermined length, and the number of interword spaces together with an end-of-line code indicating whether the line is to be justified; a second machine comprising a photographic unit including means responsive to character identification codes on said record member for projecting image bearing light beams of the individual characters along a common optical axis in the order of recording on said record member and at a predetermined point size for each character image as determined during preparation of said record member, second computing means responsive to projection of each character image to compute the actual space occupied by the character image, carrier means for mounting a photosensitive member upon which the character images are focused for recording thereof to form lines of composition, means controlled by said second computing means to produce relative spacing movement between said projecting means and said carrier means in the direction of composition to allot the computed space to each character image, justifier control means in said second machine responsive to information on said record element relating to the number of interword spaces and the amount of space not occupied by characters in a line of predetermined length for producing relative movement between said carrier means and said projecting means wherever said record element indicates the location of an interword space to apportion said unoccupied space among the word spaces and thus to produce a justified line of the predetermined length, and control means in said second machine responsive to the end-of-line code for actuating said justifier means at the location of each interword space or for causing a standard interword space to be inserted if a line is not to be justified.

5. A phototypesetting machine operative from record means having a coded record of lines of composition including an identification code for each character in a line of composition arranged in a selected sequence and a coded representation identifying the location of an interword space between those character identification codes making up separate words and having a coded record related to an entire line representing whether the line is to be justified and the amount of leading space by which the line is to be spaced from the preceding line, said machine comprising a continuously rotating character matrix and a flash light source for projecting images of any one of at least one font of typographic characters having varying widths from said matrix, and along a common optical path, a carrier mounting photosensitive means to intercept said path, optical means arranged to focus the images on said photosensitive means to provide a latent image thereof of predetermined size, selector means responsive to character code identification on said record means for actuating said flash light source to produce a focused image of each identified character upon said photosensitive means, computing means responsive to projection of a character image for computing the actual width of the character image on said photosensitive means, a spacing control responsive to said computing means and connected to produce relative spacing movement in the direction of composition between said projecting means and said carrier, and means actuated by a code representing the location of an interword space for producing further operation of said spacing control without projecting a character image to produce interword spaces on said photosensitive means, and a leading control responsive to said end-of-line record to cause advancement of the photosensitive means in said carrier for spacing successive lines.

6. In phototypesetting apparatus of the character described the combination of record means providing a coded record including an identification code for each character in a line of composition arranged in predetermined sequence on said record means, a coded representation identifying the location of an interword space in predetermined locations between said character identification codes, means providing a coded justification record at one end of a coded representation of a line representing the number of interword spaces in the line and the actual amount of space not occupied by characters in a line of predetermined actual length, means for storing said justification record prior to the beginning of producing a line of composition from said record means, means for projecting images of any one of a large number of different characters having varying widths along a common optical path, photosensitive means mounted to intercept said path, selectively operable optical means for controlling the size and the focus of the images on said photosensitive means to provide a latent image thereof of predetermined size, means including said optical means responsive to character code identifications on said record means for projecting a properly sized and focused image of the identifying character upon said photosensitive means, means responsive to projection of a character image for determining the actual width of the character image on said photosensitive means, a spacing control responsive to said width determining means and connected to produce relative spacing movement in the direction of composition between said projecting means and said photosensitive means, and a justifier responsive to the stored coded justification record and actuated by a code representing the location of an interword space for causing further operation of said spacing control without operation of said projecting means to produce interword spaces on said photosensitive means of substantially equal width as necessary to produce a justified line.

7. In phototypesetting apparatus having means for selectively projecting one at a time, images of all the different characters of a typographic font along a common axis onto photosensitive material, means for displacing the successively projected character images according to their respective widths, means for selectively changing the size of any one of said images, and justifying means including a computer operable to divide the space not occupied by characters in a line of predetermined length by the number of interword spaces in such line and arranged to produce displacement between the photosensitive material and the image display means at each interword space for justifying the line; the improvement comprising a record member such as a perforated tape having a plurality of information channels in each of which a code mark can appear, the associated marks in said channels cooperating to form code words identifying the characters and functions which make up a line of composition and identifying the number of interword spaces and the actual amount of space which should be divided among the interword spaces for justification, a pair of readers mounted to sense the information on said record member in serial fashion, the first of said readers to scan said record member being an end-of-line reader arranged to pass over code words on the record member except an end-of-line identification code and to stop the record member with such code in said first reader, the second reader being a character and function code reader arranged to read each of the code words on the record member and to produce corresponding instruction operation signals for each code word read thereby, at least one identification channel being arranged in cooperation with said second reader to produce alternative code signals depending upon the presence or absence of a mark in said one channel in any code word and thereby to distinguish between character identification codes and function identification codes, function circuit control means operative to cause changes of font, changes of point size, tabulating, leader character insertion, kerning, and cutting of the photosensitive material, and character selection circuit means connected between said second reader and said character display means to select appropriate ones of said characters in response to a code work in which a mark in said one channel is absent.

8. In phototypesetting apparatus of the character described, the combination of record means providing a coded record including an identification code for each character in a line of composition arranged in predetermined sequence on said record means, a coded representation identifying the location of an interword space in predetermined locations between said character identification codes, means providing an end-of-line code at one end of a coded representation of a line signifying that the line is not to be justified, means for sensing said end-of-line code prior to the beginning of producing a line of composition from said record means, optical means for projecting images of any one of a large number of different characters having varying widths along a common optical path, photosensitive means mounted to intercept said path, means including said optical means responsive to character code identification on said record means for projecting a focused image of each identified character upon said photosensitive means, computing means responsive to projection of a character image for determining the actual width of the character image on said photosensitive means, a spacing control responsive to said computing means and connected to produce relative spacing movement in the direction of composition between said projecting means and said photosensitive means, and a non-justify control responsive to the end-of-line code and actuated by a code representing the location of an interword space for causing further operations of said spacing control without operation of said projecting means to produce standard interword spaces of equal width on said photosensitive means.

9. In phototypesetting apparatus having means for selectively projecting one at a time, images of any character in a plurality of typographic fonts along a common axis onto photosensitive material, spacer means for displacing the successively projected character images according to their respective widths, means for selectively changing the size of any one of said images, and justifying means including a computer operable to divide the space not occupied by characters in a line of predetermined length by the number of interword spaces in such line and arranged to produce displacement between the photosensitive material and the image display means at each interword space for justifying the line; the improvement comprising a record member such as a perforated tape having a plurality of information channels in each of which a code mark can appear, the associated marks in said channels cooperating to form code words identifying the characters and functions which make up a line of composition and to form end-of-line codes signifying whether or not the line should be justified and identifying the number of interword spaces and the actual amount of space which should be divided among the interword spaces for justification, a pair of readers mounted to sense the information on said record member in serial fashion, the first of said readers to scan said record member being an end-of-line reader arranged to pass over code words on the record member except end-of-line codes and to stop the record member with such code in said first reader, the second reader being a character and function code reader arranged to read each of the code words on the record member and to produce corresponding operation signals for the code words read thereby, an end-of-line decoder connected to said first reader, a character and function decoder connected to said second reader, an end-of-line control operative from said end-of-line decoder to distinguish between acceptable and rejected code information on said record member to determine whether accepted lines are to be justified, circuits operated by said end-of-line control to cause storage of the end-of-line codes for lines to be justified, a justification computer including storage memories connected to receive the end-of-line justification codes and arranged to drive said spacer means in response to an interword signal, a character selector operative by said character decoder to actuate said character projecting means, a character width computer responsive to operation of said character selector to compute the width of the projected image and to supply the width information to said spacer means as a train of spacing pulses, said character decoder being operative in response to the completion of operation of said width computer to decode the next code presented in said second reader, and an end-of-line connection from said character decoder to said end-of-line control for enabling said end-of-line control to begin its next decoding cycle.

10. A phototypesetting machine operative from record means having a coded record of lines of composition including (1) an identification code for each character in a line of composition arranged in a selected sequence, (2) a coded representation identifying the location of an interword space between those character identification codes making up separate words, (3) a coded end-of-line record related to each coded representation of an entire line representing whether the line is to be justified and the amount of leading space by which the line is to be spaced from the preceding line, and (4) function codes for controlling changes in point size, tabulation, insertion of leader characters, selection of a character without its usual spacing, reverse operation of a spacer control for kerning, and cutting of the exposed photosensitive material from a supply thereof; said machine comprising a continuously rotating character matrix and a flash light source for projecting images of any one of at least one font of typographic characters having varying widths from said matrix, and along a common optical path; a carrier mounting photosensitive material to intercept said path; adjustable optical means arranged to focus the images on said photosensitive means to provide a latent image thereof of predetermined size; selector means responsive to character code identification on said record means for actuating said flash light source to produce a focused image of each identical character upon said photosensitive material; width computing means responsive to projection of a character image for computing the actual width of each character image as recorded on said photosensitive means; a spacer control responsive to said computing means and connected to produce relative spacing movement in the direction of composition between said projecting means and said carrier, and means actuated by a code representing the location of an interword space for producing further operation of said spacing control without projecting a character image to produce interword spaces on said photosensitive means.

11. A machine as defined in claim 10, including reading means and an associated first decoder responsive only to end-of-line records on said record means, a second character and function code decoder operative from said reading means after said first decoder, an end-of-line control operated by said first decoder to store end-of-line information prior to decoding of a line by said second decoder, and a control circuit in said second decoder for signaling presence of an end-of-line code in said second reader to said end-of-line control for initiating a cycle of operation in which both said readers advance through said end-of-line record.

12. A machine as defined in claim 10, including a first end-of-line reader and an associated decoder responsive only to end-of-line records on said record means, a second character and function code reader and an associated decoder operative by said record means after it is read by said first reader, a justifying computer including memories for storing end-of-line information, an end-of-line control operated by said first decoder to store end-of-line information in said memories prior to reading of a line by said second reader, and a control circuit in said second decoder for signaling presence of an end-of-line code in said second reader to said end-of-line control for initiating a cycle of operation in which both said readers advance through said end-of-line record.

13. A machine as defined in claim 12, including a leading control for advancing the photosensitive material through said carrier to space apart successive lines, and an operating connection from said end-of-line control to said leading control to transfer leading information thereto and initiate operation thereof.

14. A machine as defined in claim 13, wherein said spacer includes a first stepping motor connected to move said carrier through multiples of small spacing units, a second stepping motor connected to advance the photosensitive material as part of said leading control, and means for returning said carrier to a starting position while completing the operation of said leading control.

15. A machine as defined in claim 11, including a tubulating control responsive to said second decoder and operative to send a predetermined number of spacing pulses to said spacer control for each tabulate function code read from the record means.

16. A machine as defined in claim 11, including a kern control responsive to a signal from said second decoder to reverse the operation of said spacer control and to cause said carrier to move backward for a predetermined space.

17. A machine as defined in claim 11, including a cut-film control responsive to a signal from said second decoder, a normally retracted knife mounted to be moved into the path of travel of the exposed photosensitive material from said carrier, and circuits operative by said cut-film control to move said knife into the path of said material and to drive said spacer control to carry the material entirely past said knife and sever the exposed portion thereof.

18. A machine as defined in claim 11 including a non-space control responsive to a signal from said second decoder to inhibit the operation of said width computing means after the next operation of said selector means whereby the normal spacing for the projected image is prevented.

19. In a phototypesetting system of the character described, the combination of a machine including a keyboard for preparing a coded record of a selected succession of characters and interword spaces forming a line of composition to be produced, a record member adapted to be marked in coded form by said machine, means for producing on said record member a coded representation identifying each character in the sequence selected, means for marking said record member to indicate the location of interword spaces, computing means responsive to the selection of each character for computing the actual width of its character image to be reproduced, means for recording on said record member a code identifying the number of interword spaces in a line, means in said machine maintaining a summation of the actual space to be occupied by the character images during preparation of the coded record of a line, means for marking on said record member a coded representation of the actual space not occupied by character images in a line of predetermined length, a key on said keyboard for indicating the end of a line, and an end-of-line sequence control responsive to said key to place an end-of-line code in said record along with the code identifying the number of interword spaces and the coded representation of space not occupied by characters.

20. In phototypesetting apparatus, the combination of recording means including a selectively operable device for placing code information on record material such as paper tape to form a control record, character selector means including a keyboard and code producing means operated by said keyboard to form a code representation of each character selected by actuation of individual keys on said keyboard, a connection between said character selector means and said record producing means to produce a code representing each selected character on the record material, a space computer having a selectively variable point size control and a means for producing a relative width representation for any selected character, an operating connection between said character selector means and said space computer to initiate operation of the computer and determine the actual space to be allotted to the image of each selected character immediately upon selection of a character at the keyboard and prior to selection of a following character, a space accumulator counter receiving and totalling the space information determined by said computer to maintain a total representation of space used by characters during composition of a line, means to preset said counter to a predetermined line length whereby the accumulated character image space is substracted from the predetermined line length, an interword space counter totalling the number of spaces inserted between words during composition of a line, a key on said keyboard for indicating the end of a line of composition, and an end-of-line sequence control responsive to said key and having connections to said recording means and to both said counters for automatically recording on said record material an end-of-line code together with codes indicating the number of interword spaces and the amount of actual space to be divided among the interword spaces to form a justified line.

21. Apparatus as defined in claim 20, including an auxiliary keyboard having a plurality of keys representing different sizes of fixed spaces, and connections between said auxiliary keyboard and said recording means for producing codes on the record material identifying selected fixed spaces.

22. Apparatus as defined in claim 21 including a kern key, a connection between said kern key and said recording means to form a kern code on the record material, and a connection between said kern key and said space accumulator for causing it to subtract space selected from said auxiliary keyboard when said kern key is actuated.

23. Apparatus as defined in claim 20 including a correction key and a connection between said correction key and said recording means for effectively erasing an incorrect code on the record material, and means connecting said accumulator counter for causing it to subtract the space computed for a character selected while said correction key is actuated.

24. Apparatus as defined in claim 20 including a non-justify key connected to said recording means and said end-of-line sequence control to record a non-justify code at the end of a line of composition whereby any interword spaces in such line will be given a fixed space of predetermined value.

25. Apparatus as defined in claim 20 including a reject key connected to said recording means to record a reject code whereby all codes following the preceding end-of-line code are effectively erased by instructing the controlled machine to ignore them.

26. Apparatus as defined in claim 20, wherein said end-of-line control includes means operating said recording means to form a coded representation of the amount of leading to be recorded.

27. Apparatus as defined in claim 20, including an auxiliary keyboard, a cut-film key on said auxiliary keyboard connected to said recording means for forming a cut-film code in the record.

28. Apparatus as defined in claim 20, including an auxiliary keyboard having a monitor key, and a connection to said recording means from said monitor key for forming a monitor code in the record whereby the controlled machine will stop and signal for operator asistance.

29. In a phototypesetting system of the character described, the combination of a machine including a keyboard for preparing a coded record of a selected succession of characters and interword spaces forming a line of composition to be produced, a record member adapted to be marked in coded form by said machine, means for producing on said record member a coded representation identifying each character in the sequence selected, means for marking said record member to indicate the location of interword spaces, computing means responsive to the selection of each character for computing the actual width of its character image to be reproduced, means for recording on said record member the number of interword spaces in a line, means in said machine maintaining a summation of the actual space to be occupied by the character images during preparation of the coded record of a line, means for marking on said record member a coded representation of the actual space not occupied by character images in a line of predetermined length, a photographic unit including means responsive to character identification codes on said record member for projecting image bearing light beams of the individual characters in the order of recording in said record member and at a predetermined point size for each character image as determined during preparation of said record, means responsive to projection of each character image to generate digital information corresponding to the actual space occupied by the character image, carrier means for mounting a photosensitive member upon which the character images are focused for recording thereof to form lines of composition, spacer means controlled by said means to produce relative spacing movement between said projecting means and said carrier means in the direction of composition to allot the computed space to each character image, and control means in said machine responsive to information on said record element for producing relative movement between said carrier means and said projecting means wherever said record element indicates the location of space to apportion said unoccupied space among the word spaces and thus to produce a justified line of the predetermined length.

References Cited

UNITED STATES PATENTS

| | | | |
|---|---|---|---|
| 2,646,733 | 7/1953 | Ackerman | 95—4.5 |
| 2,786,400 | 3/1957 | Peery | 95—4.5 |
| 2,803,178 | 8/1957 | Lotz | 95—4.5 |
| 2,816,609 | 12/1957 | Rosetto | 234—9 |
| 2,847,919 | 8/1958 | Rosetto | 95—4.5 |
| 2,923,215 | 2/1960 | Corrado | 95—4.5 |
| 3,197,131 | 7/1965 | O'Brien | 234—4 |
| 3,219,267 | 11/1965 | O'Brien | 234—7 |

JOHN M. HORAN, *Primary Examiner.*